(12) United States Patent
Jin et al.

(10) Patent No.: US 12,425,834 B2
(45) Date of Patent: Sep. 23, 2025

(54) COMMUNICATIONS METHOD AND APPARATUS FOR A DUAL-CARD TERMINAL

(71) Applicant: Huawei Technologies Co., Ltd., Guangdong (CN)

(72) Inventors: Hui Jin, Shenzhen (CN); Yu Cai, Beijing (CN); Chuting Yao, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 678 days.

(21) Appl. No.: 17/774,936

(22) PCT Filed: Oct. 26, 2020

(86) PCT No.: PCT/CN2020/123747
§ 371 (c)(1),
(2) Date: May 6, 2022

(87) PCT Pub. No.: WO2021/088675
PCT Pub. Date: May 14, 2021

(65) Prior Publication Data
US 2022/0394459 A1 Dec. 8, 2022

(30) Foreign Application Priority Data
Nov. 8, 2019 (CN) .......................... 201911090557.8

(51) Int. Cl.
*H04W 4/00* (2018.01)
*H04W 8/18* (2009.01)
(Continued)

(52) U.S. Cl.
CPC ....... *H04W 8/183* (2013.01); *H04W 28/0268* (2013.01); *H04W 68/005* (2013.01); *H04W 76/20* (2018.02)

(58) Field of Classification Search
CPC .................................................. H04W 68/005
See application file for complete search history.

(56) References Cited

U.S. PATENT DOCUMENTS

2013/0303203 A1  11/2013  Wang et al.
2015/0245309 A1  8/2015  Nayak et al.
(Continued)

FOREIGN PATENT DOCUMENTS

CN  1937839 A  3/2007
CN  103167610 A  6/2013
(Continued)

OTHER PUBLICATIONS

S2-1909466, Sony, Solution: Busy Indication as a paging response, SA WG2 Meeting #135, Oct. 14-18, 2019, Split, Kr, 5 pages.
(Continued)

*Primary Examiner* — Elisabeth Benoit Magloire
(74) *Attorney, Agent, or Firm* — WOMBLE BOND DICKINSON (US) LLP

(57) ABSTRACT

Communications method and apparatus are provided to resolve a problem of a loss of terminal data related to a service requirement of one card of a dual-card terminal with only one transmit chain when the other card of the terminal is in connected state. The method includes: when a first card is in a connected state and a second card is in a non-connected state, a communications apparatus determines that the second card can enter a connected state from a non-connected state.

20 Claims, 22 Drawing Sheets

(51) Int. Cl.
*H04W 28/02* (2009.01)
*H04W 68/00* (2009.01)
*H04W 76/20* (2018.01)

(56) References Cited

U.S. PATENT DOCUMENTS

| | | | |
|---|---|---|---|
| 2015/0381332 A1* | 12/2015 | Rysgaard | H04L 5/0057 455/558 |
| 2016/0381710 A1 | 12/2016 | Bansal et al. | |
| 2018/0160422 A1 | 6/2018 | Pathak et al. | |
| 2018/0376444 A1 | 12/2018 | Kim et al. | |
| 2019/0059067 A1 | 2/2019 | Lee et al. | |
| 2020/0128391 A1* | 4/2020 | Yun | H04W 8/186 |
| 2020/0267533 A1* | 8/2020 | Zhang | H04W 4/80 |
| 2021/0105866 A1* | 4/2021 | Kavuri | H04W 60/005 |
| 2023/0093965 A1* | 3/2023 | Velev | H04W 68/12 455/458 |

FOREIGN PATENT DOCUMENTS

| | | |
|---|---|---|
| CN | 103379468 A | 10/2013 |
| CN | 109315017 A | 2/2019 |
| CN | 110214462 A | 9/2019 |
| EP | 3914000 A1 | 11/2021 |
| JP | 2018537909 A | 12/2018 |

OTHER PUBLICATIONS

3GPP TS 23.501 V15.6.0 (Jun. 2019), 3rd Generation Partnership Project; Technical Specification Group Services and System Aspects; System Architecture for the 5G System;Stage 2(Release 15), 243 pages.

3GPP TR 23.761 V0.1.0 (Oct. 2019), 3rd Generation Partnership Project; Technical Specification Group Services and System Aspects;Study on system enablers for devices having multiple Universal Subscriber Identity Modules (USIM) (Release 17), 10 pages.

3GPP TS 24.501 V15.5.0 (Sep. 2019), 3rd Generation Partnership Project;Technical Specification Group Core Network and Terminals;Non-Access-Stratum (NAS) protocol for 5G System (5GS);Stage 3(Release 15), 480 pages.

3GPP Ts 36.413 V15.7.1 (Oct. 2019), 3rd Generation Partnership Project; Technical Specification Group Radio Access Network;Evolved Universal Terrestrial Radio Access Network(E-UTRAN);S1 Application Protocol (S1AP)(Release 15), 388 pages.

\* cited by examiner

COMMUNICATIONS METHOD AND APPARATUS FOR A DUAL-CARD TERMINAL

CROSS-REFERENCE TO RELATED APPLICATIONS

This application is a National Stage of International Application No. PCT/CN2020/123747, filed on Oct. 26, 2020, which claims priority to Chinese Patent Application No. 201911090557.8, filed with the China National Intellectual Property Administration on Nov. 8, 2019 and entitled "COMMUNICATIONS METHOD AND APPARATUS", both of which are incorporated herein by reference in their entireties.

TECHNICAL FIELD

Embodiments of this application relate to the field of communication technologies, and in particular, to a communications method and apparatus.

BACKGROUND

Some terminals can support dual-card application and are referred to as dual-card terminals. A dual-card terminal is a terminal simultaneously equipped with two telephone cards. The telephone card may be, for example, a subscriber identity module (SIM) card or a universal subscriber identity module (USIM) card. The dual-card terminal may register with networks through the two telephone cards.

The terminal sends data of the telephone card to the terminal through a transmit chain. This process may be understood as follows: After modulation and demodulation processing is performed on a baseband signal generated by the terminal, a radio frequency signal is generated, and the radio frequency signal is sent to a base station through antennas. Currently, in consideration of costs and power consumption, most dual-card terminals have only one transmit chain. Two telephone cards share and preempt one transmit chain (Tx chain). For example, the two telephone cards are denoted as a card 1 and a card 2. For a terminal with only one transmit chain, if the card 1 is in connected state and the card 2 is in non-connected state, when the card 2 is to actively initiate a service or the card 2 receives paging from a network, the card 2 may enter a connected state, and the card 2 is to preempt the transmit chain. In this case, if the card 2 successfully preempts the transmit chain, a connection of the card 1 is disconnected and the card 1 enters a non-connected state. However, the base station does not know that the connection of the card 1 is disconnected, and continues sending data of the card 1 to the terminal. Consequently, the data of the card 1 is lost, and user experience is affected.

SUMMARY

Embodiments of this application provide a communications method and apparatus, to resolve a problem of a loss of terminal data caused when one SIM card of a dual-card terminal with one transmit chain is in connected state and the other SIM card has a service requirement.

The technical solutions provided in embodiments of this application are as follows:

According to a first aspect, a communications method is provided. The method is performed by a communications apparatus and a first device. The communications apparatus may be a terminal, and the communications apparatus includes/supports a SIM1 and a SIM2. The first device may be an access network device or a core network device serving the terminal. The method includes the following procedure: The first device serves the SIM1 of the communications apparatus, and when the SIM1 is in connected state, the communications apparatus determines that the SIM2 is to enter a connected state from a non-connected state. The communications apparatus sends first information to the first device through the SIM1. The first device receives the first information from the communications apparatus. The first information indicates to stop sending a SIM1 paging message to the communications apparatus, or the first information includes or indicates a condition in which sending a SIM1 paging message to the communications apparatus is allowed.

The communications apparatus sends the first information to the first device. The first information indicates to stop sending a SIM1 paging message to the communications apparatus. The first device or a second device may learn, based on the first information, that a connection of the SIM1 is disconnected, and therefore does not continue sending data of the SIM1 to the communications apparatus. This can avoid a data loss caused because the first device continues sending data when the connection of the SIM1 is disconnected. In addition, the first device or the second device does not send a SIM1 paging message to the communications apparatus, to save network resources, and prevent the SIM1 from preempting a transmit chain after the communications apparatus receives a SIM1 paging message, that is, prevent a service of the SIM card 2 from being affected by preempting the transmit chain. This ensures that the SIM2 can normally perform a service.

In a possible design, the first information may indicate how the first device sends a paging message for the SIM card 1, or may indicate how the second device sends a paging message for the SIM1. The second device is a device different from the first device. If the first information indicates a paging manner of the second device, after receiving the first information, the first device further may continue sending the first information upwards to notify the second device.

For example, the first information may indicate how the first device sends a paging message for the SIM1. The first information indicates the first device to stop sending a SIM1 paging message to the communications apparatus, or the first information includes or indicates a condition in which the first device is allowed to send a SIM1 paging message to the communications apparatus. The first device stops, based on the first information, sending a SIM1 paging message to the communications apparatus, or determines, based on the first information, the condition in which sending a SIM1 paging message to the communications apparatus is allowed.

In a possible design, the first information indicates the second device to stop sending a SIM1 paging message to the communications apparatus, or the first information includes or indicates a condition in which the second device is allowed to send a SIM1 paging message to the communications apparatus. The first device sends second information to the second device. The second information indicates the second device to stop sending a SIM1 paging message to the communications apparatus, or the second information includes or indicates the condition in which the second device is allowed to send a SIM1 paging message to the communications apparatus.

Then, if the second device receives the second information from the first device, the second device determines, based on the second information, whether sending a paging message to the SIM1 allowed, or determines a condition in which paging the SIM1 is allowed. An execution manner is similar to that for the first device. Mutual reference may be made between the two devices, and details are not described again.

A network side is indicated to stop paging the SIM1 or is notified of a condition in which paging the SIM1 is allowed. This can avoid impact on a service of the SIM2, and can avoid a data loss caused because the SIM1 cannot receive data in non-connected state, to reduce overheads for paging the SIM1 on the network side.

In a possible design, the first information includes or indicates the condition in which the first device or the second device is allowed to send a SIM1 paging message to the communications apparatus. The first information includes or indicates: information about a service that allows the first device or the second device to send a SIM1 paging message to the communications apparatus; or information about a PDU session that allows the first device or the second device to send a SIM1 paging message to the communications apparatus; or information about a QoS flow that allows the first device or the second device to send a SIM1 paging message to the communications apparatus; or information about a service that triggers the SIM2 to enter a connected state; or information about a PDU session that triggers the SIM2 to enter a connected state; or information about a QoS flow that triggers the SIM2 to enter a connected state.

For example, the communications apparatus may indicate a first service, a first PDU session, or a first QoS flow to the first device, to indicate a service/PDU session/QoS flow of the SIM1 for which the network side is allowed to send a paging message to the communications apparatus. Alternatively, the communications apparatus may indicate a second service, a second PDU session, or a second QoS flow to the first device, and the network side determines, based on the second service, the second PDU session, or the second QoS flow, a service/PDU session/QoS flow of the SIM1 for which a paging message can be sent to the communications apparatus.

In a possible design, the information about a service that allows sending a SIM1 paging message to the communications apparatus includes: a type of a service that allows sending a SIM1 paging message to the communications apparatus; or a priority of a service that allows sending a SIM1 paging message to the communications apparatus; or a lowest priority of services that allow sending a SIM1 paging message to the communications apparatus.

In a possible design, the information about a PDU session that allows sending a SIM1 paging message to the communications apparatus includes: description information used to describe a PDU session that allows sending a SIM1 paging message to the communications apparatus; or a priority of a PDU session that allows sending a SIM1 paging message to the communications apparatus; or a lowest priority of PDU sessions that allow sending a SIM1 paging message to the communications apparatus.

In a possible design, the information about a service that allows sending a SIM1 paging message to the communications apparatus includes: description information used to describe a quality of service QoS flow that allows sending a SIM1 paging message to the communications apparatus; or a QoS priority of a QoS flow that allows sending a SIM1 paging message to the communications apparatus; or a lowest priority of QoS flows that allow sending a SIM1 paging message to the communications apparatus.

According to the design of the priority related solution in the foregoing several possible designs, overheads of paging the SIM1 by the network side can be reduced. In addition, when a service of the SIM1 is important or has a high priority, paging the SIM1 can be restored in time, to ensure smooth running of an important service of the SIM1.

In a possible design, a service that triggers the SIM2 to enter a connected state is an emergency call service or a location update service, and the first information indicates the first device or a second device to stop sending a SIM1 paging message to the communications apparatus.

In a possible design, the method further includes: The communications apparatus receives a first paging message for paging the SIM2, where the first paging message includes or indicates information about the service that triggers the SIM2 to enter a connected state. The communications apparatus determines the first information based on the information about the service that triggers the SIM2 to enter a connected state. For example, the communications apparatus determines content of the first information based on a priority of the service that triggers the SIM2 to enter a connected state.

In a possible design, the method further includes: The communications apparatus receives, from the first device, a second paging message for paging the SIM2. The communications apparatus enables the SIM2 to enter a connected state. The communications apparatus determines information about the service that triggers the SIM2 to enter a connected state. The communications apparatus determines the first information based on the information about the service that triggers the SIM2 to enter a connected state. The SIM2 is temporarily enabled to enter a connected state, to learn of the service that triggers the SIM2 to enter a connected state, so as to determine the first information.

In a possible design, that the communications apparatus enables the SIM2 to enter a connected state includes: The communications apparatus sends, through the SIM1, a request message to an access network device serving the SIM1, where the request message is used to request to suspend scheduling a slot of the SIM1. The communications apparatus is connected, in the slot through the SIM2, to an access network device serving the SIM2. Scheduling suspension is requested from the access network device, so that the network side is notified that the SIM1 of the communications apparatus only leaves temporarily, and the network side may reserve data that is to be sent to the SIM1, and does not send the data to the SIM1 in a gap, to reduce overheads.

In a possible design, that the communications apparatus sends first information to a first device through the SIM1 includes: The communications apparatus determines that a priority of the service that triggers the SIM2 to enter a connected state is higher than a priority of a service performed when the SIM1 is in connected state. The communications apparatus sends the first information to the first device through the SIM1. If the priority of the service that triggers the SIM2 to enter a connected state is lower than or not higher than the priority of the service performed when the SIM1 is in connected state, the communications apparatus may select to continue to perform a service of the SIM1. In this way, a preferred service can be correctly selected when services of the SIM1 and the SIM2 conflict, to improve user experience.

In a possible design, the first information includes information about a timer, and the information about the timer indicates duration in which the first device or the second device stops sending a SIM1 paging message to the communications apparatus, or indicates duration in which sending a paging message meeting the condition to the communications apparatus is allowed. The timer is designed, to effectively coordinate using of a transmit chain by the two cards. After the timer expires, a service of the SIM1 is performed in time, and normal paging of the SIM1 is resumed.

In a possible design, the method further includes: The communications apparatus receives second information sent by the first device or the second device, where the second information indicates to change the SIM1 to anon-connected state. The communications apparatus enables, based on the second information, the SIM2 to enter a connected state.

In a possible design, the method further includes: If the communications apparatus determines that the SIM2 is switched from a connected state to a non-connected state, or the communications apparatus determines that the service that triggers the SIM2 to enter a connected state ends, the communications apparatus sends third information to the first device through the SIM1, where the third information indicates that the first device or the second device is allowed to send a paging message to the SIM1. According to an indication of the third information, using of a transmit chain by the two cards can be effectively coordinated. After the third information is received, a service of the SIM1 is performed in time, and normal paging of the SIM1 is resumed.

In a possible design, that the communications apparatus sends first information to a first device through the SIM1 includes: The communications apparatus sends, through the SIM1, an RRC message to an access network device serving the communications apparatus, where the RRC message carries the first information. For example, the RRC message may be an RRC suspend message or an RRC release message. A suspend or release action is performed by using an RRC suspend or release message. An advantage of this solution is that information indication can be performed when a connection of the SIM1 is released, to shorten a time for the communications apparatus to respond to a service requirement of the SIM2.

Alternatively, the communications apparatus sends, through the SIM1, a non-access stratum (NAS) message to a core network device serving the communications apparatus, where the first NAS message carries the first information.

In a possible design, the first information includes information about a timer. The method further includes: before the timer expires, stopping sending a SIM1 paging message to the communications apparatus, or sending a paging message meeting the condition to the communications apparatus. The timer is designed, to effectively coordinate using of a transmit chain by the two cards. After the timer expires, a service of the SIM1 is performed in time, and normal paging of the SIM1 is resumed.

In a possible design, the method further includes: sending second information to the communications apparatus, where the second information indicates to change the SIM1 to a non-connected state, and indicates the communications apparatus to enable the SIM2 to enter a connected state.

In a possible design, the first device is an access network device, and the receiving first information from the communications apparatus includes: receiving an RRC message from the communications apparatus, where the RRC message carries the first information. Alternatively, the first device is a core network device, and the receiving first information from the communications apparatus includes: receiving a NAS message from the communications apparatus, where the NAS message carries the first information.

In a possible design, the RRC message is a user equipment assistance information message; or the RRC message is a release message requested by user equipment; or the RRC message is a suspend message requested by user equipment.

In a possible design, the NAS message is a registration message; or the NAS message is an uplink transport message; or the NAS message is a PDU session modification message.

In some embodiments, the first device may be an AMF. An advantage of performing control by the AMF is that there are few procedures, and signaling overheads are reduced.

In some embodiments, the first device may be an SMF. An advantage of performing control by the SMF is that the SMF can sense a service status, and no additional function is required.

In some embodiments, the first device may be an access network device, and an advantage of performing control by the access network device is that a core network entity does not need to be modified.

According to a second aspect, a communications apparatus is provided. The communications apparatus may be a terminal, an apparatus (for example, a chip, a chip system, or a circuit) in the terminal, or an apparatus that can be used in cooperation with the terminal. In a design, the apparatus may include modules that one-to-one correspond to the methods/operations/steps/actions performed by the terminal in the first aspect. The modules may be implemented by a hardware circuit, software, or a combination of a hardware circuit and software. The communications apparatus may include a processing module, a first communications module SIM1, and a second communications module SIM2. The processing module is configured to invoke the first communications module SIM1 or the second communications module SIM2 to perform a receiving and/or sending function.

For example,
the processing module is configured to determine that when the SIM1 is in connected state, the SIM2 may enter a connected state from a non-connected state; and
the processing module is further configured to send first information to a first device through the first communications module, where the first information indicates to stop sending, to the terminal, a paging message for paging the first card, or the first information includes or indicates a condition in which sending, to the terminal, a paging message for paging the first card is allowed.

In some embodiments, the processing module in the apparatus may further perform another method performed by the terminal in the first aspect. Details are not described herein again.

According to a third aspect, an apparatus is provided. The apparatus may be a network device, or an apparatus (for example, a chip, a chip system, or a circuit) in the network device, or an apparatus that can be used in cooperation with the network device. For example, the network device is a first device. In a design, the apparatus may include modules that one-to-one correspond to the methods/operations/steps/actions performed by the first device in the first aspect. The modules may be implemented by a hardware circuit, software, or a combination of a hardware circuit and software.

A processing module is configured to serve a first card of a terminal, where the terminal includes the first card and a second card.

A communications module is configured to receive first information from the terminal, where the first information indicates the first device or a second device to stop sending, to the terminal, a paging message for paging the first card, or the first information includes or indicates a condition in which the first device or a second device is allowed to send, to the terminal, a paging message for paging the first card.

In some embodiments, the communications module and the processing module in the communications apparatus may further perform another method performed by the first device in the first aspect. Details are not described herein again.

According to a fourth aspect, embodiments of this application provide a communications apparatus. The communications apparatus supports installation of at least two SIM cards, and the communications apparatus includes a memory and a processor. The memory is configured to store instructions, and the processor is configured to communicate with another device through the first communications module or the second communications module, for example, receive and send data or signals. The another device may be a network device. The processor is configured to invoke a group of programs, instructions, or data to perform the method performed by the terminal in the first aspect. The memory may be coupled to the processor, and when executing the instructions or data stored in the memory, the processor can implement the method performed by the terminal in the first aspect.

According to a fifth aspect, embodiments of this application provide a communications apparatus. The apparatus includes a memory and a processor, the memory stores instructions, and the processor is configured to execute the instructions, so that the communications apparatus performs the method performed by the network device in the first aspect. The apparatus may further include the memory, configured to store a program, instructions, or data invoked by the processor. The memory is coupled to the processor, and when executing the instructions or data stored in the memory, the processor can implement the method performed by the first device in the first aspect.

According to a sixth aspect, embodiments of this application further provide a computer-readable storage medium. The computer storage medium stores computer-readable instructions, and when the computer-readable instructions are run on a computer, the computer is enabled to perform the method according to any one of the first aspect or the possible designs of the first aspect.

According to a seventh aspect, a computer program product including instructions is provided. When the computer program product is run on a computer, the computer is enabled to perform the method according to any one of the first aspect and the possible designs of the first aspect.

According to an eighth aspect, embodiments of this application provide a chip system. The chip system includes a processor, and may further include a memory, configured to implement the method according to any one of the first aspect or the possible designs of the first aspect. The chip system may include a chip, or may include a chip and another discrete device.

According to a ninth aspect, embodiments of this application provide a system. The system includes a terminal and a first device, and the terminal and the first device perform the corresponding method in the first aspect.

DESCRIPTION OF EMBODIMENTS

Embodiments of this application provide a communications method and an apparatus, which may be used in a dual-card single-chain terminal, to avoid a data loss of one card of the terminal when the other card enters a connected state. The method and the apparatus are based on a same concept. Because a problem-resolving principle of the method is similar to that of the apparatus, mutual reference may be made to implementations of the apparatus and the method. Repeated parts are not described in detail. In descriptions of embodiments of this application, the term "and/or" describes an association relationship between associated objects and indicates that three relationships may exist. For example, A and/or B may indicate the following three cases: Only A exists, both A and B exist, and only B exists. The character "/" generally represents an "or" relationship between the associated objects. In this application, "at least one" means one or more, and "a plurality of" means two or more. In addition, it should be understood that, in the descriptions of this application, the terms such as "first", "second", and "third" are merely used for distinguishing and description, but cannot be understood as an indication or implication of relative importance or an indication or implication of an order.

The communications method provided in embodiments of this application may be used in a 5th generation (5G) communications system, for example, 5G new radio (NR), or may be used in various future communications systems.

The following describes in detail embodiments of this application with reference to the accompanying drawings.

Figure 1:
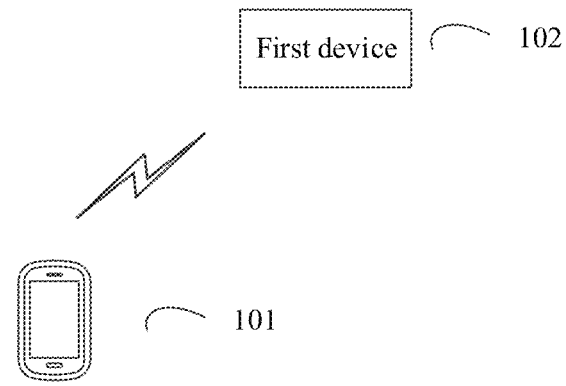
FIG. 1 is a schematic diagram 1 of an architecture of a communications system according to an embodiment of this application.

FIG. 1 shows an architecture of a possible communications system to which a communications method is applicable according to an embodiment of this application. The communications system may include a terminal 101 and a first device 102. The first device 102 may be an access network device, or may be a core network device.

The first device or the terminal may be hardware, or may be software obtained through function division, or a combination of hardware and software. In addition, the first device may communicate with the terminal through another device or network element. The first device 102 may send downlink data to the terminal 101, and may also receive uplink data sent by the terminal 101. Certainly, the terminal 101 may also send uplink data to the first device 102, and may also receive downlink data sent by the first device 102.

The first device 102 may be an access network device. The access network device is a node in a radio access network (RAN), and may also be referred to as a base station or a RAN node (or device). Currently, for example, the access network device 101 is a gNB/an NR-NB, a transmission reception point (TRP), an evolved NodeB (eNB), a radio network controller (RNC), a NodeB (NB), a base station controller (BSC), a base transceiver station (BTS), a home base station (for example, a home evolved NodeB or a home NodeB, HNB), a baseband unit (BBU), a wireless fidelity (Wi-Fi) access point (AP), a network side device in a 5G communications system, or a network device in a possible future communications system.

Alternatively, the first device 102 may be a core network device. For example, the first device 102 is an authentication management function (AMF), and the AMF is used for an access and mobility management function. Alternatively, the first device 102 is a mobility management entity (MME), and the MME is used for an access and mobility management function.

Figure 2:
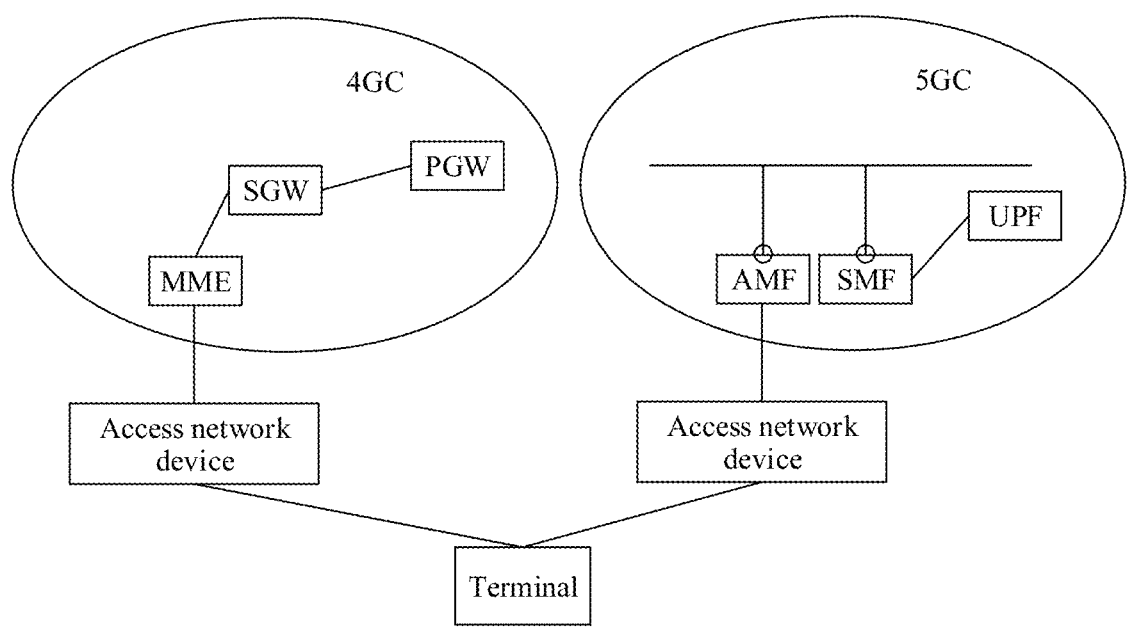
FIG. 2 is a schematic diagram 2 of an architecture of a communications system according to an embodiment of this application.

The communications system may further include some other devices in a core network. A core network in 5G is represented by a 5G core network (5GC), and a core network in 4G is represented by a 4G core network (4GC). The 5GC includes one or more network functions (NF), and the NF may also be referred to as a network function entity or a network function network element. The 5GC may further include a session management function (SMF) and a user plane function (UPF). The SMF is configured to manage a protocol data unit (PDU) session of a user and a quality of service (QoS) flow in the PDU session. The UPF is configured to send data for a user. The 4GC includes one or more network functions (NF), and the NF may also be referred to as a network function entity or a network function network element. The 4GC may further include a public data network (PDN) gateway (PGW) and a serving gateway (SGW). The PGW and the SGW are configured to set up a PDN connection of a user and an evolved packet system (EPS) bearer, and send user data. Based on the descriptions of the terminal, the access network device, and the core network device, and based on the architecture of the communications system shown in FIG. 1, as shown in FIG. 2, embodiments of this application provide a possible communications system, including a terminal, an access network device, and some NFs in the 5GC or some NFs in the 4GC.

In embodiments of this application, on a basis that the communications system includes a terminal and a first device, if the first device is an access network device, the communications system may further include a second device. The second device may be an NF in 5GC, such as the AMF, the SMF, or the UPF in the foregoing example; or the second device may be an NF in 4GC, such as the MME, the SGW, or the PGW in the foregoing example. When the first device is an AMF, the second device included in the communications system may be an SMF or a UPF. Alternatively, when the first device is an MME, the second device included in the communications system may be an SGW or a PGW.

The terminal 101 may also be referred to as user equipment (UE), a mobile station (MS), a mobile terminal (MT), or the like, and is a device that provides a user with voice or data connectivity, or may be an internet of things device. For example, the terminal device 101 includes a handheld device with a wireless connection function, or a vehicle-mounted device. Currently, the terminal device 101 may be a mobile phone, a tablet computer, a notebook computer, a palmtop computer, a mobile internet device (MID), a wearable device (for example, a smartwatch, a smart band, or a pedometer), a vehicle-mounted device (for example, a vehicle-mounted device on an automobile, a bicycle, an electric vehicle, an aircraft, a ship, a train, or a high-speed train), a virtual reality (VR) device, an augmented reality (AR) device, a wireless terminal in industrial control, a smart home device (for example, a refrigerator, a television, an air conditioner, or an electricity meter), an intelligent robot, a workshop device, a wireless terminal in self-driving, a wireless terminal in remote medical surgery, a wireless terminal in a smart grid, a wireless terminal in transportation safety, a wireless terminal in a smart city, a wireless terminal in a smart home, a flight device (for example, an intelligent robot, a hot balloon, an unmanned aerial vehicle, or an aircraft), or the like.

In embodiments of this application, the terminal may have a plurality of cards. An example in which the terminal has two cards is used for description in this specification. The two cards may be represented by a first card and a second card, namely, subscriber identity module (SIM) cards, and are usually referred to as "SIM cards". The SIM card is a smart card mainly used to store subscriber identity data, SMS message data, and a phone number. The SIM card may be used in a GSM network, a TD-SCDMA network, or the like, and may also be used in an IDEN telephone. The SIM card may further include a USIM card, an embedded SIM (eSIM), a soft SIM, or the like. A dual-card terminal has two communications modules that support two SIM cards, so that a first card and a second card each can register with a network and communicate with the network. In a dual-standby scenario, both the first card and the second card of the dual-card terminal can receive paging from a network side. If the dual-card dual-standby terminal supports dual pass, the terminal has two transmit chains. The first card may communicate with the network side through a first transmit chain, and the second card may communicate with the network side through a second transmit chain. However, some terminals do not support dual pass due to a cost limitation. In embodiments of this application, a method is designed for a dual-card dual-standby single-pass terminal or a dual-card single-standby single-pass terminal.

Figure 3A:
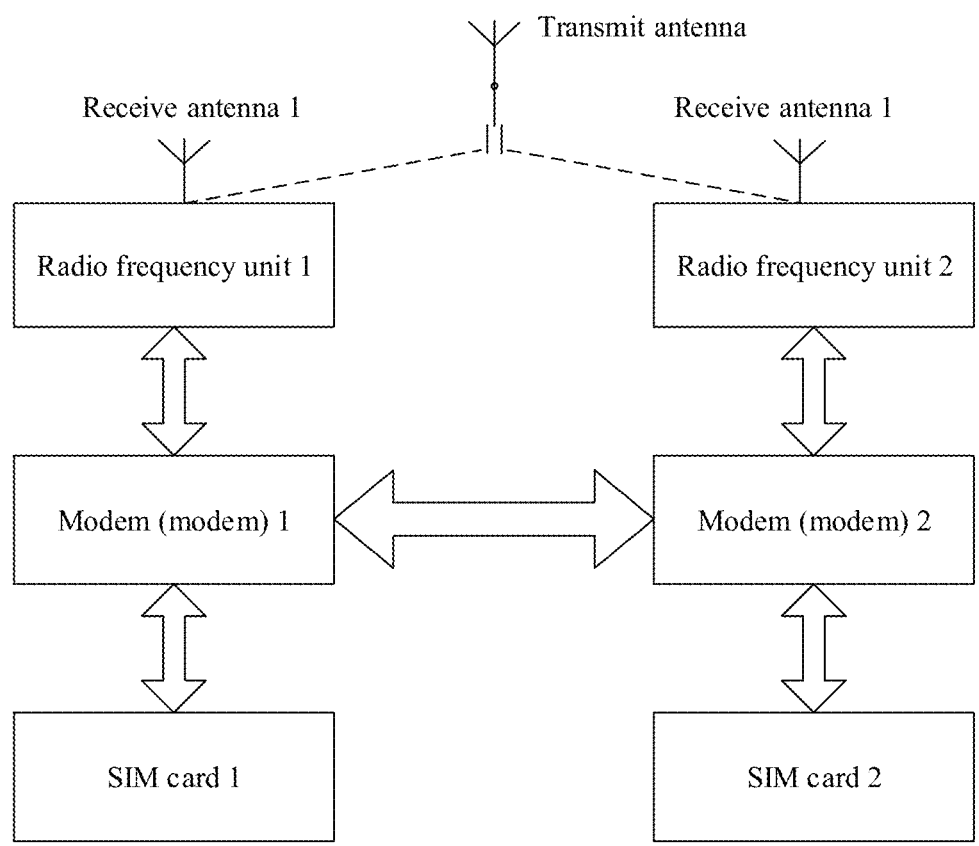
FIG. 3a is a schematic diagram of a structure of a dual-card terminal according to an embodiment of this application.

FIG. 3a is a schematic diagram of a structure of the dual-card terminal. The first card is represented by a SIM card 1, and the second card is represented by a SIM card 2. The terminal has two communications modules that support the SIM card 1 (also referred to as SIM1) and the SIM card 2 (also referred to as SIM2) in communicating with a network. In some embodiments, the communications module may alternatively be a circuit or a chip that includes a modem. The communications module communicates with a network device through components such as a radio frequency unit and an antenna. The communications module may alternatively include a modem and a radio frequency unit. The communications module obtains information such as subscriber identity data from a corresponding SIM card, and communicates with a corresponding network device by using the information. The SIM card 1 is connected to a modem 1, and the modem 1 is connected to a radio frequency unit 1. A second communications module includes a modem 2 and a radio frequency unit 2, the SIM card 2 is connected to the modem 2, and the modem 2 is connected to a radio frequency unit 2. The modem 1 modulates and demodulates a baseband signal of the terminal generated by the first communications module, to generate a demodulated signal. The radio frequency unit 1 generates a radio frequency signal by using the demodulated signal, and sends the radio frequency signal through an antenna. The modem 2 modulates and demodulates a baseband signal of the terminal generated by the SIM2, to generate a demodulated signal. The radio frequency unit 2 generates a radio frequency signal by using the demodulated signal for sending. The radio frequency unit may be referred to as a radio frequency chip. The single-pass means that the terminal has only one uplink transmit chain or only one uplink transmit antenna. When the SIM card 1 sends a radio signal to a base station through the radio frequency chip connected to the modem 1, the SIM card 2 cannot send a signal through the uplink transmit chain. On the contrary, if the SIM2 performs service communication, the SIM1 cannot perform service communication. The service communication includes making a call, accessing the internet, and the like.

In this specification, the SIM1 may be understood as a communications module of the terminal corresponding to the SIM card 1. That the SIM1 is in or enters a connected state may be understood as: The terminal is connected to a corresponding network device by using identification information of the SIM card 1, to perform corresponding service communication. Paging the SIM1 by the network device may be understood as a process in which the network device sends paging to a corresponding communications module of the terminal by using an identifier corresponding to the SIM card 1. This is similar for the SIM1, and details are not described again.

With reference to FIG. 3a, a process in which the terminal communicates with the network device through the SIM1 includes: The modem 1 obtains information such as a user identity from the SIM card 1, and establishes communication with the network device by using the information. After generating data, the modem 1 sends the data to the network device (for example, a base station) through the transmit antenna and the radio frequency unit 1. Correspondingly, after receiving data from the network device (for example, the base station), a receive antenna 1 sends the data to the modem 1 through the radio frequency unit 1, and the modem 1 processes the data. The same rule applies to the SIM2.

Specifically, the terminal has two modules, and supports installation of the SIM card 1 and the SIM card 2. The SIM card 1 is connected to the modem 1, the modem 1 is connected to the radio frequency unit 1, and the radio frequency unit 1 is connected to the receive antenna 1. The SIM card 2 is connected to the modem 2, the modem 2 is connected to the radio frequency unit 2 connected to a receive antenna 2. The two SIMs share a same transmit antenna. Because the transmit antenna is shared, the two SIMs share a same transmit chain. At a same moment, only one SIM can occupy the transmit chain to send data.

Embodiments of this application are based on an initial scenario in which the SIM1 is in connected state and the SIM2 is in non-connected state. When the SIM2 is to enter a connected state from a non-connected state, the terminal and the first device perform operations, so that a network side performs paging according to the method in this application, to avoid a loss of service data of the SIM1. The SIM1 being in connected state may be understood as: The terminal may set up a communication channel to the base station as the first card, the SIM card 1. For example, the terminal sets up a radio resource control (RRC) connection to the base station. In addition, the terminal may receive data or signaling from or send data or signaling to the network side as the first card, the SIM card 1. The SIM2 being in non-connected state may be understood as: The terminal sets up no communication channel to the base station as the second card. The non-connected state may include an idle state or an inactive state. The SIM2 being in non-connected state may alternatively be understood as: The terminal cannot send signaling or data to the network side as the second card, and cannot receive signaling or data from the network side as the second card.

There are a plurality of possible reasons why the SIM2 may enter a connected state from a non-connected state. The SIM2 may actively enter a connected state. For example, the terminal may need to initiate a service through the SIM2. Alternatively, the SIM2 may passively enter a connected state. For example, the terminal may receive a SIM2 paging message from the network side. That the terminal initiates the service through the SIM2 may be understood as: The terminal initiates the service as the SIM2. That the terminal receives a SIM2 paging message from the network side may be understood as: The terminal receives the paging message from the network side, where the paging message is used to page an identity corresponding to the SIM2. The identity of the SIM2 includes an international mobile subscriber identity (IMSI) and a temporary identifier corresponding to the IMSI, for example, a globally unique temporary UE identity (GUTI), a cell-radio network temporary identifier (C-RNTI), and a serving-temporary mobile subscriber identity (S-TMSI). With reference to FIG. 3a, that the terminal initiates a service through the SIM2 includes: The terminal generates, by using the modem 2 corresponding to the SIM2, a request message sent to the network, and sends the request message to the network through the radio frequency chip (the radio frequency unit 2) corresponding to the modem 2. That the terminal receives a SIM2 paging message from the network side includes: The terminal receives the paging message by using the radio frequency unit 2 corresponding to the modem 2, and the modem 2 determines that an identifier in the paging message matches the identity corresponding to the SIM2, so that the modem 2 determines that the paging message is used to page the SIM2.

Figure 3B:
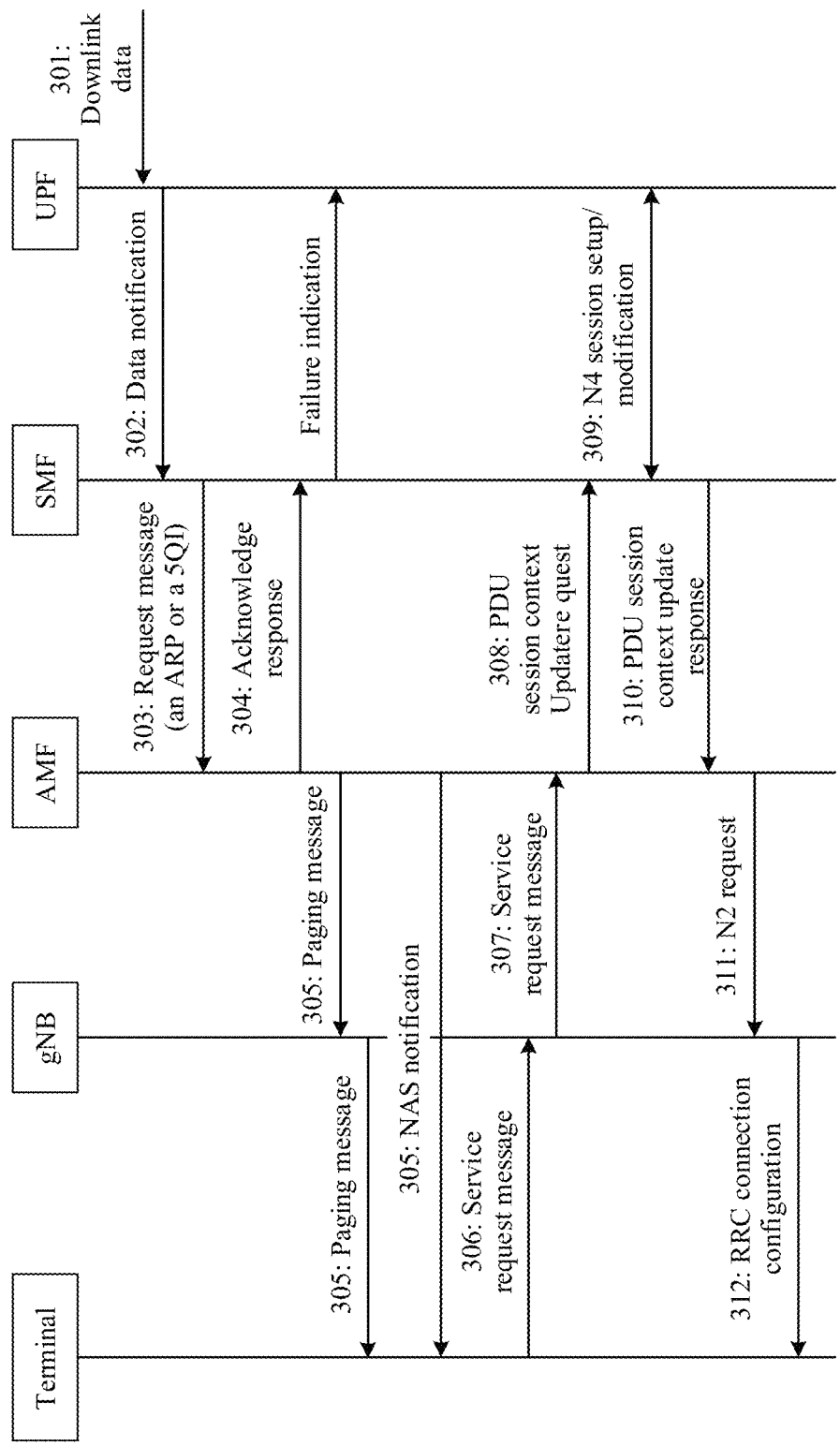
FIG. 3b is a schematic flowchart of a SIM2 paging method according to an embodiment of this application.

In an embodiment, when downlink data of the SIM2 arrives at the network side, the SIM2 may be paged based on the following method shown in FIG. 3b.

S301: A UPF receives the downlink data of the SIM2 sent to the terminal.

S302: The UPF sends a data notification message to an SMF when determining that a data channel corresponding to the downlink data does not exist.

If the SMF determines that the terminal cannot be paged, the SMF sends a failure message to the UPF.

S303: The SMF sends a request to an AMF, where the request carries an allocation/retention priority (ARP) or a 5G quality of service identifier (5QI) corresponding to a data service.

S304: The AMF sends an acknowledgment response to the SMF, to be specific, notifies the SMF that a message sent by the SMF is received.

S305: If the SIM2 of the terminal is in non-connected state, the AMF sends a paging message to the terminal through a base station (gNB).

If the terminal is in connected state, the AMF sends a notification message to the terminal by using a NAS message.

S306: After receiving the paging message or the notification message, the terminal sends a service request message to the AMF by using an RRC message.

In this operation, the terminal sends the service request message to the AMF through the SIM2. It may be understood that if the SIM1 is originally in connected state, the SIM2 has preempted a transmit chain.

S307: The gNB forwards the service request message to the AMF.

S308: The AMF sends a PDU session context update request message to the SMF.

S309: The SMF performs an N4 session setup or modification procedure with a UPF.

S310: The SMF sends a PDU session context update response message to the AMF.

S308 to S310 are used to set up a connection between the UPF and the base station.

S311: The AMF sends a request (N2 request) to the base station, to set up a connection between the UPF and the base station.

S312: The base station performs RRC connection configuration on the terminal.

In this way, a connection to the SIM2 of the terminal is set up, so that the SIM2 is in connected state. The terminal may receive and send data based on the SIM2.

Based on the procedure shown in FIG. 3a, if the SIM1 is in connected state, once downlink data of the SIM2 arrives, the network side pages the SIM2. After a connection to the SIM2 is set up, the SIM1 cannot use the transmit chain. Similarly, if data of the SIM1 arrives, a similar process is performed. As a result, the transmit chain is switched between the SIM1 and the SIM2.

Based on the foregoing description, this application provides an embodiment. In this embodiment, the terminal includes the SIM1 and the SIM2, and the terminal is a dual-card dual-standby single-pass terminal or a dual-card single-standby single-pass terminal.

Figure 4:
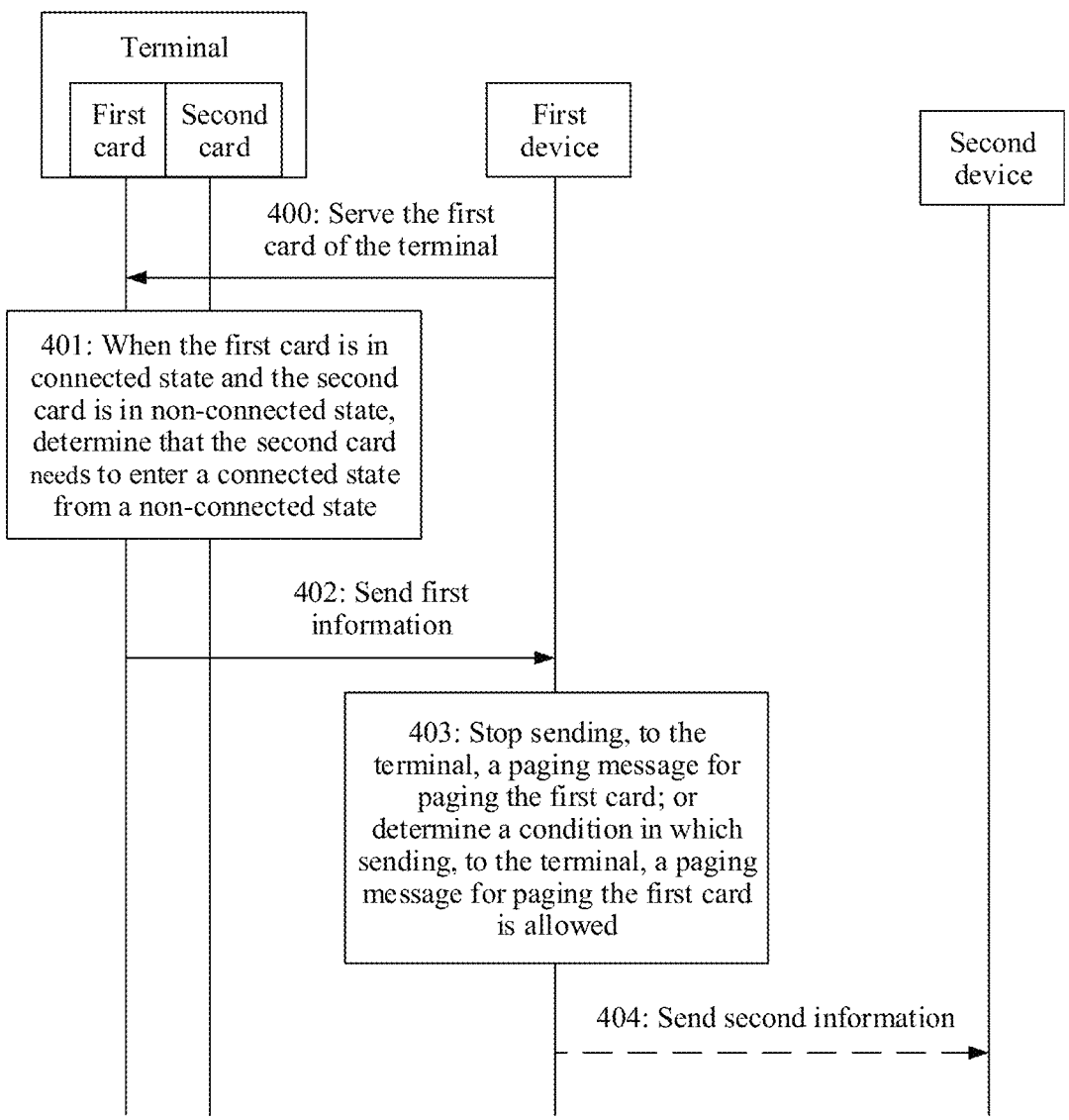
FIG. 4 is a schematic flowchart 1 of a communications method according to an embodiment of this application.

With reference to FIG. 4, the method in this embodiment includes the following operations.

S400: A first device serves the SIM1 of the terminal.

S401: The terminal determines that the SIM1 is in connected state, and the SIM2 may enter a connected state from a non-connected state.

S402: The terminal sends first information to the first device through the SIM1, and the first device receives the first information from the terminal.

The first information may include or indicate different content. For example, the first information indicates to stop sending a SIM1 paging message to the terminal.

Alternatively, the first information includes or indicates a condition in which sending a SIM1 paging message to the terminal is allowed.

Alternatively, the first information indicates the first device or a second device to stop sending a SIM1 paging message to the terminal.

Alternatively, the first information includes or indicates a condition in which the first device or a second device is allowed to send a SIM1 paging message to the terminal.

There may be two cases in which the terminal sends the first information to the first device through the SIM1.

The terminal sends the first information to the first device through the SIM1. The first information indicates the first device to stop sending a SIM1 paging message to the terminal, or the first information includes or indicates a condition in which the first device is allowed to send a SIM1 paging message to the terminal.

The terminal sends the first information from the SIM1 to the second device through the first device. The first information indicates the second device to stop sending a SIM1 paging message to the terminal, or the first information includes or indicates a condition in which the second device is allowed to send a SIM1 paging message to the terminal.

In this embodiment of this application, that the first information indicates the first device or the second device to stop sending a SIM1 paging message to the terminal may be understood as two meanings: The first information may directly indicate the first device or the second device to stop sending a SIM1 paging message to the terminal. Alternatively, the first device or the second device may determine, based on the first information, to stop sending a SIM1 paging message to the terminal.

In this embodiment of this application, stopping sending a SIM1 paging message to the terminal may also be understood as stopping triggering another device to send a SIM1 paging message to the terminal. For example, if the first information indicates an SMF to stop sending a SIM1 paging message to the terminal, it may be understood as: The first information indicates the SMF to stop triggering an AMF to send a SIM1 paging message to the terminal. The understanding of the SIM2 is similar. Stopping sending a SIM2 paging message to the terminal may also be understood as stopping triggering another device to send a SIM2 paging message to the terminal. To be specific, when the SMF receives a data notification or downlink data sent by a UPF, the SMF locally blocks the data notification or the downlink data, and does not send, to the AMF, a message for triggering the AMF to page UE. If the first information indicates the UPF to stop sending a SIM1 paging message to the terminal, it may be understood as: The first information indicates the UPF to stop triggering, by using the SMF, the AMF to send a SIM1 paging message to the terminal. To be specific, when the UPF receives downlink data sent to the SIM1, the UPF locally blocks the downlink data and does not send a message or data to the SMF.

In this embodiment of this application, the condition in which sending a SIM1 paging message to the terminal is allowed may also be understood as a condition in which triggering another device to send a SIM1 paging message to the terminal is allowed. For example, if the first information indicates a condition in which the SMF is allowed to send a SIM1 paging message to the terminal, it may be understood as: The first information indicates a condition in which the SMF is allowed to trigger the AMF to send a SIM1 paging message to the terminal. To be specific, if the SMF receives a data notification or downlink data sent by the UPF, the SMF performs determining. If the condition is not met, the SMF blocks the data notification or the downlink data, and does not send, to the AMF, a message for triggering the AMF to page UE. If the first information indicates a condition in which the UPF is allowed to trigger, by using the SMF, the AMF to send a SIM1 paging message to the terminal, to be specific, when the UPF receives downlink data sent to the SIM1, if the condition is not met, the UPF blocks the downlink data, and does not send a message or data to the SMF. The understanding of the SIM2 is similar. The condition in which sending a SIM2 paging message to the terminal is allowed may also be understood as a condition in which triggering another device to send a SIM2 paging message to the terminal is allowed.

In this embodiment of this application, "include or indicate" is descriptions of two functions of information or a message. For example, the first information includes or indicates the condition in which the first device or the second device is allowed to send a SIM1 paging message to the terminal. That the first information includes the condition in which the first device or the second device is allowed to send a SIM1 paging message to the terminal means that the first information provides content used by the first device or the second device to determine the condition, and the first device or the second device may determine the condition based on the first information. That the first information indicates the condition in which the first device or the second device is allowed to send a SIM1 paging message to the terminal means that the first information directly indicates the condition, and the first device and the second device may directly obtain the condition from the first information.

In some embodiments, the first information may be information for enabling or activating (active) a mobile initiated connection only (MICO) mode, or information for enabling or activating (active) a power saving mode (PSM).

In some embodiments, when determining that the SIM2 is to enter a connected state from a non-connected state, the terminal may first determine whether to send the first information. For example, the terminal may compare, based on importance degrees or priorities of services, a service that triggers the SIM2 to enter a connected state with a service that triggers the SIM1 to enter a connected state. If a priority of the service that triggers the SIM2 to enter a connected state is higher than or not lower than a priority of the service that triggers the SIM1 to enter a connected state, the terminal determines to send the first information.

After receiving the first information from the terminal, the first device may perform S403 or S404 based on different content included or indicated by the first information. If the first information indicates the first device to stop sending a SIM1 paging message to the terminal, or the first information includes or indicates a condition in which the first device is allowed to send a SIM1 paging message to the terminal, S403 is performed; otherwise, S404 is performed.

S403: If the first information indicates the first device to stop sending a SIM1 paging message to the terminal, the first device stops, based on the first information, sending a SIM1 paging message to the terminal. Alternatively, if the first information includes or indicates the condition in which the first device is allowed to stop sending a SIM1 paging message to the terminal, the first device determines, based on the first information, the condition in which sending a SIM1 paging message to the terminal is allowed.

In some embodiments, after determining the condition in which sending a SIM1 paging message to the terminal is allowed, the first device sends a paging message meeting the condition to the terminal.

S404: If the first information indicates the second device to stop sending a SIM1 paging message to the terminal, the first device sends second information to the second device, where the second information indicates the second device to stop sending a SIM1 paging message to the terminal. If the first information includes or indicates the condition in which the second device is allowed to send a SIM1 paging message to the terminal, the first device sends second information to the second device, where the second information includes or indicates the condition in which the second device is allowed to send a SIM1 paging message to the terminal.

After receiving the second information from the first device, the second device stops, based on the second information, sending a SIM1 paging message to the terminal, or sends, based on the second information, a paging message meeting the condition to the terminal. The condition is determined based on the second information.

In some embodiments, after receiving the first information, the first device may independently determine whether to perform subsequent paging based on the first information. If the first device determines not to page the SIM1 based on the first information, the first device may return a response message to the terminal. The response message indicates the terminal that the first device continues to page the SIM1 in an original manner, or indicates the terminal that the first device does not page the SIM1 based on the first information.

The following describes in detail optional manners of the foregoing method operations.

The first information sent by the terminal to the first device when the terminal determines that the SIM2 is to enter a connected state from a non-connected state may include or indicate any two of the foregoing content, and an application scenario does not need to be limited. For example, once determining that the SIM2 is to enter a connected state from a non-connected state, the terminal sends the first information to the first device. The first information indicates the first device or the second device to stop sending a SIM1 paging message to the terminal. For another example, once determining that the SIM2 is to enter a connected state from a non-connected state, the terminal sends the first information to the first device. The first information includes or indicates the condition in which the first device or the second device is allowed to send a SIM1 paging message to the terminal.

Alternatively, the terminal may determine content included or indicated by the first information sent to the first device. The terminal may determine, based on a reason of the service that triggers the SIM2 to enter a connected state, the content included or indicated by the first information. For example, the terminal determines an importance degree of the service that triggers the SIM2 to enter a connected state, or strength of a requirement for executing the service, and determines that the content included or indicated by the first information is indicating the first device or the second device to stop sending a SIM1 paging message to the terminal.

The following describes several possible scenarios as examples. In the following scenario 1 or scenario 2, the first information indicates the first device or the second device to stop sending a SIM1 paging message to the terminal.

1. If the service that triggers the SIM2 to enter a connected state is an emergency call service, the terminal may determine that the first information indicates the first device or the second device to stop sending a SIM1 paging message to the terminal. The stop herein may be understood as complete stop or temporary stop.

The emergency call service may be, for example, a voice call such as a call to 110 or 119 by using the SIM2. After receiving an emergency call request triggered by a user, if the terminal determines that a network in which the SIM1 is located does not support the emergency call service and a network in which the SIM2 is located supports the emergency call service, the terminal determines that the emergency call service is to be performed by using the SIM2.

2. If the service that triggers the SIM2 to enter a connected state is a location update service, the terminal may determine that the first information indicates the first device or the second device to stop sending a SIM1 paging message to the terminal.

Because the terminal has a mobility feature, the SIM2 may need to perform the location update service. The location update service takes a relatively short period of time, and a requirement for executing the location update service is very high. Otherwise, the normal use of the SIM2 is affected.

In the cases 1 and 2, the SIM2 may occupy the transmit chain. Because there is only one transmit chain, a connection of the SIM1 may be disconnected. The terminal sends the first information to the first device. The first information indicates to stop sending a SIM1 paging message to the terminal. The first device or the second device may learn, based on the first information, that a connection of the SIM1 is disconnected, and therefore does not continue sending data of the SIM1 to the terminal. This can avoid a data loss caused because the first device continues sending data when the connection of the SIM1 is disconnected. In addition, the first device or the second device does not send a SIM1 paging message to the terminal, to save network resources, and prevent the SIM1 from preempting the transmit chain after the terminal receives a SIM1 paging message, that is, prevent a service from being affected by preempting the transmit chain of the SIM2. This ensures that the chain through which the SIM2 performs a service can be normally used.

The cases 1 and 2 are only examples of two services. During actual application, in a scenario in which the service that triggers the SIM2 is another type of service, or when the service that triggers the SIM2 is any service, the first information may indicate the first device or the second device to stop sending a SIM1 paging message to the terminal.

The terminal may determine, based on the reason of the service that triggers the SIM2 to enter a connected state, that the content included or indicated by the first information is the condition in which the first device or the second device is allowed to send a SIM1 paging message to the terminal. In this embodiment of this application, the first device or the second device may be briefly described as a network side.

First, the terminal may determine the service that triggers the SIM2 to enter a connected state.

If the terminal actively initiates a service through the SIM2, the SIM2 is triggered to enter a connected state. Because the terminal actively initiates the service of the SIM2, the terminal can clearly determine the service that triggers the SIM2 to enter a connected state.

If the SIM2 passively enters a connected state, for example, if the terminal may receive a SIM2 paging message from the network side, the SIM2 paging message may be denoted as a first paging message. The first paging message may include or indicate information about a service that triggers the SIM2 to enter a connected state. If the first paging message does not include or does not indicate the information about the service that triggers the SIM2 to enter a connected state, the terminal may first temporarily leave the network of the SIM1, access the network of the SIM2. When accessing the network of the SIM2, the terminal determines the service that triggers the SIM2 to enter a connected state. Specifically, the terminal receives, from the first device, a second paging message for paging the SIM2, the terminal enables the SIM2 to enter a connected state, and the terminal determines the information about the service that triggers the SIM2 to enter a connected state. The terminal may send, through the SIM1, a request message to an access network device serving the SIM1. The request message is used to request to suspend scheduling a slot or a gap of the SIM1. The terminal is connected, in the slot or the gap through the SIM2, to an access network device serving the SIM2, that is, enables the SIM2 to enter a connected state.

After determining the service that triggers the SIM2 to enter a connected state, the terminal determines the first information based on the service that triggers the SIM2 to enter a connected state. The content included or indicated by the first information is the condition in which the network side is allowed to send a SIM1 paging message to the terminal. To be specific, when the SIM2 is to enter a connected state, the terminal may disconnect a connection of the SIM1. The terminal sends the first information to the network side, and the network side may determine, based on the first information, that a SIM1 paging message can be sent to the terminal. However, the paging message is specific to some services of the SIM1. For ease of description, some services that allow paging the SIM1 are denoted as first services. The service that triggers the SIM2 to enter a connected state is denoted as a second service.

The condition in which the network side is allowed to send a SIM1 paging message to the terminal may be understood as any one or a combination of the following:

(1) A SIM1 paging message that may be sent by the network side to the terminal is specific to the first service of the SIM1, and a priority of the first service is higher than or not lower than a priority of the second service.

(2) A SIM1 paging message that may be sent by the network side to the terminal is specific to a first protocol data unit (PDU) session of the SIM1, and a priority of the first PDU session is higher than or not lower than a priority of a second PDU session used for the second service.

(3) A SIM1 paging message that may be sent by the network side to the terminal is specific to a first quality of service flow (QoS flow) of the SIM1, and a priority of the first QoS flow is higher than or not lower than a priority of a second QoS flow used for the second service.

The terminal may indicate the first service, the first PDU session, or the first QoS flow to the first device, to indicate a service/PDU session/QoS flow of the SIM1 for which the network side is allowed to send a paging message to the terminal. Alternatively, the terminal may indicate the second service, the second PDU session, or the second QoS flow to the first device, and the network side determines, based on the second service, the second PDU session, or the second QoS flow, a service/PDU session/QoS flow of the SIM1 for which a paging message can be sent to the terminal. Based on this, the content included or indicated by the first information may be in the following several forms:

(1) Information about a service that allows the first device or the second device to send a SIM1 paging message to the terminal, that is, information about the first service. Specifically, the information about the first service may be: a type of a service that allows sending a SIM1 paging message to the terminal; or a priority of a service that allows sending a SIM1 paging message to the terminal; or a lowest priority of services that allow sending a SIM1 paging message to the terminal.

The type of a service that allows sending a SIM1 paging message to the terminal may be a specific service type, for example, a voice service, a short message service, or an unstructured supplementary service data (USSD) service.

A priority may be represented by a sequence number, and 1, 2, 3, and 4 . . . may represent priorities in descending order. If priorities of services that allow sending a SIM1 paging message to the terminal are {1, 2, 3}, it indicates that the first information indicates that a priority of a service that allows the network side to send a SIM1 paging message to the terminal is 1, 2, or 3. If the lowest priority of services that allow sending a SIM1 paging message to the terminal is 3, it indicates that the first information indicates that a priority of a service that allows the network side to send a SIM1 paging message to the terminal is 1, 2, or 3.

Priorities of different services may be negotiated by the terminal and the network side in advance, or notified by the network side to the terminal, or specified in a protocol.

For example, priorities of services in descending order are as follows: 1. a voice service; 2. a short message service or USSD service; 3. an IP multimedia system (IMS) service other than the voice service and the short message service; and 4. a data service. If the second service that triggers the SIM2 to enter a connected state is the data service, the network side may page the SIM1 for a service whose priority is higher than or not lower than a priority of the data service. For example, the priority is higher than the priority of the data service. The content that may be included or indicated by the first information may be in several forms: Form 1: a voice service, a short message service or a USSD service, and an IMS service other than the voice service and the short message service; Form 2: {1, 2, 3}; and Form 3: 3.

(2) Information about a PDU session that allows the first device or the second device to send a SIM1 paging message to the terminal, that is, information about the first PDU session. Specifically, the information about the first PDU session may be: description information used to describe a PDU session that allows sending a SIM1 paging message to the terminal; or a priority of a PDU session that allows sending a SIM1 paging message to the terminal; or a lowest priority of PDU sessions that allow sending a SIM1 paging message to the terminal.

The description information used to describe a PDU session that allows sending a SIM1 paging message to the terminal may be a PDU session corresponding to a specific service type, for example, a PDU session corresponding to a voice service, a PDU session corresponding to a short message service, or a PDU session corresponding to a USSD service, or may be a parameter of the PDU session. For example, the parameter of the PDU session may include one or more of the following: a data network name (DNN), slice information, or an access network type.

A priority of a PDU session may be represented by a sequence number, and 1, 2, 3, and 4 . . . may represent a descending order of priorities. If priorities of PDU sessions that allow sending a SIM1 paging message to the terminal are {1, 2, 3}, it indicates that the first information indicates that a priority of a PDU session that allows the network side to send a SIM1 paging message to the terminal is 1, 2, or 3. If the lowest priority of PDU sessions that allow sending a SIM1 paging message to the terminal is 3, it indicates that the first information indicates that a priority of a PDU session that allows the network side to send a SIM1 paging message to the terminal is 1, 2, or 3.

Priorities of different PDU sessions may be negotiated by the terminal and the network side in advance, or notified by the network side to the terminal, or specified in a protocol.

For example, priorities of PDU sessions in descending order are as follows: 1. a PDU session corresponding to a voice service; 2. a PDU session corresponding to a short message service or a USSD service; 3. a PDU session corresponding to an IMS service other than the voice service and the short message service; and 4. a PDU session corresponding to a data service. If the second service that triggers the SIM2 to enter a connected state is the data service, the network side may page the SIM1 for a PDU session corresponding to service whose priority is higher than (or not lower than) a priority of the PDU session corresponding to the data service. For example, the priority is higher than the priority of the PDU session corresponding to the data service. The content that may be included or indicated by the first information may be in several forms: Form 1: a PDU session corresponding to a voice service, a PDU session corresponding to a short message service or a USSD service, and a PDU session corresponding to an IMS service other than the voice service and the short message service; Form 2: {1, 2, 3}; and Form 3: 3.

(3) Information about a QoS flow that allows the first device or the second device to send a SIM1 paging message to the terminal, that is, information about the first QoS flow. Specifically, the information about the first QoS flow may be: description information used to describe a quality of service QoS flow that allows sending a SIM1 paging message to the terminal; or a priority of a QoS flow that allows sending a SIM1 paging message to the terminal; or a lowest priority of QoS flows that allow sending a SIM1 paging message to the terminal.

The description information used to describe a QoS flow that allows sending a SIM1 paging message to the terminal may be a QoS flow corresponding to a specific service type, for example, a QoS flow corresponding to a voice service, a QoS flow corresponding to a short message service, or a QoS flow corresponding to a USSD service, or may be a parameter of the QoS flow. For example, the parameter of the QoS flow may include one or more of the following: an ARP or a 5QI.

A priority of a QoS flow may be represented by a sequence number, and 1, 2, 3, and 4 . . . may represent a descending order of priorities. If priorities of QoS flows that allow sending a SIM1 paging message to the terminal are {1, 2, 3}, it indicates that the first information indicates that a priority of a QoS flow that allows the network side to send a SIM1 paging message to the terminal is 1, 2, or 3. If the lowest priority of QoS flows that allow sending a SIM1 paging message to the terminal is 3, it indicates that the first information indicates that a priority of a QoS flow that allows the network side to send a SIM1 paging message to the terminal is 1, 2, or 3.

Priorities of different QoS flows may be negotiated by the terminal and the network side in advance, or notified by the network side to the terminal, or specified in a protocol.

For example, priorities of QoS flows in descending order are as follows: 1. a QoS flow corresponding to a voice service; 2. a QoS flow corresponding to a short message service or a USSD service; 3. a QoS flow corresponding to an IMS service other than a voice service and a short message service; and 4. a PDU session corresponding to a data service. If the second service that triggers the SIM2 to enter a connected state is the data service, the network side may page the SIM1 for a QoS flow whose priority is higher than (or not lower than) a priority of the QoS flow corresponding to the data service. For example, the priority is higher than the priority of the QoS flow corresponding to the data service. The content that may be included or indicated by the first information may be in several forms: Form 1: a QoS flow corresponding to a voice service, a QoS flow corresponding to a short message service or a USSD service, and a QoS flow corresponding to an IMS service other than the voice service and the short message service; Form 2: {1, 2, 3}; and Form 3: 3.

(4) Information about the service that triggers the SIM2 to enter a connected state, namely, information about the second service. The information about the second service may be a service type of the second service, or may be a service priority of the second service.

In the example in (1), the first information may include or indicate a data service, or may be 4.

(5) Information about a PDU session that triggers the SIM2 to enter a connected state, namely, information about the second PDU session.

In the example in (2), the first information may include or indicate a PDU session corresponding to a data service, or may be 4.

(6) Information about a QoS flow that triggers the SIM2 to enter a connected state, namely, information about the second QoS flow.

In the example in (3), the first information may include or indicate a QoS flow corresponding to a data service, or may be 4.

In S402, the terminal sends the first information to the first device through the SIM1, and the first device receives the first information from the terminal. In some embodiments, the first device may be an access network device serving the terminal, or may be a core network device serving the terminal.

The first device may be an access network device serving the terminal, and the second device may be a core network device serving the terminal, for example, an AMF, an SMF, a UPF, an MME, an SGW, or a PGW. The terminal sends an RRC message to the access network device through the SIM1, and the RRC message carries the first information. The RRC message may be a user equipment assistance information (UE assistance information) message, or the RRC message may be a user equipment release request message, or the RRC message may be a user equipment suspend request message. The first information indicates the access network device or the core network device to stop sending a paging message or send a paging message that meets the condition. If the first information indicates the core network device to stop sending a paging message or send a paging message that meets the condition, after receiving the first information, the access network device further sends second information to the core network device, to indicate, by using the second information, the core network device to stop sending a paging message or send a paging message that meets the condition. For example, after receiving the first information, the access network device sends the second information to the AMF, to indicate, by using the second information, the AMF to stop sending a paging message or send a paging message that meets the condition. Alternatively, if the first information indicates the SMF to stop sending a paging message or send a paging message that meets the condition, after receiving the second information, the AMF continues to send third information to the SMF, to indicate, by using the third information, the SMF to stop sending a paging message or send a paging message that meets the condition. Alternatively, if the first information indicates the UPF to stop sending a paging message or send a paging message that meets the condition, the after receiving the third information, the SMF continues to send fourth information to the UPF, to indicate, by using the fourth information, the UPF to stop sending a paging message or send a paging message that meets the condition.

The first device may be a core network device serving the terminal, and the second device may be another core network device serving the terminal. For example, the first device is an AMF serving the terminal. The terminal sends a NAS message to the AMF through the SIM1, and the NAS message carries the first information. The NAS message may be a registration (registration or attach) message, or the NAS message may be an uplink transport (UL transport) message, or the NAS message is a PDU session modification message. The first information indicates the core network device or the another core network device to stop sending a paging message or send a paging message that meets the condition. If the first information indicates the core network device (for example, the AMF) to stop sending a paging message or send a paging message that meets the condition, the AMF stops, based on the first information, sending a paging message or sends, based on the first information, a paging message that meets the condition. If the first information indicates the another core network device (for example, the SMF) to stop sending a paging message or send a paging message that meets the condition, after receiving the first information, the AMF further sends the second information to the SMF, to indicate, by using the second information, the SMF to stop sending a paging message or send a paging message that meets the condition. If the first information indicates the UPF to stop sending a paging message or send a paging message that meets the condition, after receiving the second information, the SMF continues to send third information to the UPF, to indicate, by using the third information, the UPF to stop sending a paging message or send a paging message that meets the condition.

The first information may include or indicate different content. For example, the first information indicates the first device or the second device to stop sending a SIM1 paging message to the terminal.

Alternatively, the first information includes or indicates the condition in which the first device or the second device is allowed to send a SIM1 paging message to the terminal.

In a possible embodiment, the first information sent by the terminal to the first device may further include information about a timer. The information about the timer may be carried in the first information, or may be sent together with the first information, or the information about the timer and the first information may be separately sent. The information about the timer indicates duration in which the first device or the second device stops sending a SIM1 paging message to the terminal, or indicates duration in which sending a paging message meeting the condition to the terminal is allowed. That is, before the timer expires, sending a SIM1 paging message to the terminal is stopped; or before the timer expires, sending a paging message meeting the condition to the terminal is allowed.

Based on the information about the timer, the first device or the second device stops sending a SIM1 paging message to the terminal before the timer expires, or the first device or the second device is allowed to send a paging message meeting the condition to the terminal before the timer expires.

In some embodiments, after S403, the network side sends a second message to the terminal, and the terminal receives the second message sent by the network side. Herein, the network side may be a base station or a core network device serving the SIM1. The second message is used to change the SIM1 to a non-connected state. After receiving the second message, the terminal enables, based on the second message, the SIM2 to enter a connected state.

After the SIM2 enters a connected state, the terminal performs the service that triggers the SIM2 to enter a connected state. In some embodiments, if the terminal determines that the service that triggers the SIM2 to enter a connected state ends, or the terminal determines that the SIM2 is switched from a connected state to a non-connected state, the terminal sends, through the SIM1, third information to the base station or the core network device serving the SIM1. The third information is used by the base station or the core network device to determine to allow sending a paging message to the SIM1.

Based on the description of the foregoing embodiment and a same technical concept, embodiments of this application provide another communications method.

As described in the optional manner of S402, when determining that the SIM2 is to enter a connected state from a non-connected state, the terminal may first determine whether to send the first information. The terminal may alternatively determine not to send the first information. For example, the terminal determines that the SIM1 continues to be in connected state. In this case, the terminal may indicate the network of the SIM2 to stop paging the SIM2, or notify, to the network of the SIM2, a condition in which the SIM2 can be paged. For example, if a priority of the service that triggers the SIM2 to enter a connected state is lower than or not higher than a priority of the service that triggers the SIM1 to enter a connected state, it is determined that the SIM1 continues to be in connected state.

Figure 5:
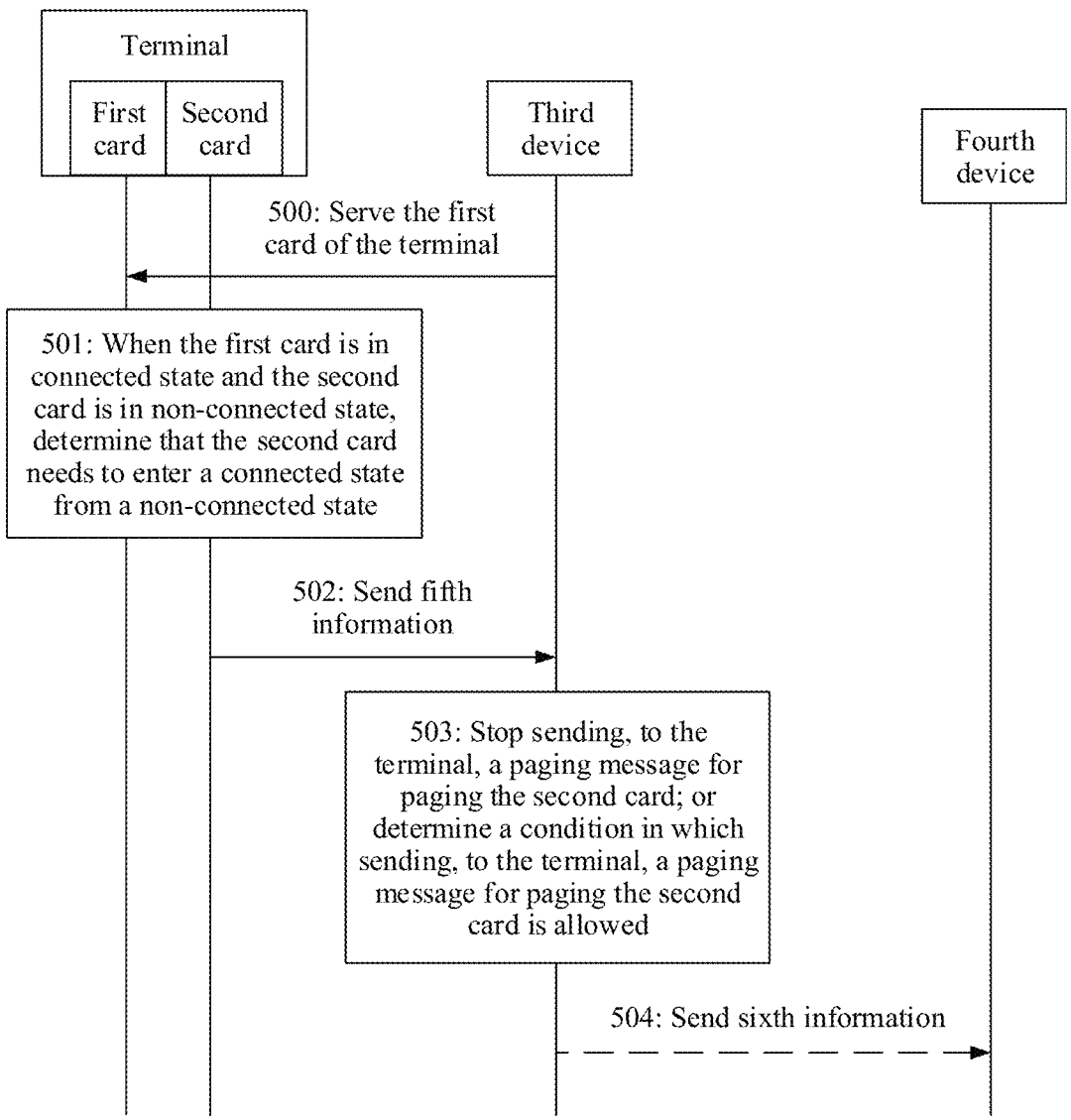
FIG. 5 is a schematic flowchart 2 of a communications method according to an embodiment of this application.

The following describes in detail the another communications method provided in embodiments of this application. As shown in FIG. 5, a process of the another communications method provided in embodiments of this application is described as follows: The method is performed by a terminal and a first device. The terminal includes a SIM1 and a SIM2. The terminal may be a dual-card dual-standby single-pass terminal or a dual-card single-standby single-pass terminal.

S500: The first device serves the SIM1 of the terminal.

S501: When the SIM1 is in connected state and the SIM2 is in non-connected state, the terminal determines that the SIM2 is to enter a connected state from a non-connected state.

S502: The terminal sends fifth information to a third device through the SIM2, and the third device receives the fifth information from the terminal.

The fifth information may include or indicate different content. For example, the fifth information indicates the third device or a fourth device to stop sending a SIM2 paging message to the terminal.

Alternatively, the fifth information includes or indicates a condition in which the third device or a fourth device is allowed to send a SIM2 paging message to the terminal.

The fifth information includes or indicates the condition in which the third device or the fourth device is allowed to send a SIM2 paging message to the terminal. That the fifth information includes the condition in which the third device or the fourth device is allowed to send a SIM2 paging message to the terminal means that the fifth information provides content used by the third device or the fourth device to determine the condition, and the third device or the fourth device may determine the condition based on the fifth information. That the fifth information indicates the condition in which the third device or the fourth device is allowed to send a SIM2 paging message to the terminal means that the fifth information directly indicates the condition, and the third device and the fourth device may directly obtain the condition from the fifth information.

After receiving the fifth information from the terminal, the third device may perform S503 or S504 based on different content included or indicated by the fifth information. If the fifth information indicates the third device to stop sending a SIM2 paging message to the terminal, or the fifth information includes or indicates a condition in which the third device is allowed to send a SIM2 paging message to the terminal, S503 is performed; otherwise, S504 is performed.

S503: If the fifth information indicates the third device to stop sending a SIM2 paging message to the terminal, the third device stops, based on the fifth information, sending a SIM2 paging message to the terminal. Alternatively, if the fifth information includes or indicates the condition in which the third device is allowed to stop sending a SIM2 paging message to the terminal, the third device determines, based on the fifth information, the condition in which sending a SIM2 paging message to the terminal is allowed.

In some embodiments, after determining the condition in which sending a SIM2 paging message to the terminal is allowed, the third device sends a paging message meeting the condition to the terminal.

S504: If the fifth information indicates the fourth device to stop sending a SIM2 paging message to the terminal, the third device sends sixth information to the fourth device, where the sixth information indicates the fourth device to stop sending a SIM2 paging message to the terminal. If the fifth information includes or indicates a condition in which the fourth device is allowed to send a SIM2 paging message to the terminal, the third device sends sixth information to the fourth device, where the sixth information includes or indicates a condition in which the fourth device is allowed to send a SIM2 paging message to the terminal.

After receiving the sixth information from the third device, the fourth device stops, based on the sixth information, sending a SIM2 paging message to the terminal, or sends, based on the sixth information, a paging message meeting the condition to the terminal. The condition is determined based on the sixth information.

In some embodiments, in S502, the terminal sends the fifth information to the third device through the SIM2, and the third device receives the fifth information from the terminal. Because the SIM2 is in non-connected state, to perform S502, the terminal may enable the SIM2 to enter a connected state, and can send the fifth information to the third device through the SIM2 only after the SIM2 enters a connected state. In this embodiment, the terminal determines to continue to perform a service on the SIM1. Therefore, before the SIM2 enters a connected state, the terminal may temporarily leave a network of the SIM1. A method for temporarily leaving the network of the SIM1 is not limited in this application. For example, the terminal may send, through the SIM1, a request message to an access network device serving the SIM1. The request message is used to request to suspend scheduling a slot or a gap of the SIM1. The terminal is connected, in the slot or the gap through the SIM2, to an access network device serving the SIM2, that is, enables the SIM2 to enter a connected state. The request message may be an RRC message.

For descriptions of some optional manners of the embodiment shown in FIG. 5, refer to related descriptions of the embodiment in FIG. 4. Details are not described herein again. For example, in the detailed description of the optional manner, the SIM2 in the embodiment in FIG. 5 may correspond to the SIM1 in the embodiment in FIG. 4, the third device in the embodiment in FIG. 5 may correspond to the first device in the embodiment in FIG. 4, the fourth device in the embodiment in FIG. 5 may correspond to the second device in the embodiment in FIG. 4, the fifth information in the embodiment in FIG. 5 may correspond to the first information in the embodiment in FIG. 4, and the sixth information in the embodiment in FIG. 5 may correspond to the third information in the embodiment in FIG. 4. For example, content included or indicated by the fifth information may be determined based on a currently performed service of the SIM1, for example, an importance degree or a priority degree of the currently performed service of the SIM1, to determine to a condition in which the third device or the fourth device stops paging the SIM2 by or a condition for paging the SIM2. The condition for paging the SIM2 includes a paging message corresponding to a service, a PDU session, or a QoS flow, and may be determined by comparing a priority of a service/a PDU session/a QoS flow of the SIM2 with a priority of a currently performed service/a PDU session/a QoS flow of the SIM1.

Based on the descriptions of the foregoing embodiments, the following further describes in detail the method provided in embodiments of this application with reference to specific application scenarios. A prerequisite environment of the application scenarios is that the SIM1 is in connected state, and the SIM2 is in non-connected state.

In the following application scenarios, a SIM1 of a terminal is represented by a SIM1, a SIM2 of the terminal is represented by a SIM2, an access network device is represented by a gNB, and core network devices include an AMF, an SMF, and a UPF. A terminal and UE represent different terms of a same device. A base station and a gNB represent different terms of a same device.

Application Scenario 1:

When determining to perform a service of a SIM2, a terminal may send information to a network of a SIM1, so that the network (AMF) of the SIM1 stops paging the SIM1 or sends a paging message that meets a condition to page the SIM1.

Figure 6A:
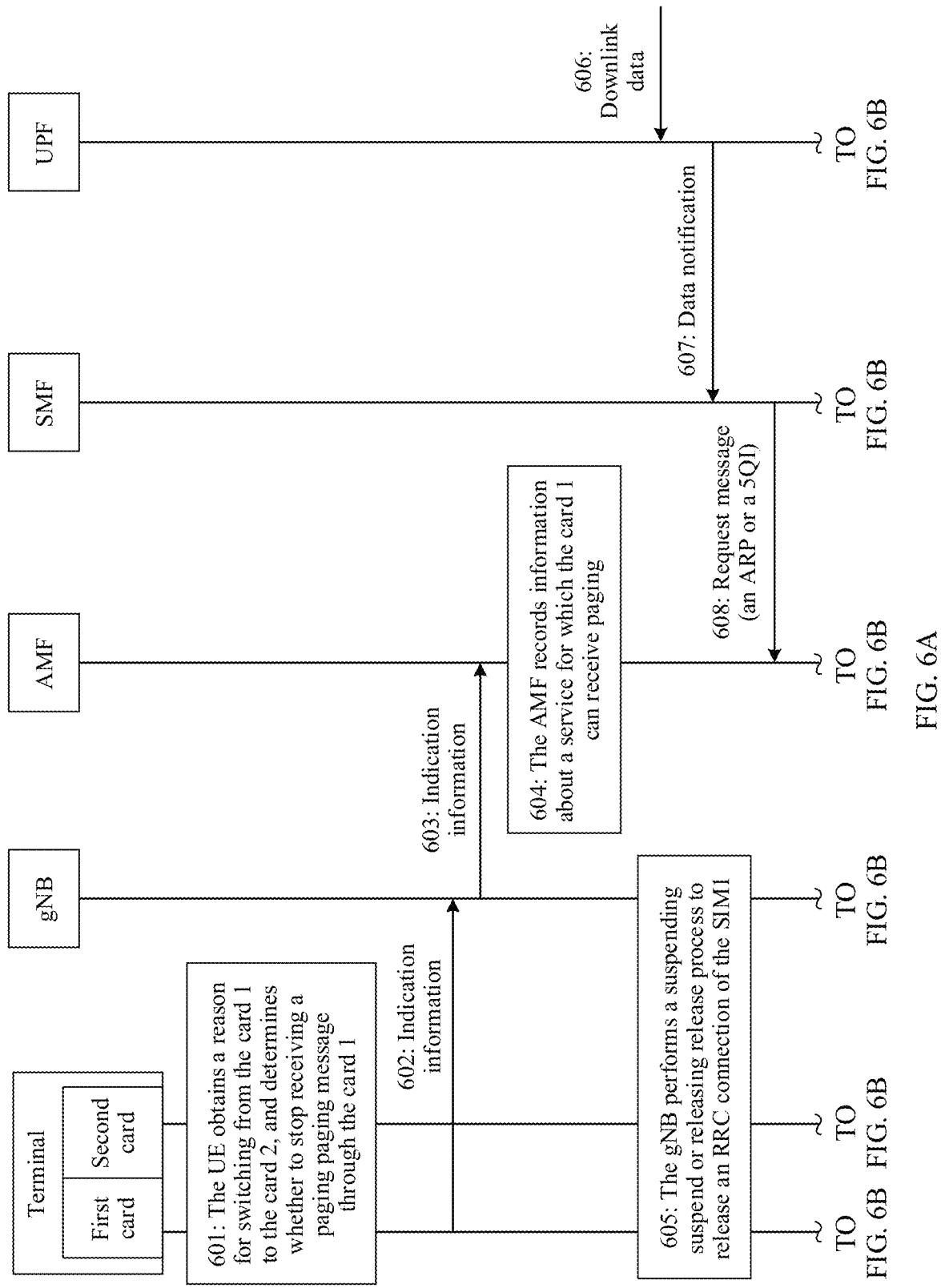
FIG. 6A and FIG. 6B are a schematic flowchart of a communications method in an application scenario 1 according to an embodiment of this application.
Figure 6B:
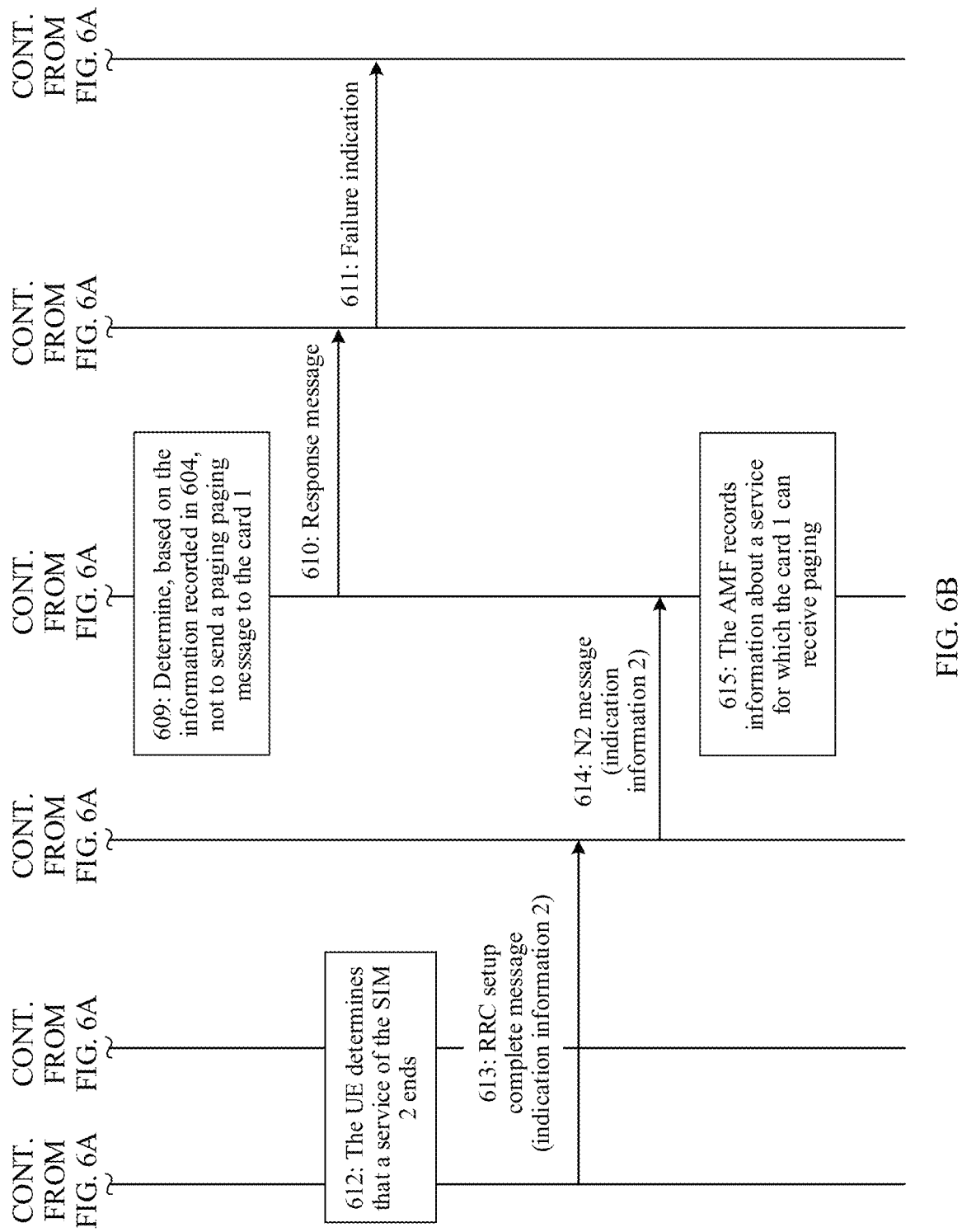

As shown in FIG. 6A and FIG. 6B, a process embodiment is described as follows:

S601: The UE obtains a reason why the UE is to switch from the SIM1 to the SIM2 to perform a service, and determines whether to stop receiving a paging message through the SIM1.

The reason may be that the UE locally initiates a service, for example, actively makes a call or makes an emergency call to 110 or 119.

If the UE determines that the SIM2 initiates an emergency call, the UE determines that the SIM1 stops receiving a paging message (paging).

Scenario example: The UE receives an emergency call request from a user. When the UE determines that a network in which the SIM1 is located does not support an emergency call but a network in which the SIM2 is located supports an emergency call, the SIM2 may preempt a chain of the SIM1 and the UE indicates the SIM1 to stop receiving a paging message.

A purpose of stopping receiving a paging message from the SIM1 is to avoid impact on the emergency call of the SIM2.

If the UE determines that the SIM2 requests to perform location update, the UE determines that the SIM1 stops receiving paging. After the UE indicates, to a network side, information that the SIM1 stops receiving paging, the UE may or may not detect whether there is paging delivered to the SIM1.

The location update takes a short time and is mandatory. A purpose of stopping receiving a paging message from the SIM1 is to avoid interruption of the location update of the SIM2.

The UE determines, based on a service that triggers the SIM2 to enter a connected state, a description of paging that can be received by the SIM1.

If the SIM2 actively initiates a service, the UE performs determining based on a service that triggers the SIM2 to initiate a request.

If the SIM2 receives network paging, the UE performs determining based on a service indication in a paging message, or the UE temporarily disconnects the SIM1 from the network, and the UE is first temporarily connected to the network of the SIM2 and performs determining after learning of a service corresponding to the SIM2.

The UE initiates a service based on the SIM2, and determines that a service for which the SIM1 can receive paging.

For example, priorities of services may be arranged in the following order:
1. a voice service;
2. a short message service or USSD service;
3. an IMS service other than the voice service and the short message service; and
4. a data service.

For example, if the SIM2 initiates the data service with a priority 4, a network side of the SIM1 may send paging for services with priorities 1, 2, 3, and 4 to the SIM1. If the SIM2 initiates the voice service with a priority 1, the network side of the SIM1 may send paging for a service with a priority 1 to the SIM1.

The UE determines, based on a PDU session used when the SIM2 initiates a service, a PDU session corresponding to which the network side of the SIM1 can send, for the SIM1, paging.

For example, priorities of PDU sessions are as follows:
1. a PDU session corresponding to the IMS service;
2. a PDU session corresponding to the short message service or USSD service; and
3. a PDU session corresponding to the data service.

If the SIM2 initiates the data service with a priority 3, the network side of the SIM1 may send, for the SIM1, paging corresponding to PDU sessions with priorities 1, 2, and 3.

If the SIM2 initiates the IMS service with a priority 1, the network side of the SIM1 may send, for the SIM1, paging corresponding to a PDU session with a priority 1.

The UE determines, based on a QoS flow used when the SIM2 initiates a service, a QoS flow corresponding to which the SIM1 can receive paging. In 5G, a PDU session includes one or more QoS flows.

For example, priorities of QoS flows are as follows:
1. a QoS flow corresponding to the IMS voice service;
2. a QoS flow corresponding to the short message service or USSD service;
3. a QoS flow corresponding to the IMS service other than the voice service and the short message service; and
4. a QoS flow corresponding to the data service.

If the SIM2 initiates the data service, and a priority corresponding to a used QoS flow is 4, the network side of the SIM1 may send, to the SIM1, paging corresponding to QoS flows of services with priorities 1, 2, 3, and 4.

If the SIM2 initiates the voice service, and a priority corresponding to a used QoS flow is 1, the network side of the SIM1 may send, to the SIM1, paging corresponding to a QoS flow of a service with a priority 1.

S602: The UE sends a message to a gNB, for example, an RRC release request message or an RRC suspend request message. The message carries indication information.

The RRC release request message is used to request to suspend or release a connection (an RRC connection) between the SIM1 and the gNB.

The indication information includes or indicates:
indication information for stopping receiving paging; or
a service corresponding to which paging can be received; or
including a type of a service for which paging can be received, and a priority of a service for which paging can be received, where the network side and the terminal may negotiate a service corresponding to a priority 1, 2, 3 or 4; or
a lowest priority of services for which paging can be received, where for example, if 3 is fed back, it indicates that a priority of a service for which paging can be received is 1, 2, or 3; or
a PDU session corresponding to which paging can be received, including parameter information of the PDU session, such as a DNN, slice information, and/or an access network type; or
a QoS flow corresponding to which paging can be received,
including a QoS parameter of a QoS flow, such as an ARP and a 5QI.

In some embodiments, the indication information further includes information for enabling dual-card optimization.

S603: The gNB sends a request message (for example, an N2 UE request message) to an AMF, to request the AMF to release or suspend a connection of the UE. The request message further carries the indication information in S602.

A transmit chain is switched from the SIM1 to the SIM2. Therefore, the SIM1 may be released.

S604: The AMF records, based on the indication information, a status in which the UE can receive paging.

The AMF may independently determine whether to agree with content indicated by the indication information. If the AMF does not agree with the indication information, the AMF may further send a response message to the UE. The response message indicates that the AMF does not agree with the indication information. The AMF continues to send a SIM1 paging message to the UE in an original manner.

In some embodiments, after receiving the indication information sent in S603, the AMF starts a timer based on the indication information. Before the timer expires, the AMF does not send paging to the UE, or sends only paging that meets a requirement of the indication information to the UE.

S605: The gNB releases a connection between the SIM1 of the UE and the gNB.

The gNB may directly release the connection between the SIM1 of the UE and the gNB after receiving the message in S602, or may release the connection after receiving the message from the AMF.

S606: A UPF receives downlink data of the SIM1 sent to the UE.

S607: When determining that a data chain corresponding to the downlink data does not exist, the UPF sends a data notification message to an SMF, where the message includes a differentiated services code point (DSCP) and a quality of service flow identifier (QoS flow ID, QFI).

S608: The SMF sends a request message to the AMF. For example, the request message is Namf_Communication_N1N2MessageTransfer.

The request message carries an ARP, 5QI information, a paging policy indicator (PPI), or a PDU session identifier (PDU session ID) corresponding to a data service.

The SMF obtains the PPI based on the DSCP, and obtains the ARP and the 5QI based on the QFI.

S609: The AMF determines, based on the information in S604, a to-be-performed operation.

If the indication information indicates to stop sending SIM1 paging to the terminal, the AMF directly performs S610 and S611 to reject the SMF.

If the indication information includes or indicates a service corresponding to which SIM1 paging can be sent, the AMF determines whether the service that triggers paging meets a condition. If the service that triggers paging does not meet the condition, the AMF directly performs S610 and S611 to reject the SMF.

The AMF determines, based on a PPI indication, a type of the service that triggers paging.

If the indication information includes or indicates a PDU session corresponding to which SIM1 paging can be sent, the AMF determines whether the PDU session that triggers paging meets a requirement. If the PDU session that triggers paging does not meet the requirement, the AMF directly performs S610 and S611 to reject the SMF.

The AMF determines, based on a PDU session ID, the PDU session that triggers paging.

If the indication information includes or indicates a QoS flow corresponding to which SIM1 paging can be sent, the AMF determines whether the QoS flow that triggers paging meets a requirement. If the QoS flow that triggers paging does not meet the requirement, the AMF directly performs S610 and S611 to reject the SMF.

The AMF determines, based on the APR and 5QI, the QoS flow that triggers paging.

S610: The AMF sends a response message to the SMF, to reject the SMF. For example, the response message is Namf_Communication_N1N2MessageTransfer Response.

S611: The SMF sends a failure indication to the UPF.

S612: When determining that the service of the SIM2 ends, the UE may switch to the SIM1 to continue to perform a service.

If the UE sends information about a timer to the AMF, before the timer expires, and the AMF sends a paging message based on the indication information and based on the information about the timer sent by the UE or information about the timer determined by the AMF, the following S613 to S615 are omitted.

S613: The UE sends an RRC setup complete message to the gNB through the SIM1, where the RRC setup complete message includes indication information, that is, indication information indicating to receive all paging or information indicating to disable dual-card optimization.

S614: The gNB sends, to the AMF, a message (N2 message) that carries the indication information.

S615: The AMF determines, based on the indication information, a service for which paging can be received, and stores the service.

A function of the indication information in S613 to S615 is different from a function of the indication information in S602 to S609. For differentiation, the indication information in S613 to S615 is denoted as indication information 2. The indication information 2 indicates that the service of the SIM2 ends, or indicates that the SIM1 can be normally paged.

Application Scenario 2:

When determining to perform a service of a SIM1, a terminal may send information to a network of a SIM2, so that the network (AMF) of the SIM2 stops paging the SIM2 or sends a paging message that meets a condition to page the SIM2. It is assumed that a network with which the SIM1 registers is a gNB 1, and a network with which the SIM1 registers is a gNB 2. The two SIM cards may alternatively register with a same network.

Figure 7:
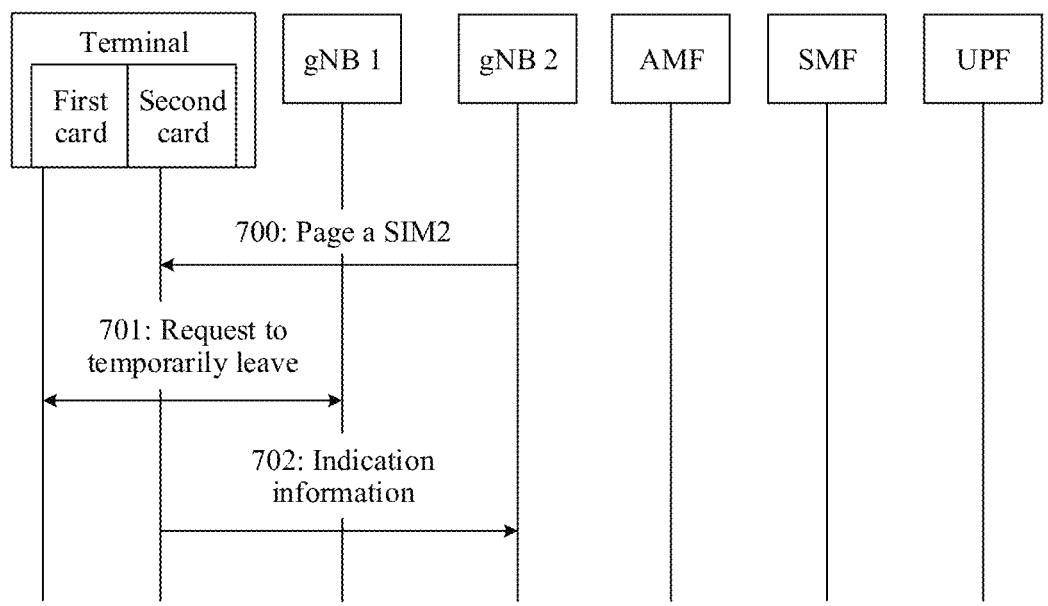
FIG. 7 is a schematic flowchart of a communications method in an application scenario 2 according to an embodiment of this application.

As shown in FIG. 7, a process embodiment is described as follows:

S700: The terminal determines that a service is to be initiated through the SIM2, or the SIM2 receives a paging message.

S701: If the terminal determines to continue to perform a service through the SIM1, the terminal sends a request to the gNB 1 through the SIM1, to temporarily leave a network.

Specifically, the terminal may request the gNB 1 to allocate a gap to the SIM1, and request the gNB 1 not to send data to the SIM1 during the gap. In this case, the gNB 1 does not send data to the SIM1 during the gap. In this way, resources on a network side can be saved, and a network disconnection of the SIM2 is not affected due to paging the SIM1 by the gNB 1, and subsequent operations are not affected.

S702: The terminal determines, based on a service currently performed through the SIM1, a service/PDU session/QoS flow corresponding to which paging can be sent to the SIM2 by the network of the SIM2, and sends indication information to the gNB 2 through the SIM2. Content of the indication information is the same as that described in S602 in the figure.

For a specific determining method, refer to a method for determining a service/PDU session/QoS flow corresponding to which paging can be sent to the SIM1 by the network of the SIM1 in the embodiment in FIG. 6A and FIG. 6B.

S703 to S715 are similar to S603 to S615, except that the description of the SIM1 is replaced with the description of the SIM2, and the description of the SIM2 is replaced with the description of the SIM1.

It should be noted that the gNB, the AMF, the SMF, and the UPF in FIG. 6A and FIG. 6B are respectively a gNB, an AMF, an SMF, and a UPF in the network with which the SIM1 registers. The gNB 2, the AMF, the SMF, and the UPF in FIG. 7 are respectively a gNB 2, an AMF, an SMF, and a UPF in the network with which the SIM2 registers.

Application Scenario 3:

When determining to perform a service of a SIM2, a terminal may send information to a network of a SIM1, so that the network (SMF) of the SIM1 stops paging the SIM1 or sends a paging message that meets a condition to page the SIM1.

Figure 8A:
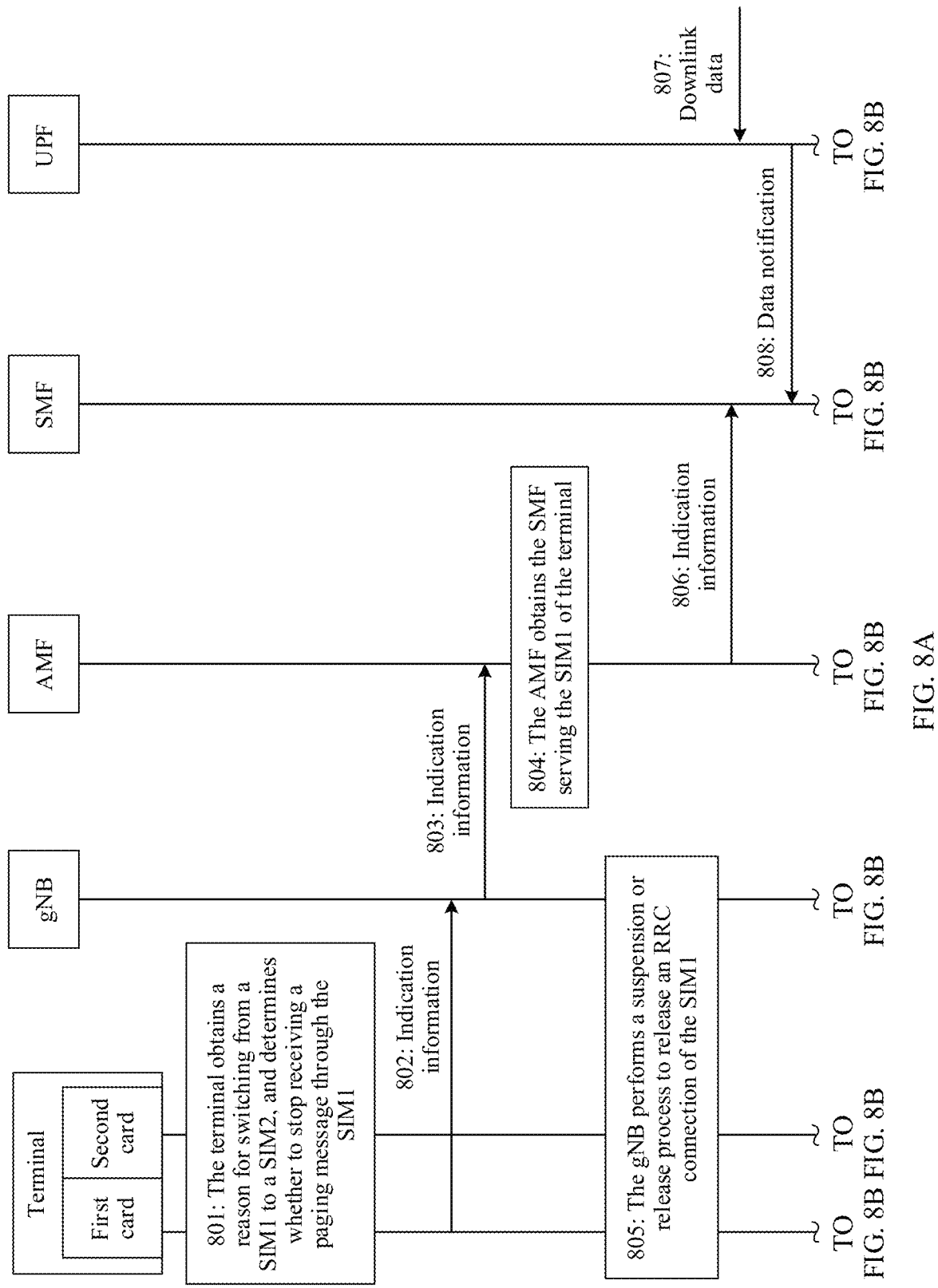
FIG. 8A and FIG. 8B are a schematic flowchart of a communications method in an application scenario 3 according to an embodiment of this application.
Figure 8B:
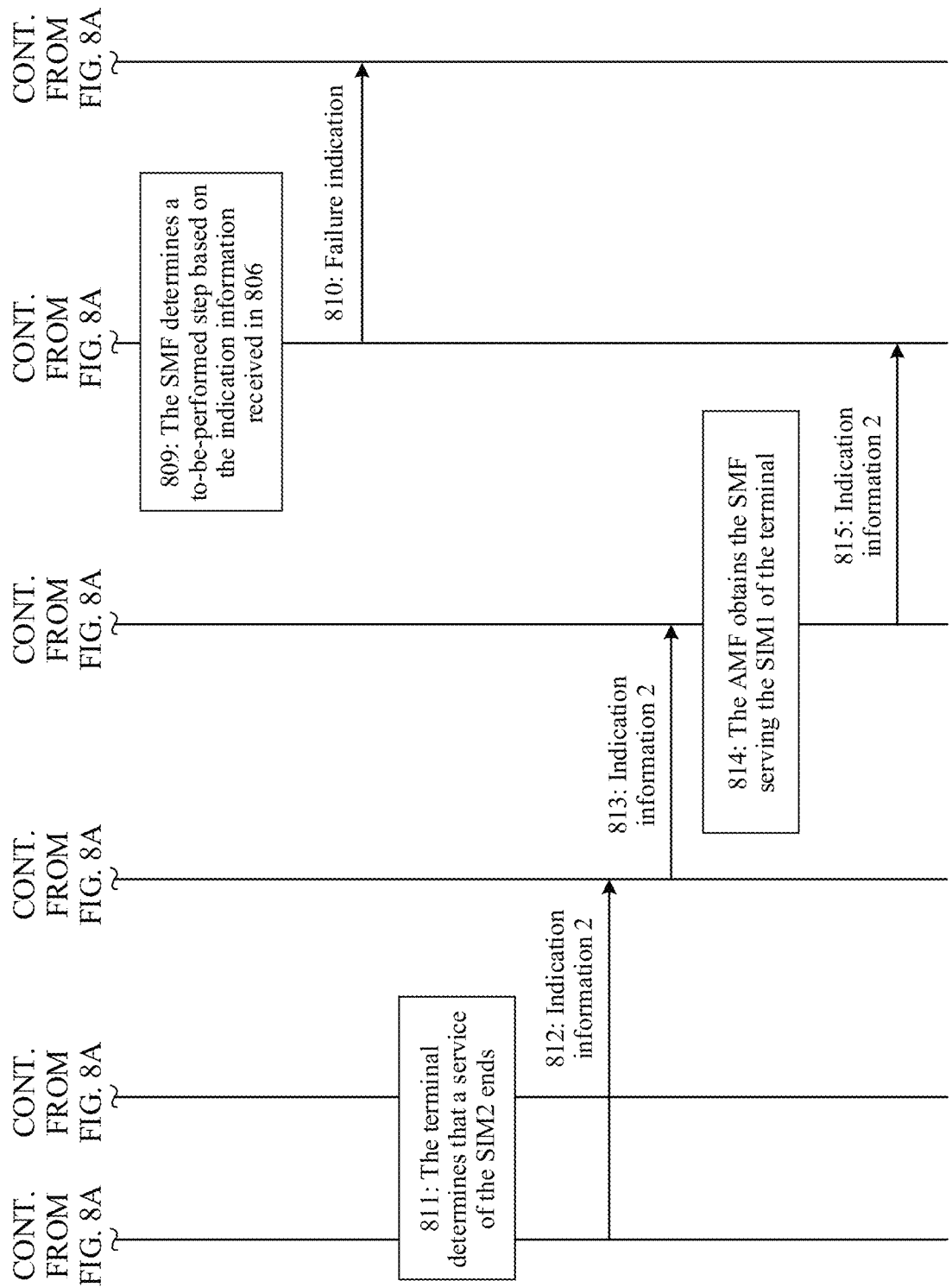

As shown in FIG. 8A and FIG. 8B, a process embodiment is described as follows:

S801 to 803 are the same as S601 to 603.

S804: An AMF determines the SMF that currently serves the SIM1 of the terminal.

S805 is the same as S605.

S806: The AMF sends a message, for example, a PDU session update context message (Nsmf_PDUSession_UpdateSMContext), to each SMF determined in S804. The message carries indication information.

The SMF records, based on the indication information, a status in which the UE can accept paging the SIM1.

S807 and S808 are the same as S606 and S607.

S809: The SMF determines, based on the information in S806, a to-be-performed operation. The following cases are included.

If the indication information indicates to stop sending paging the SIM1, the SMF determines to stop triggering the AMF to page the SIM1, and directly performs S810 to reject a UPF. That is, the SMF locally performs blocking, and does not send, to the AMF, a message for triggering the AMF to send paging to the UE.

If the indication information indicates a service corresponding to which SIM1 paging can be sent, the SMF determines whether the service that triggers paging meets a requirement. If the service that triggers paging does not meet the requirement, the SMF directly performs S810 to reject the UPF. That is, the SMF locally performs blocking, and does not send, to the AMF, a message for triggering the AMF to send paging to the UE.

The SMF may determine, based on a DSCP indication, a type of the service that triggers paging.

If the indication information indicates a PDU session corresponding to which SIM1 paging can be sent, the SMF determines whether the PDU session that triggers paging meets a requirement. If the PDU session that triggers paging does not meet the requirement, the AMF directly performs S810 to reject the UPF.

The SMF locally determines the PDU session that triggers paging.

If the indication information indicates a QoS flow corresponding to which SIM1 paging can be sent, the SMF determines whether the QoS flow that triggers paging meets a requirement. If the QoS flow that triggers paging does not meet the requirement, the SMF directly performs S810 to reject the UPF.

The SMF may determine, based on a QFI, the QoS flow that triggers paging.

S810: The SMF sends a failure indication to the UPF.

S811 to 813 are the same as S612 to 614.

S814: The AMF determines an SMF that currently serves the terminal.

S815: The AMF sends indication information to each SMF determined in S814. A PDU session context update message (Nsmf_PDUsession_updateSMContext) may be sent, and the indication information is carried in the message.

The SMF continues to send paging for all services to the terminal based on the indication information.

A function of the indication information in S811 to S815 is different from a function of the indication information in S802 to S809. For differentiation, the indication information in S1011 to S1015 is denoted as indication information 2.

The indication information 2 indicates that the service of the SIM2 ends, or indicates that the SIM1 can be normally paged.

Application Scenario 4:

When determining to perform a service of a SIM1, a terminal may send information to a network of a SIM2, so that the network (SMF) of the SIM2 stops paging the SIM2 or sends a paging message that meets a condition to page the SIM2.

Figure 9:
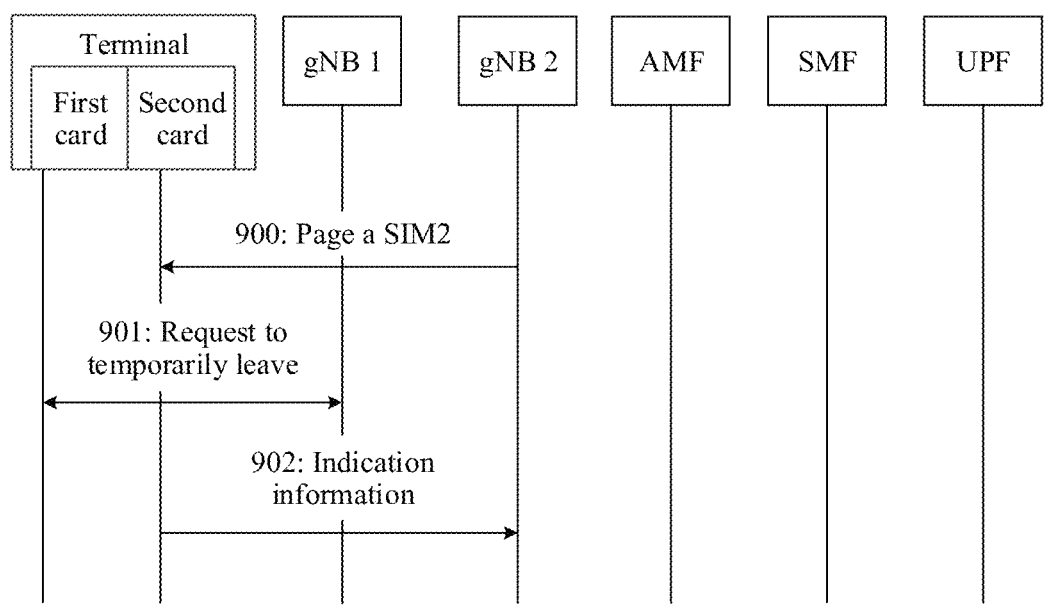
FIG. 9 is a schematic flowchart of a communications method in an application scenario 4 according to an embodiment of this application.

As shown in FIG. 9, a process embodiment is described as follows:

S900 to S902 are the same as S700 to S702.

S903 to S915 are similar to S803 to S815, except that the description of the SIM1 is replaced with the description of the SIM2, and the description of the SIM2 is replaced with the description of the SIM1.

It should be noted that the gNB, the AMF, the SMF, and the UPF in FIG. 8A and FIG. 8B are respectively a gNB, an AMF, an SMF, and a UPF in the network with which the SIM1 registers. The gNB 2, the AMF, the SMF, and the UPF in FIG. 9 are respectively a gNB 2, an AMF, an SMF, and a UPF in the network with which the SIM2 registers.

Application Scenario 5:

When determining to perform a service of a SIM2, a terminal may send information to a network of a SIM1, so that the network (UPF) of the SIM1 stops paging the SIM1 or sends a paging message that meets a condition to page the SIM1.

Figure 10A:
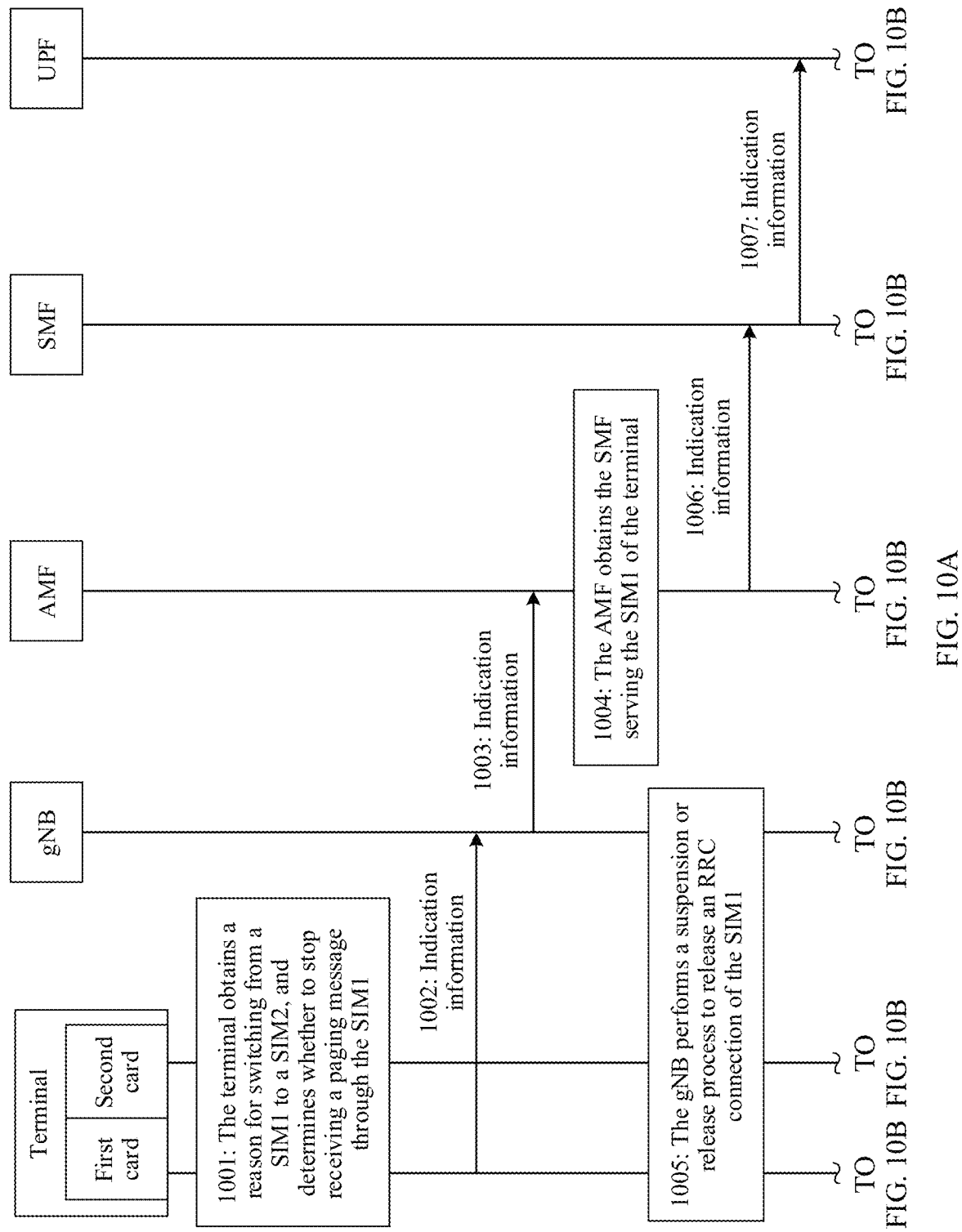
FIG. 10A and FIG. 10B are a schematic flowchart of a communications method in an application scenario 5 according to an embodiment of this application.
Figure 10B:
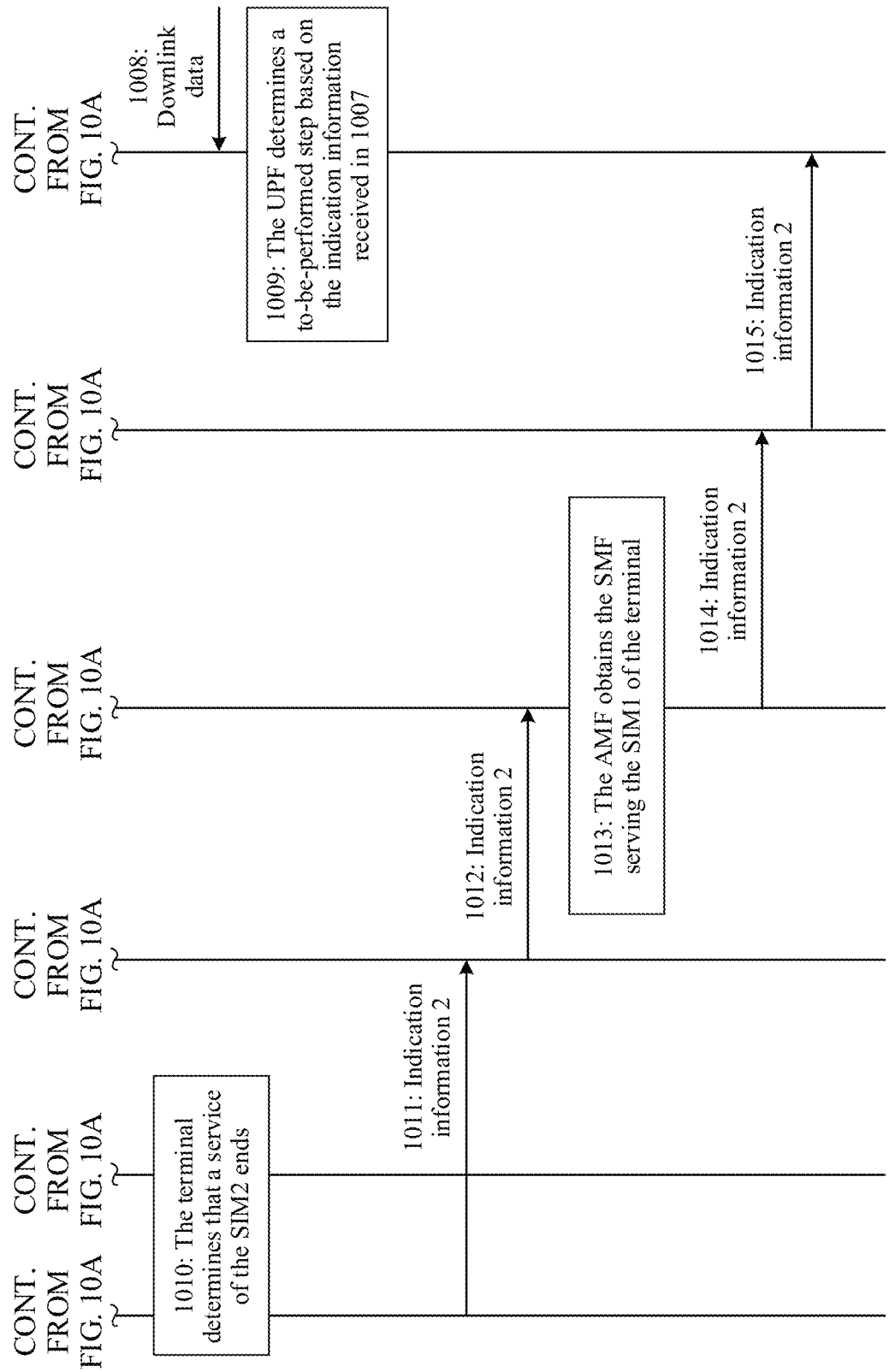

As shown in FIG. 10A and FIG. 10B, a process embodiment is described as follows:

S1001 to S1006 are the same as S801 to S806.

Indication information: The UPF records a paging status based on the indication information. S1007: The SMF sends a message to the UPF, for example, an N4 session modification request (N4 Session Modification Request) message. The message carries the indication information.

The UPF records, based on the indication information, a status in which SIM1 paging can be sent to the terminal.

S1008: The UPF receives the downlink data of the card 1 sent to the terminal.

S1009: The UPF determines, based on the information in S1007, a to-be-performed operation.

If the indication information indicates to stop sending SIM1 paging to the terminal, the UPF determines to stop triggering SIM1 paging, and the UPF stores the data, and does not send the data to the SMF.

If the indication information indicates a service corresponding to which SIM1 paging can be sent, the UPF determines whether the service that triggers paging meets a requirement. If the service that triggers paging does not meet the requirement, the UPF stores the data, and does not send the data to the SMF.

The UPF determines, based on a DSCP indication of a received data packet, a type of the service that triggers paging.

If the indication information indicates a PDU session corresponding to which SIM1 paging can be sent, the UPF determines whether the PDU session that triggers paging meets a requirement. If the PDU session that triggers paging does not meet the requirement, the UPF stores the data, and does not send the data to the SMF.

The UPF locally determines the PDU session that triggers paging.

If the indication information indicates a QoS flow corresponding to which SIM1 paging can be sent, the UPF determines whether the QoS flow that triggers paging meets a requirement. If the QoS flow that triggers paging does not meet the requirement, the SMF directly performs S1010 to reject the UPF.

The UPF locally determines the QoS flow that triggers paging.

S1010 to S1014 are the same as S811 to S815.

S1015: The SMF sends a message to the UPF, for example, an N4 session modification request (N4 Session Modification Request), where the message carries indication information, to indicate that the service of the SIM2 ends, or indicate that the SIM1 can be normally paged.

If the UPF determines, based on the indication information, that paging can be sent to the SIM1, the UPF sends the stored data to the UE according to the conventional technology.

A function of the indication information in S1011 to S1015 is different from a function of the indication information in S1002 to S1009. For differentiation, the indication information in S1011 to S1015 is denoted as indication information 2.

Application Scenario 6:

When determining to perform a service of a SIM1, a terminal may send information to a network of a SIM2, so that the network (UPF) of the SIM2 stops paging the SIM2 or sends a paging message that meets a condition to page the SIM2.

Figure 11:
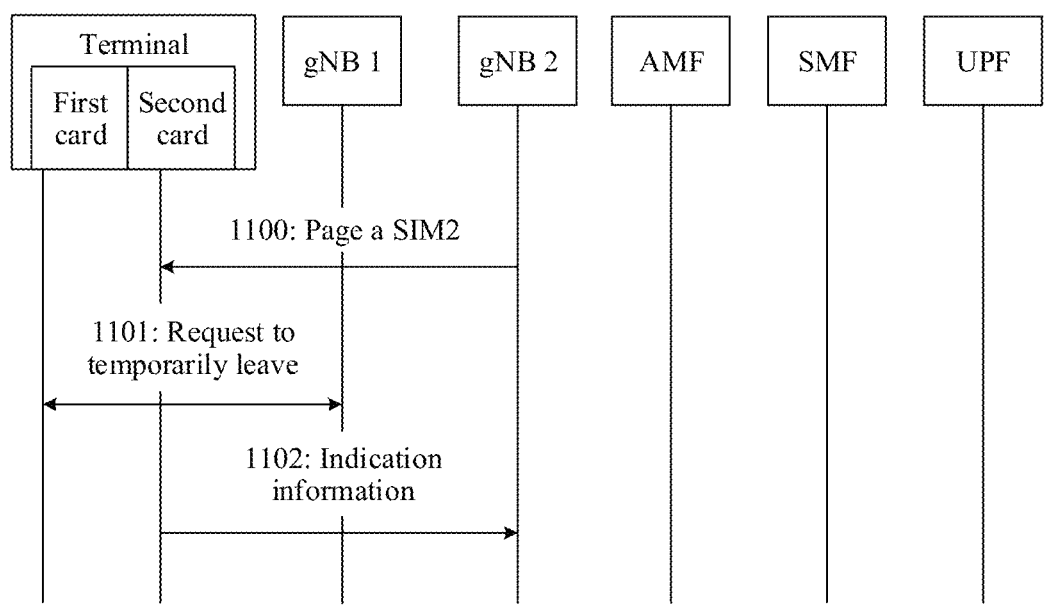
FIG. 11 is a schematic flowchart of a communications method in an application scenario 6 according to an embodiment of this application.

As shown in FIG. 11, a process embodiment is described as follows:

S1100 to S1102 are the same as S700 to S702.

S1103 to S1115 are similar to S1003 to S1015, except that the description of the SIM1 is replaced with the description of the SIM2, and the description of the SIM2 is replaced with the description of the SIM1.

It should be noted that the gNB, the AMF, the SMF, and the UPF in FIG. 10A and FIG. 10B are respectively a gNB, an AMF, an SMF, and a UPF in the network with which the SIM1 registers. The gNB 2, the AMF, the SMF, and the UPF in FIG. 11 are respectively a gNB 2, an AMF, an SMF, and a UPF in the network with which the SIM2 registers.

Application Scenario 7:

When determining to perform a service of a SIM2, a terminal may send information to a network of a SIM1, so that the network (gNB) of the SIM1 stops paging the SIM1 or sends a paging message that meets a condition to page the SIM1.

Figure 12:
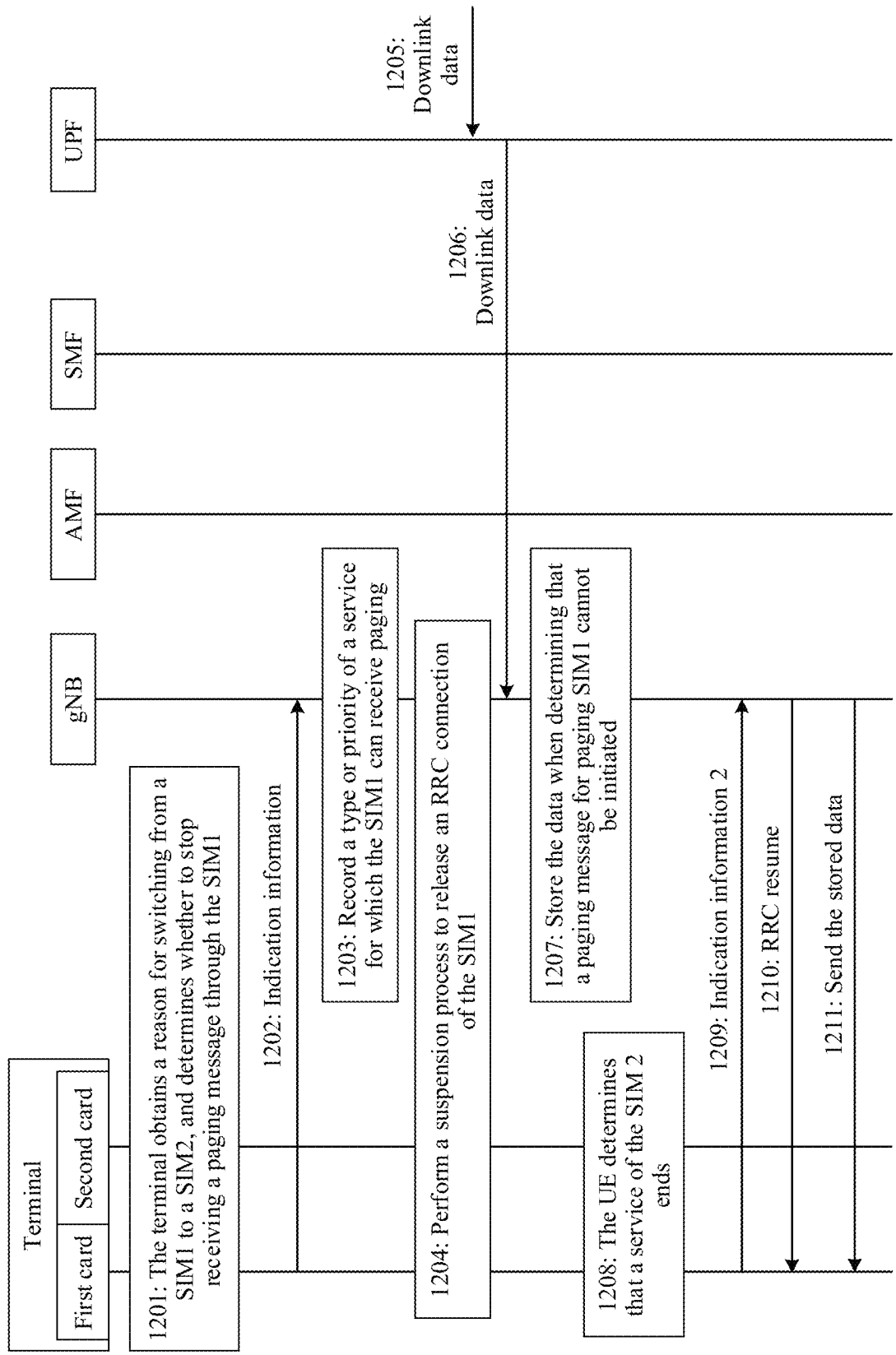
FIG. 12 is a schematic flowchart of a communications method in an application scenario 7 according to an embodiment of this application.

As shown in FIG. 12, a process embodiment is described as follows:

This embodiment of this application scenario mainly corresponds to a suspending (suspend) case. The suspending herein means that the gNB retains information about the terminal, maintains a connection channel between the gNB and a network side, and releases only a connection between the gNB and the terminal.

S1201 is the same as S601.

S1202: The UE sends a message to the gNB, for example, an RRC suspend request message. The message carries indication information.

For a description of the indication information, refer to S602.

S1203: The gNB records, based on the indication information, a status in which the UE can accept paging.

In some embodiments, after receiving the indication information sent in S1203, the gNB starts a timer based on the indication information. Before the timer expires, the gNB does not send paging to the UE, or sends only paging that meets a requirement of the indication information to the UE.

S1204: The gNB releases a connection between the SIM1 of the UE and the gNB.

In other words, the gNB performs a suspension process.

S1205 and S1206: A core network device sends downlink data of the SIM1 to the gNB, and the gNB receives the downlink data sent to the SIM1.

S1207: The gNB determines, based on the information recorded in S1203, a to-be-performed operation.

If the indication information indicates to stop sending SIM1 paging to the terminal, the gNB stores the data, and does not initiate paging.

If the indication information includes or indicates a service corresponding to which SIM1 paging can be sent, the gNB determines whether the service that triggers paging meets a requirement. If the service that triggers paging does not meet the requirement, the gNB stores the data, and does not initiate paging.

The gNB may determine, based on a paging priority indication, a type of the service that triggers paging.

If the indication information includes or indicates a PDU session corresponding to which SIM1 paging can be sent, the gNB determines whether the PDU session that triggers paging meets a requirement. If the PDU session that triggers paging does not meet the requirement, the gNB stores the data, and does not initiate paging.

The gNB locally determines the PDU session that triggers paging.

If the indication information includes or indicates a QoS flow corresponding to which SIM1 paging can be sent, the gNB determines whether the QoS flow that triggers paging meets a requirement. If the QoS flow that triggers paging does not meet the requirement, the gNB stores the data, and does not initiate paging.

The gNB locally determines the QoS flow that triggers paging.

S1208: When determining that the service of the SIM2 ends, the UE may switch to the SIM1 to continue to perform a service.

S1209: The UE sends a resume request to the gNB through the SIM1, for example, an RRC resume request message, where the resume request includes indication information 2. The indication information 2 indicates that the service of the SIM2 ends, or indicates that the SIM1 can be normally paged. That is, the indication information 2 indicates that the network side can send all paging or disable a dual-card paging optimization function.

S1210: The gNB completes an RRC resume process.

S1211: Send the stored data to the UE.

Application Scenario 8:

When determining to perform a service of a SIM1, a terminal may send information to a network of a SIM2, so that the network (gNB) of the SIM2 stops paging the SIM2 or sends a paging message that meets a condition to page the SIM2.

Figure 13:
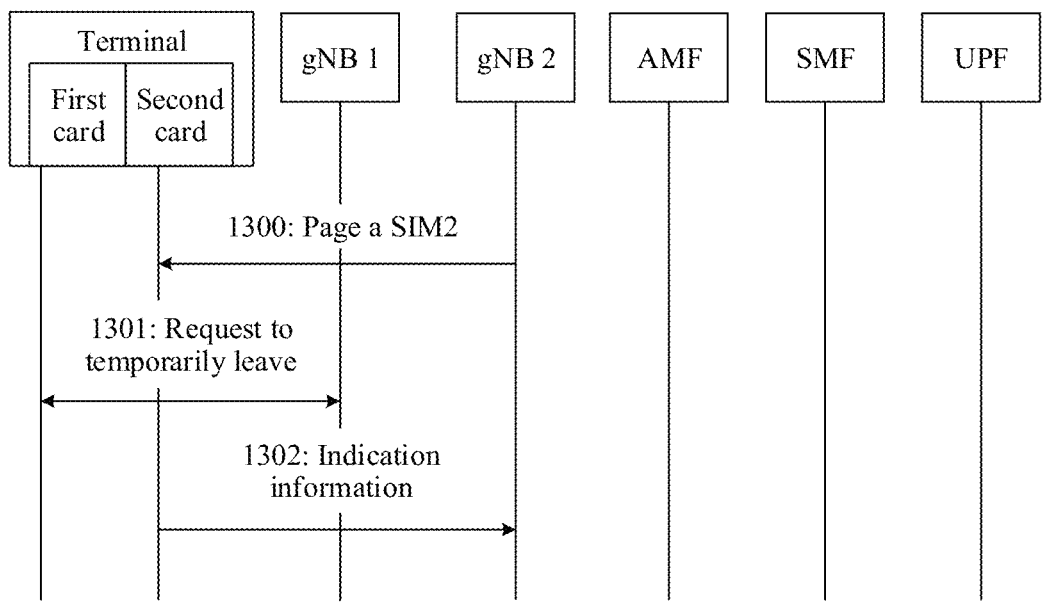
FIG. 13 is a schematic flowchart of a communications method in an application scenario 8 according to an embodiment of this application.

As shown in FIG. 13, a process embodiment is described as follows:

S1300 to S1302 are the same as S700 to S702.

S1303 to S1311 are similar to S1203 to S1211, except that the description of the SIM1 is replaced with the description of the SIM2, and the description of the SIM2 is replaced with the description of the SIM1.

It should be noted that the gNB, the AMF, the SMF, and the UPF in FIG. 12 are respectively a gNB, an AMF, an SMF, and a UPF in the network with which the SIM1 registers. The gNB 2, the AMF, the SMF, and the UPF in FIG. 13 are respectively a gNB 2, an AMF, an SMF, and a UPF in the network with which the SIM2 registers.

In the application scenarios 1 to 6, the indication information is sent by using an RRC message. The indication information may alternatively be sent by using a NAS message. For example, the terminal sends a NAS message to the AMF, and uses the NAS message to carry indication information, or the terminal sends a NAS message to the SMF, and uses the NAS message to carry indication information. An example in which the terminal sends a NAS message to the AMF and uses the NAS message to carry the indication information is used to describe an application scenario 9 by using FIG. 14.

Figure 14:
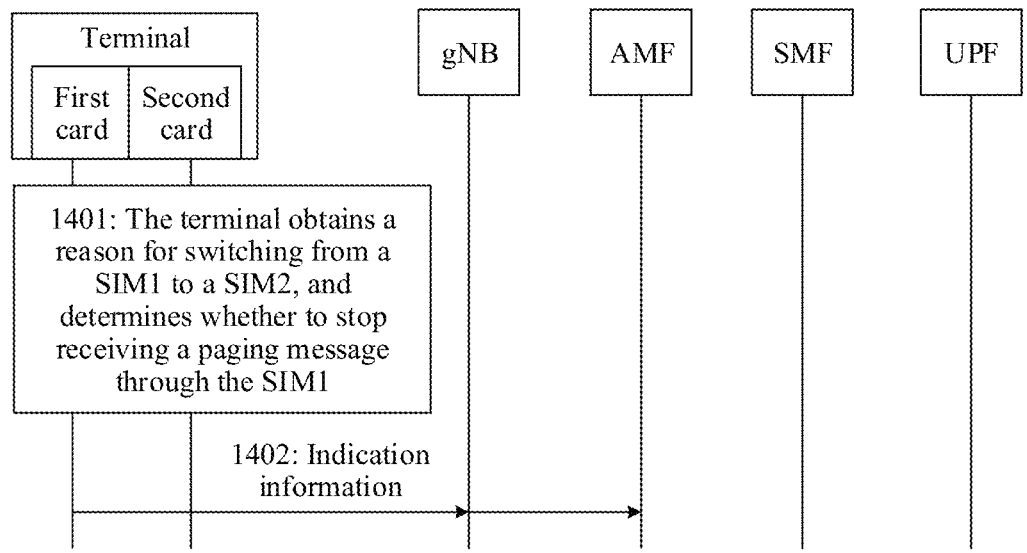
FIG. 14 is a schematic flowchart of a communications method in an application scenario 9 according to an embodiment of this application.

Application Scenario 9:

FIG. 14 shows a process in which a terminal sends indication information by using a NAS message.

S1401 is the same as S601/S701/S801/S901/S1001/S1101/S1201/S1301.

S1402: The terminal sends a NAS message to the AMF, where the NAS message carries indication information.

Subsequent operations are the same as operations performed by the AMF after the AMF receives the indication information in the foregoing application scenarios. The application scenario 9 describes a process in the foregoing application scenarios, and a difference is that the RRC message carrying indication information in the foregoing application scenarios is changed to the NAS message. Specific details are similar to those in the foregoing application scenarios 1 to 6, and only a message carrying indication information is changed from the RRC message to the NAS message. For details, refer to the description of the application scenarios 1 to 6. Repeated parts are not described herein again.

Figure 15A:
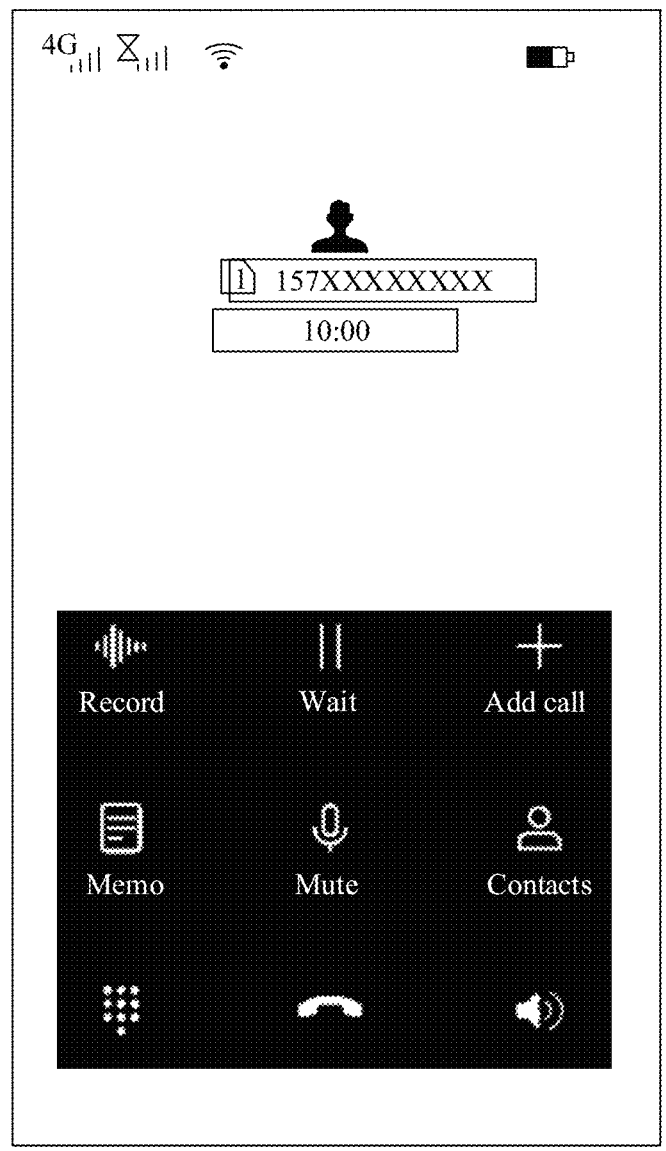
FIG. 15a is a schematic diagram 1 of an interface in a scenario of switching from a card 1 to a card 2 according to an embodiment of this application.
Figure 15B:
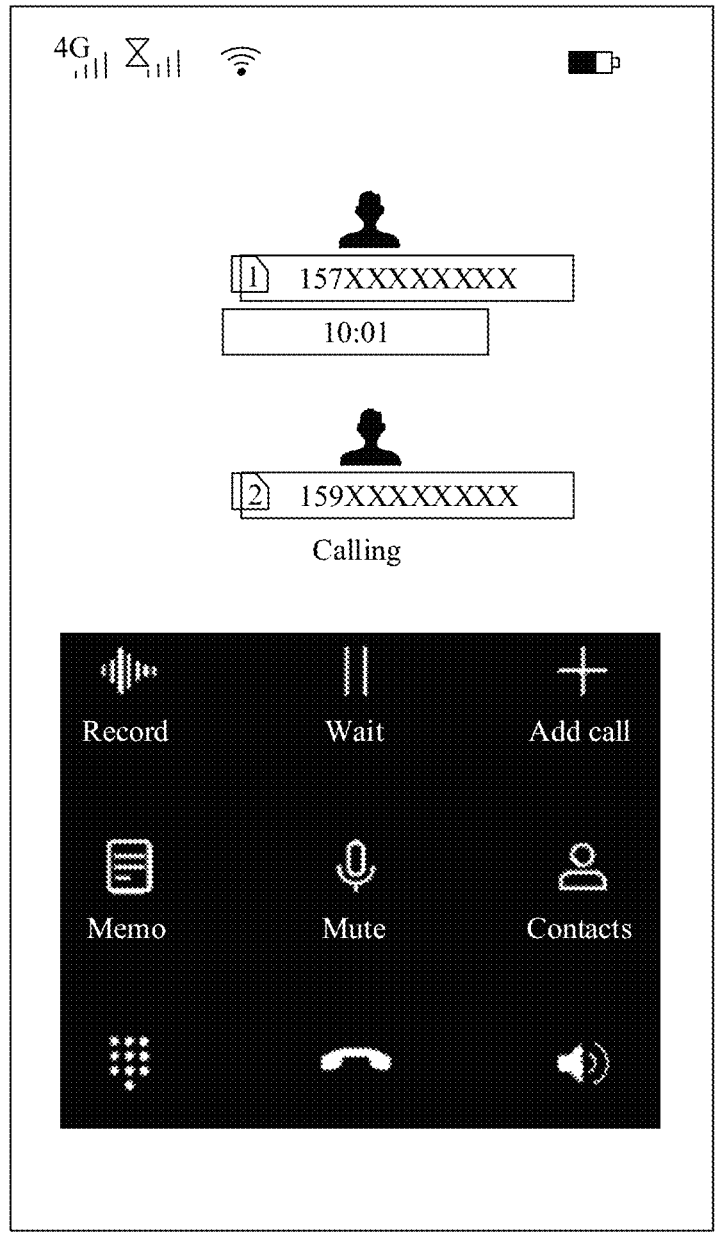
FIG. 15b is a schematic diagram 2 of an interface in a scenario of switching from a card 1 to a card 2 according to an embodiment of this application.

For further understanding of embodiments of this application, based on the descriptions of the foregoing embodiments, the following provides a possible application example. As shown in FIG. 15a and FIG. 15b, a terminal has two cards, which are represented by a card 1 and a card 2. Signal icons of the two cards are displayed in an upper left corner of an interface of the terminal. An example of the application is described as follows:

As shown in FIG. 15a, a network side serves the card 1 of the terminal. The card 1 is in connected state, and the card 2 is in non-connected state.

Figure 15C:
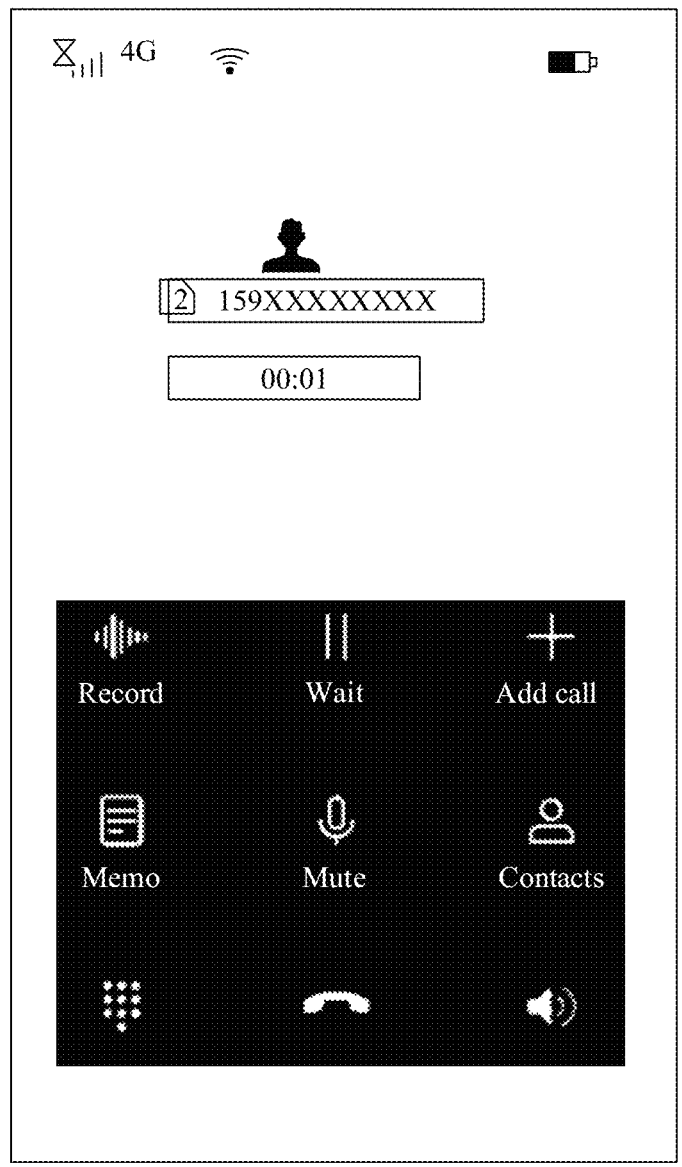
FIG. 15c is a schematic diagram 1 of an interface in a scenario of switching from a card 1 to a card 2 according to an embodiment of this application.
Figure 15D:
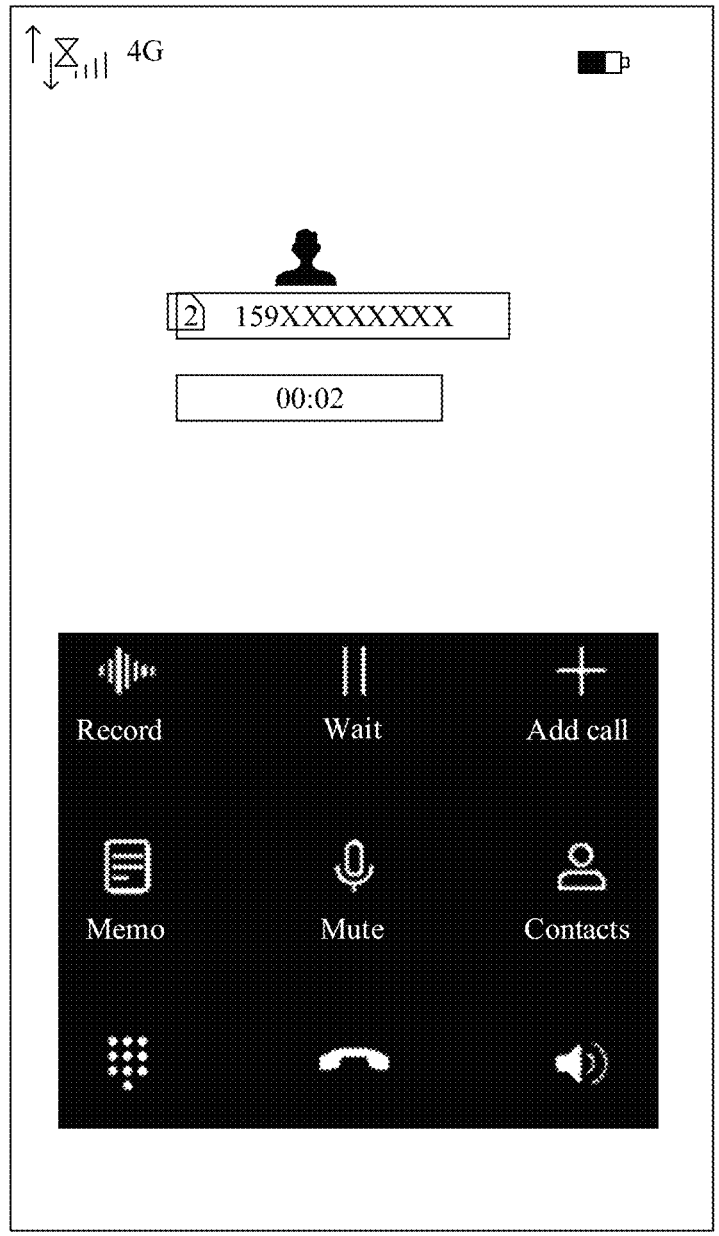
FIG. 15d is a schematic diagram 2 of an interface in a scenario of switching from a card 1 to a card 2 according to an embodiment of this application.

For example, the terminal performs a voice call service through the card 1, and performs a voice call service with a user 157xxxxxxxx. Call duration is 10:00 min. In FIG. 15b, at a moment at which the terminal performs a voice call service through the card 1 for duration of 10:01 min, a voice call prompt for the card 2 is received, and a user 159xxxxxxxx is calling the card 2. As shown in FIG. 15c, the terminal determines to answer the voice call to the card 2, hangs up the call to the card 1, and sends first information to the network side of the card 1 through the card 1. The terminal determines, based on importance or a priority of the voice service on the card 2, content included or indicated by the first information. For example, the first information may indicate the network side of the card 1 to stop sending a card 1 paging message to the terminal. For another example, the first information may indicate a condition in which the network side of the card 1 is allowed to send a card 1 paging message to the terminal. In this way, an indication of the first information can avoid impact on the card 2 caused when the network side of the card 1 pages the card 1 in a process in which the card 2 is used to perform a voice call service. If the first information indicates the condition in which the network side of the card 1 is allowed to send a card 1 paging message to the terminal, for example, as shown in FIG. 15d, the card 1 paging message may be allowed for an internet access service. In this case, when the card 2 is used to perform a voice call service, the card 1 may be used to access a network.

With reference to the foregoing description, this application provides the following embodiments.

A first aspect is applied to a communications apparatus. The communications apparatus may be a terminal, or may be a chip or the like that can be disposed on a terminal. A method embodiment is described as follows:

Embodiment 1: A communications method is provided, and is performed by a communications apparatus. The communications apparatus supports a SIM card 1 and a SIM card 2, and the method includes:

determining that the SIM1 is in connected state and the SIM2 is to enter a connected state from a non-connected state; and
   sending first information to a first device through the SIM1, where the first information indicates to stop sending a SIM1 paging message to the communications apparatus, or the first information includes or indicates a condition in which sending a SIM1 paging message to the communications apparatus is allowed.

Embodiment 2: According to the method in Embodiment 1, the first information includes or indicates the condition in which the first device or a second device is allowed to send a SIM1 paging message to the communications apparatus, and the first information includes or indicates:

information about a service that allows the first device or the second device to send a SIM1 paging message to the communications apparatus; or
   information about a PDU session that allows the first device or the second device to send a SIM1 paging message to the communications apparatus; or
   information about a QoS flow that allows the first device or the second device to send a SIM1 paging message to the communications apparatus; or
   information about a service that triggers the SIM2 to enter a connected state; or
   information about a PDU session that triggers the SIM2 to enter a connected state; or
   information about a QoS flow that triggers the SIM2 to enter a connected state.

Embodiment 3: According to the method in Embodiment 2, the information about a service that allows sending a SIM1 paging message to the communications apparatus includes:

a type of a service that allows sending a SIM1 paging message to the communications apparatus; or
   a priority of a service that allows sending a SIM1 paging message to the communications apparatus; or
   a lowest priority of services that allow sending a SIM1 paging message to the communications apparatus.

Embodiment 4: According to the method in Embodiment 2 or 3, the information about a PDU session that allows sending a SIM1 paging message to the communications apparatus includes:

description information used to describe a PDU session that allows sending a SIM1 paging message to the communications apparatus; or a priority of a PDU session that allows sending a SIM1 paging message to the communications apparatus; or
   a lowest priority of PDU sessions that allow sending a SIM1 paging message to the communications apparatus.

Embodiment 5: According to the method in Embodiment 2, the information about a service that allows sending a SIM1 paging message to the communications apparatus includes:

description information used to describe a quality of service QoS flow that allows sending a SIM1 paging message to the communications apparatus; or
   a QoS priority of a QoS flow that allows sending a SIM1 paging message to the communications apparatus; or
   a lowest priority of QoS flows that allow sending a SIM1 paging message to the communications apparatus.

Embodiment 6: According to the method in Embodiment 1, a service that triggers the SIM2 to enter a connected state is an emergency call service or a location update service, and the first information indicates the first device or a second device to stop sending a SIM1 paging message to the communications apparatus.

Embodiment 7: According to the method in any one of Embodiments 1 to 6, the method further includes:

receiving a first paging message for paging the SIM2, where the first paging message includes or indicates information about the service that triggers the SIM2 to enter a connected state; and
   determining the first information based on the information about the service that triggers the SIM2 to enter a connected state.

Embodiment 8: According to the method in any one of Embodiments 1 to 6, the method further includes:

receiving, from the first device, a second paging message for paging the SIM2;
   enabling the SIM2 to enter a connected state;
   determining information about the service that triggers the SIM2 to enter a connected state; and
   determining the first information based on the information about the service that triggers the SIM2 to enter a connected state.

Embodiment 9: According to the method in Embodiment 8, the enabling the SIM2 to enter a connected state includes:

sending, through the SIM1, a request message to an access network device serving the SIM1, where the request message is used to request to suspend scheduling a slot of the SIM1; and
   connecting, in the slot through the SIM2, to an access network device serving the SIM2.

Embodiment 10: According to the method in any one of Embodiments 1 to 9, the sending first information to a first device through the SIM1 includes:

determining that a priority of the service that triggers the SIM2 to enter a connected state is higher than a priority of a service performed when the SIM1 is in connected state; and
   sending the first information to the first device through the SIM1.

Embodiment 11: According to the method in any one of Embodiments 1 to 10, the first information includes information about a timer, and the information about the timer indicates duration in which the first device or the second device stops sending a SIM1 paging message to the communications apparatus, or indicates duration in which sending a paging message meeting the condition to the communications apparatus is allowed.

Embodiment 12: According to the method in any one of Embodiments 1 to 11, the method further includes:

receiving second information sent by the first device or the second device, where the second information indicates to change the SIM1 to a non-connected state; and enabling, based on the second information, the SIM2 to enter a connected state.

Embodiment 13: According to the method in Embodiment 12, the method further includes:
  if the communications apparatus determines that the SIM2 is switched from a connected state to a non-connected state, or determines that the service that triggers the SIM2 to enter a connected state ends,
  sending third information to the first device through the SIM1, where the third information indicates that the first device or the second device is allowed to send a paging message to the SIM1.

Embodiment 14: According to the method in any one of Embodiments 1 to 13, the sending first information to a first device through the SIM1 includes:
  sending, through the SIM1, an RRC message to an access network device serving the communications apparatus, where the RRC message carries the first information; or
  sending, through the SIM1, a NAS message to a core network device serving the communications apparatus, where the first NAS message carries the first information.

Embodiment 15: According to the method in Embodiment 14, the RRC message is a user equipment assistance information message; or the RRC message is a release message requested by user equipment; or the RRC message is a suspend message requested by user equipment.

Embodiment 16: According to the method in Embodiment 14, the NAS message is a registration message; or the NAS message is an uplink transport message; or the NAS message is a PDU session modification message.

A second aspect is applied to a network device side. For example, the network device is a first device. A method embodiment is described as follows:

Embodiment 1: A communications method is provided, and is performed by the first device. The method includes:
  serving a SIM1 of a communications apparatus, where the communications apparatus includes the SIM1 and a SIM2; and
  receiving first information from the communications apparatus, where the first information indicates the first device or a second device to stop sending a SIM1 paging message to the communications apparatus, or the first information includes or indicates a condition in which the first device or a second device is allowed to send a SIM1 paging message to the communications apparatus.

Embodiment 2: According to the method in Embodiment 1, the first information indicates the first device to stop sending a SIM1 paging message to the communications apparatus, or the first information includes or indicates a condition in which the first device is allowed to send a SIM1 paging message to the communications apparatus; and
  the method further includes:
    stopping, based on the first information, sending a SIM1 paging message to the communications apparatus, or determining, based on the first information, the condition in which sending a SIM1 paging message to the communications apparatus is allowed.

Embodiment 3: According to the method in Embodiment 1, the first information indicates the second device to stop sending a SIM1 paging message to the communications apparatus, or the first information includes or indicates a condition in which the second device is allowed to send a SIM1 paging message to the communications apparatus; and
  the method further includes:
    forwarding the first information to the second device, or sending second information based on the first information, where the second information indicates the second device to stop sending a SIM1 paging message to the communications apparatus, or the second information includes or indicates the condition in which the second device is allowed to send a SIM1 paging message to the communications apparatus.

Embodiment 4: According to the method in Embodiment 1, the first information includes or indicates the condition in which the first device or the second device is allowed to send a SIM1 paging message to the communications apparatus, and the first information includes or indicates:
  information about a service that allows the first device or the second device to send a SIM1 paging message to the communications apparatus; or information about a PDU session that allows the first device or the second device to send a SIM1 paging message to the communications apparatus; or information about a QoS flow that allows the first device or the second device to send a SIM1 paging message to the communications apparatus; or information about a service that triggers the SIM2 to enter a connected state; or information about a PDU session that triggers the SIM2 to enter a connected state; or information about a QoS flow that triggers the SIM2 to enter a connected state.

Embodiment 5: According to the method in Embodiment 4, the information about a service that allows sending a SIM1 paging message to the communications apparatus includes:
  a type of a service that allows sending a SIM1 paging message to the communications apparatus; or a priority of a service that allows sending a SIM1 paging message to the communications apparatus; or a lowest priority of services that allow sending a SIM1 paging message to the communications apparatus.

Embodiment 6: According to the method in Embodiment 4 or 5, the information about a PDU session that allows sending a SIM1 paging message to the communications apparatus includes:
  description information used to describe a PDU session that allows sending a SIM1 paging message to the communications apparatus; or a priority of a PDU session that allows sending a SIM1 paging message to the communications apparatus; or a lowest priority of PDU sessions that allow sending a SIM1 paging message to the communications apparatus.

Embodiment 7: According to the method in Embodiment 4, the information about a service that allows sending a SIM1 paging message to the communications apparatus includes:
  description information used to describe a quality of service QoS flow that allows sending a SIM1 paging message to the communications apparatus; or a QoS priority of a QoS flow that allows sending a SIM1 paging message to the communications apparatus; or a lowest priority of QoS flows that allow sending a SIM1 paging message to the communications apparatus.

Embodiment 8: According to the method in Embodiment 1, a service that triggers the SIM2 to enter a connected state is an emergency call service or a location update service, and the first information indicates the first device or a second device to stop sending a SIM1 paging message to the communications apparatus.

Embodiment 9: According to the method in any one of Embodiments 1 to 8, the first information includes information about a timer, and the method further includes:

before the timer expires, stopping sending a SIM1 paging message to the communications apparatus, or sending a paging message meeting the condition to the communications apparatus.

Embodiment 10: According to the method in any one of Embodiments 1 to 9, the method further includes:
sending second information to the communications apparatus, where the second information indicates to change the SIM1 to a non-connected state, and indicates the communications apparatus to enable the SIM2 to enter a connected state.

Embodiment 11: According to the method in any one of Embodiments 1 to 10, the first device is an access network device, and the receiving first information from the communications apparatus includes: receiving an RRC message from the communications apparatus, where the RRC message carries the first information; or
the first device is a core network device, and the receiving first information from the communications apparatus includes: receiving a NAS message from the communications apparatus, where the NAS message carries the first information.

Embodiment 12: According to the method in Embodiment 11, the RRC message is a user equipment assistance information message; or the RRC message is a release message requested by user equipment; or the RRC message is a suspend message requested by user equipment.

Embodiment 13: According to the method in Embodiment 11, the NAS message is a registration message; or the NAS message is an uplink transport message; or the NAS message is a PDU session modification message.

According to a third aspect, a method embodiment is described as follows:

Embodiment 1: A communications method is provided, and is performed by a communications apparatus. The communications apparatus supports a SIM1 and a SIM2, and the method includes:
determining that the SIM1 is in connected state and the SIM2 is to enter a connected state from a non-connected state; and
sending first information to a first device through the SIM2, where the first information indicates the first device or a second device to stop sending a SIM2 paging message to the communications apparatus, or the first information includes or indicates a condition in which the first device or a second device is allowed to send a SIM2 paging message to the communications apparatus.

Embodiment 2: According to the communications method in the Embodiment 1, the first information includes or indicates the condition in which the first device or the second device is allowed to send a SIM1 paging message to the communications apparatus. The first information includes or indicates: information about a service that allows the first device or the second device to send a SIM2 paging message to the communications apparatus; or information about a PDU session that allows the first device or the second device to send a SIM2 paging message to the communications apparatus; or information about a QoS flow that allows the first device or the second device to send a SIM2 paging message to the communications apparatus; or information about a service performed when the SIM1 is in connected state; or information about a PDU session performed when the SIM1 is in connected state; or information about a QoS flow performed when the SIM1 is in connected state.

Embodiment 3: According to the method in Embodiment 2, the information about a service that allows sending a SIM2 paging message to the communications apparatus includes:
a type of a service that allows sending a SIM2 paging message to the communications apparatus; or a priority of a service that allows sending a SIM2 paging message to the communications apparatus; or a lowest priority of services that allow sending a SIM2 paging message to the communications apparatus.

Embodiment 4: According to the method in Embodiment 2 or 3, the information about a PDU session that allows sending a SIM2 paging message to the communications apparatus includes:
description information used to describe a PDU session that allows sending a SIM2 paging message to the communications apparatus; or a priority of a PDU session that allows sending a SIM2 paging message to the communications apparatus; or a lowest priority of PDU sessions that allow sending a SIM2 paging message to the communications apparatus.

Embodiment 5: According to the method in Embodiment 2, the information about a service that allows sending a SIM2 paging message to the communications apparatus includes:
description information used to describe a quality of service QoS flow that allows sending a SIM2 paging message to the communications apparatus; or a QoS priority of a QoS flow that allows sending a SIM2 paging message to the communications apparatus; or a lowest priority of QoS flows that allow sending a SIM2 paging message to the communications apparatus.

Embodiment 7: According to the method in any one of Embodiments 1 to 6, the method further includes:
receiving a first paging message for paging the SIM2, where the first paging message includes or indicates information about the service that triggers the SIM2 to enter a connected state; and
determining the first information based on the information about the service that triggers the SIM2 to enter a connected state.

Embodiment 8: According to the method in any one of Embodiments 1 to 6, the method further includes:
receiving, from the first device, a second paging message for paging the SIM2;
enabling the SIM2 to enter a connected state;
determining information about the service that triggers the SIM2 to enter a connected state; and
determining the first information based on the information about the service that triggers the SIM2 to enter a connected state.

Embodiment 9: According to the method in Embodiment 8, the enabling the SIM2 to enter a connected state includes:
sending, through the SIM1, a request message to an access network device serving the SIM1, where the request message is used to request to suspend scheduling a slot of the SIM1; and
connecting, in the slot through the SIM2, to an access network device serving the SIM2.

Embodiment 10: According to the method in any one of Embodiments 1 to 9, the sending first information to a first device through the SIM2 includes:
determining that a priority of the service that triggers the SIM2 to enter a connected state is lower than a priority of a service performed when the SIM1 is in connected state; and sending the first information to the first device through the SIM2.

Embodiment 11: According to the method in any one of Embodiments 1 to 10, the method further includes:
the first information includes information about a timer, and the information about the timer indicates duration in which the first device or the second device stops sending a SIM2 paging message to the communications apparatus, or indicates duration in which sending a paging message meeting the condition to the communications apparatus is allowed.

Embodiment 12: According to the method in any one of Embodiments 1 to 11, the sending first information to a first device through the SIM2 includes:
sending, through the SIM2, an RRC message to an access network device serving the communications apparatus, where the first RRC message carries the first information; or sending, through the SIM2, a NAS message to a core network device serving the communications apparatus, where the first NAS message carries the first information.

Embodiment 13: According to the method in Embodiment 12, the RRC message is a user equipment assistance information message; or the RRC message is a release message requested by user equipment; or the RRC message is a suspend message requested by user equipment.

Embodiment 14: According to the method in Embodiment 12, the NAS message is a registration message; or the NAS message is an uplink transport message; or the NAS message is a PDU session modification message.

A fourth aspect is applied to a network device side. For example, a network device is a first device, and a method embodiment is described below.

Embodiment 1: A communications method is provided, and is performed by the first device. The method includes:
serving a SIM1 of a communications apparatus, where the communications apparatus includes the SIM1 and a SIM2; and
receiving first information from the communications apparatus, where the first information indicates the first device or a second device to stop sending a SIM2 paging message to the communications apparatus, or the first information includes or indicates a condition in which the first device or a second device is allowed to send a SIM2 paging message to the communications apparatus.

Embodiment 2: According to the method in Embodiment 1, the first information indicates the first device to stop sending a SIM2 paging message to the communications apparatus, or the first information includes or indicates a condition in which the first device is allowed to send a SIM2 paging message to the communications apparatus; and
the method further includes:
stopping, based on the first information, sending a SIM2 paging message to the communications apparatus, or determining, based on the first information, the condition in which sending a SIM2 paging message to the communications apparatus is allowed.

Embodiment 3: According to the method in Embodiment 1, the first information indicates the second device to stop sending a SIM2 paging message to the communications apparatus, or the first information includes or indicates a condition in which the second device is allowed to send a SIM2 paging message to the communications apparatus; and
the method further includes:
forwarding the first information to the second device, or sending second information based on the first information, where the second information indicates the second device to stop sending a SIM2 paging message to the communications apparatus, or the second information includes or indicates the condition in which the second device is allowed to send a SIM2 paging message to the communications apparatus.

Embodiment 4: According to the method in Embodiment 1, the first information includes or indicates the condition in which the first device or the second device is allowed to send a SIM1 paging message to the communications apparatus, and the first information includes or indicates:
information about a service that allows the first device or the second device to send a SIM2 paging message to the communications apparatus; or information about a PDU session that allows the first device or the second device to send a SIM2 paging message to the communications apparatus; or information about a QoS flow that allows the first device or the second device to send a SIM2 paging message to the communications apparatus; or information about a service performed when the SIM1 is in connected state; or information about a PDU session performed when the SIM1 is in connected state; or information about a QoS flow performed when the SIM1 is in connected state.

Embodiment 5: According to the method in Embodiment 4, the information about a service that allows sending a SIM2 paging message to the communications apparatus includes:
a type of a service that allows sending a SIM2 paging message to the communications apparatus; or a priority of a service that allows sending a SIM2 paging message to the communications apparatus; or a lowest priority of services that allow sending a SIM2 paging message to the communications apparatus.

Embodiment 6: According to the method in Embodiment 4 or 5, the information about a PDU session that allows sending a SIM2 paging message to the communications apparatus includes:
description information used to describe a PDU session that allows sending a SIM2 paging message to the communications apparatus; or a priority of a PDU session that allows sending a SIM2 paging message to the communications apparatus; or a lowest priority of PDU sessions that allow sending a SIM2 paging message to the communications apparatus.

Embodiment 7: According to the method in Embodiment 4, the information about a service that allows sending a SIM2 paging message to the communications apparatus includes:
description information used to describe a quality of service QoS flow that allows sending a SIM2 paging message to the communications apparatus; or a QoS priority of a QoS flow that allows sending a SIM2 paging message to the communications apparatus; or a lowest priority of QoS flows that allow sending a SIM2 paging message to the communications apparatus.

Embodiment 8: According to the method in any one of Embodiments 1 to 7, the first information includes information about a timer, and the method further includes:
before the timer expires, stopping sending a SIM2 paging message to the communications apparatus, or sending a paging message meeting the condition to the communications apparatus.

Embodiment 9: According to the method in any one of Embodiments 1 to 8, the first device is an access network device, and the receiving first information from the communications apparatus includes: receiving an RRC message from the communications apparatus, where the RRC message carries the first information; or the first device is a core network device, and the receiving first information from the communications apparatus includes: receiving a NAS message from the communications apparatus, where the NAS message carries the first information.

Embodiment 10: According to the method in Embodiment 9, the RRC message is a user equipment assistance information message; or the RRC message is a release message requested by user equipment; or the RRC message is a suspend message requested by user equipment.

Embodiment 11: According to the method in Embodiment 9, the NAS message is a registration message; or the NAS message is an uplink transport message; or the NAS message is a PDU session modification message.

Figure 16:
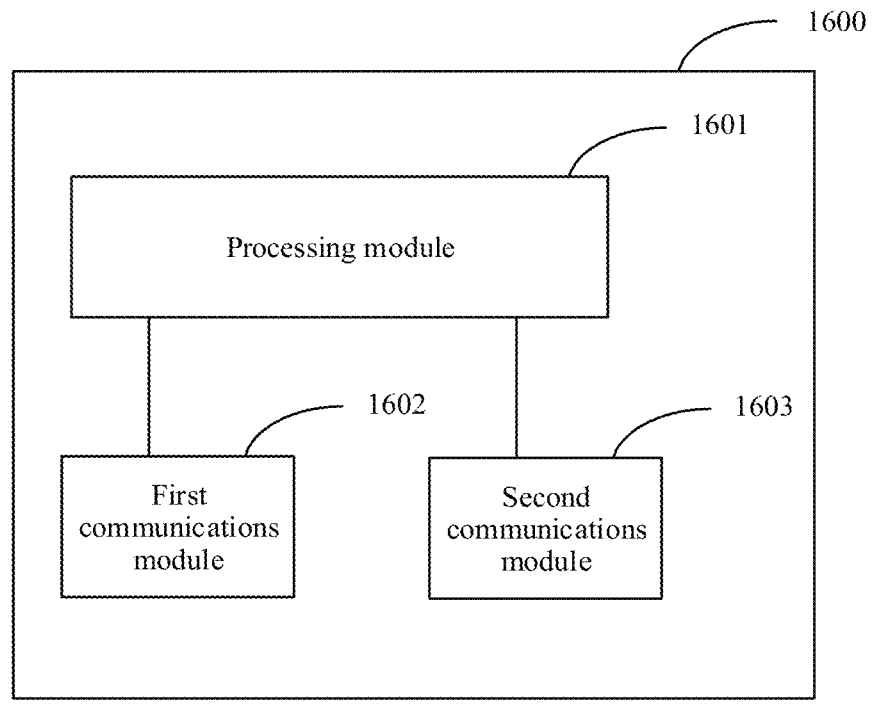
FIG. 16 is a schematic diagram 1 of a structure of a communications apparatus according to an embodiment of this application.

As shown in FIG. 16, based on a same technical concept, embodiments of this application further provide a communications apparatus 1600. The communications apparatus 1600 may support installation of at least two SIM cards. The communications apparatus 1600 may be a terminal, or may be an apparatus in a terminal or a network device, or an apparatus that can be used in cooperation with a terminal or a network device. In a design, the communications apparatus 1600 may include modules that one-to-one correspond to the methods/operations/steps/actions performed by the terminal in the method embodiments. The modules may be implemented by a hardware circuit, software, or a combination of a hardware circuit and software. In a design, the communications apparatus 1600 may include a processing module 1601, a first communications module 1602, and a second communications module 1603. The processing module 1601 is configured to invoke the first communications module SIM1 1602 or the second communications module SIM2 1603 to perform a receiving and/or sending function. When the communications apparatus 1600 implements the foregoing method embodiments, specific operations performed by the modules are described in the fifth aspect or the sixth aspect.

According to the fifth aspect, an embodiment is described as follows:

Embodiment 1: A communications apparatus is provided, including a processing module, a first communications module SIM1, and a second communications module SIM2.

The processing module is configured to:
when the SIM1 is in connected state, determine that the SIM2 is to enter a connected state from a non-connected state; and
send first information to a first device through the SIM1, where the first information indicates the first device or a second device to stop sending a SIM1 paging message to the terminal, or the first information includes or indicates a condition in which the first device or a second device is allowed to send a SIM1 paging message to the terminal.

For a function included or indicated by the first information, refer to the embodiment in the first aspect. Details are not described herein again.

Embodiment 2: According to the apparatus in Embodiment 1, the processing module is further configured to:
receive, through the SIM2, a first paging message for paging the SIM2, where the first paging message includes or indicates information about a service that triggers the SIM2 to enter a connected state.

The processing module is further configured to determine the first information based on the information about the service that triggers the SIM2 to enter a connected state.

Embodiment 3: According to the apparatus in Embodiment 1 or 2, the processing module is further configured to receive, from the first device through the SIM2, a second paging message for paging the SIM2.

The processing module is further configured to enable the SIM2 to enter a connected state; determine information about a service that triggers the SIM2 to enter a connected state; and determine the first information based on the information about the service that triggers the SIM2 to enter a connected state.

Embodiment 4: According to the apparatus in Embodiment 1, 2, or 3, when enabling the SIM2 to enter a connected state, the processing module is configured to send, through the SIM1, a request message to an access network device serving the SIM1, where the request message is used to request to suspend scheduling a slot of the SIM1. The processing module is configured to connect, in the slot through the SIM2, to an access network device that provides a service for the SIM2.

Embodiment 5: According to the apparatus in any one of Embodiments 1 to 4, when sending the first information to the first device through the SIM1, the processing module is configured to determine that a priority of the service that triggers the SIM2 to enter a connected state is higher than a priority of a service performed when the SIM1 is in connected state. The processing module is configured to send the first information to the first device through the SIM1.

Embodiment 6: According to the apparatus in any one of Embodiments 1 to 5, the first information includes information about a timer, and the information about the timer indicates duration in which the first device or the second device stops sending a SIM1 paging message to the terminal, or indicates duration in which sending a paging message meeting the condition to the terminal is allowed.

Embodiment 7: According to the apparatus in any one of Embodiments 1 to 6, the processing module is further configured to:
receive, through the SIM1, second information sent by the first device or the second device, where the second information indicates to change the SIM1 to a non-connected state; and
the processing module is further configured to enable, based on the second information, the SIM2 to enter a connected state.

Embodiment 8: According to the apparatus in Embodiment 7,
the processing module is further configured to determine that the SIM2 is switched from a connected state to a non-connected state, or determine that the service that triggers the SIM2 to enter a connected state ends; and
the processing module is further configured to send third information to the first device through the SIM1, where the third information indicates that the first device or the second device is allowed to send a paging message to the SIM1.

Embodiment 9: According to the apparatus in any one of Embodiments 1 to 8, when sending the first information to the first device in through the SIM1, the processing module is configured to:
send, through the SIM1, an RRC message to an access network device serving the terminal, where the RRC message carries the first information; or send, through the SIM1, a NAS message to a core network device serving the terminal, where the first NAS message carries the first information.

Embodiment 10: According to the apparatus in Embodiment 9, the RRC message is a user equipment assistance information message; or the RRC message is a release message requested by user equipment; or the RRC message is a suspend message requested by user equipment.

Embodiment 11: According to the apparatus in Embodiment 9, the NAS message is a registration message; or the NAS message is an uplink transport message; or the NAS message is a PDU session modification message.

According to the sixth aspect, an embodiment is described as follows:

Embodiment 1: A communications apparatus is provided, including a processing module and a communications module.

The processing module is configured to determine that when the SIM1 is in connected state, the SIM2 may enter a connected state from a non-connected state.

The communications module is further configured to send, by using the processing module, first information to a first device through the SIM2, where the first information indicates to stop sending a SIM2 paging message to the terminal, or the first information includes or indicates a condition in which sending a SIM2 paging message to the terminal is allowed.

Embodiment 2: According to the apparatus in Embodiment 1, the first information includes or indicates the condition in which sending a SIM1 paging message to the terminal is allowed, and the first information includes or indicates:

information about a service that allows sending a SIM2 paging message to the terminal; or information about a PDU session that allows the first device or the second device to send a SIM2 paging message to the terminal; or information about a QoS flow that allows the first device or the second device to send a SIM2 paging message to the terminal; or information about a service performed when the SIM1 is in connected state; or information about a PDU session performed when the SIM1 is in connected state; or information about a QoS flow performed when the SIM1 is in connected state.

Embodiment 3: According to the apparatus in Embodiment 2, the information about a service that allows sending a SIM2 paging message to the terminal includes:

a type of service that allows sending a SIM2 paging message to the terminal; or a priority of a service that allows sending a SIM2 paging message to the terminal; or a lowest priority of services that allow sending a SIM2 paging message to the terminal.

Embodiment 4: According to the apparatus in Embodiment 2 or 3, the information about a PDU session that allows sending a SIM2 paging message to the terminal includes:

description information used to describe a PDU session that allows sending a SIM2 paging message to the terminal; or a priority of a PDU session that allows sending a SIM2 paging message to the terminal; or a lowest priority of PDU sessions that allow sending a SIM2 paging message to the terminal.

Embodiment 5: According to the apparatus in Embodiment 2, the information about a service that allows sending a SIM2 paging message to the terminal includes:

description information used to describe a quality of service QoS flow that allows sending a SIM2 paging message to the terminal; or a QoS priority of a QoS flow that allows sending a SIM2 paging message to the terminal; or a lowest priority of QoS flows that allow sending a SIM2 paging message to the terminal.

Embodiment 7: According to the apparatus in any one of Embodiments 1 to 6, the processing module is further configured to:

receive, through the SIM2, a first paging message for paging the SIM2, where the first paging message includes or indicates information about a service that triggers the SIM2 to enter a connected state.

The processing module is further configured to determine the first information based on the information about the service that triggers the SIM2 to enter a connected state.

Embodiment 8: According to the apparatus in any one of Embodiments 1 to 6, the processing module is further configured to receive, from the first device through the SIM2, a second paging message for paging the SIM2; and enable the SIM2 to enter a connected state; determine information about a service that triggers the SIM2 to enter a connected state; and determine the first information based on the information about the service that triggers the SIM2 to enter a connected state.

Embodiment 9: According to the apparatus in Embodiment 8, when enabling the SIM2 to enter a connected state, the processing module is configured to send, through the SIM1, a request message to an access network device serving the SIM1, where the request message is used to request to suspend scheduling a slot of the SIM1; and connect, in the slot through the SIM2, to an access network device serving the SIM2.

Embodiment 10: According to the apparatus in any one of Embodiments 1 to 9, when sending the first information to the first device through the SIM2, the processing module is configured to determine that a priority of the service that triggers the SIM2 to enter a connected state is lower than a priority of a service performed when the SIM1 is in connected state; and send the first information to the first device through the SIM2.

Embodiment 11: According to the apparatus in any one of Embodiments 1 to 10, the first information includes information about a timer, and the information about the timer indicates duration in which the first device or the second device stops sending a SIM2 paging message to the terminal, or indicates duration in which sending a paging message meeting the condition to the terminal is allowed.

Embodiment 12: According to the apparatus in any one of Embodiments 1 to 11, when sending the first information to the first device in through the SIM2, the processing module is configured to:

send, through the SIM2, an RRC message to an access network device serving the terminal, where the first RRC message carries the first information; or send, through the SIM2, a NAS message to a core network device serving the terminal, where the first NAS message carries the first information.

Embodiment 13: According to the apparatus in Embodiment 12, the RRC message is a user equipment assistance information message; or the RRC message is a release message requested by user equipment; or the RRC message is a suspend message requested by user equipment.

Embodiment 14: According to the apparatus in Embodiment 12, the NAS message is a registration message; or the NAS message is an uplink transport message; or the NAS message is a PDU session modification message.

Figure 17:
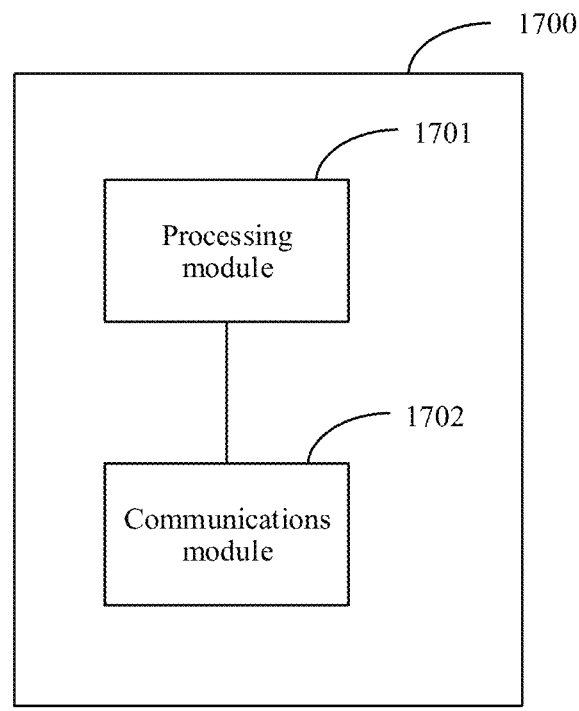
FIG. 17 is a schematic diagram 2 of a structure of a communications apparatus according to an embodiment of this application.

As shown in FIG. 17, based on a same technical concept, embodiments of this application further provide a communications apparatus 1700. The communications apparatus 1700 may be a network device, or an apparatus in a network device, or an apparatus that can be used in cooperation with a network device. The network device may be, for example, the first device or the second device in the foregoing method embodiments. In a design, the communications apparatus 1700 may include modules that one-to-one correspond to the methods/operations/steps/actions performed by the first device or the second device in the method embodiments. The modules may be implemented by a hardware circuit, software, or a combination of a hardware circuit and software. In a design, the apparatus may include a processing module 1701 and a communications module 1702. The processing module 1701 is configured to invoke the communications module 1702 to perform a function of receiving and/or sending. When the communications apparatus 1700 implements the foregoing method embodiments, specific operations performed by the modules are described in the seventh aspect or the eighth aspect.

According to the seventh aspect, an embodiment is described as follows:

The processing module is configured to serve a SIM1 of a terminal.

The communications module is configured to receive first information from the terminal, where the first information indicates the first device or the second device to stop sending a SIM1 paging message to the terminal, or the first information includes or indicates a condition in which the first device or the second device is allowed to send a SIM1 paging message to the terminal.

Embodiment 2: According to the apparatus in Embodiment 1, the first information indicates the first device to stop sending a SIM1 paging message to the terminal, or the first information includes or indicates a condition in which the first device is allowed to send a SIM1 paging message to the terminal.

The processing module is further configured to invoke the communications module to:

stop, based on the first information, sending a SIM1 paging message to the terminal, or determine, based on the first information, the condition in which sending a SIM1 paging message to the terminal is allowed.

Embodiment 3: According to the apparatus in Embodiment 1, the first information indicates the second device to stop sending a SIM1 paging message to the terminal, or the first information includes or indicates a condition in which the second device is allowed to send a SIM1 paging message to the terminal.

The processing module is further configured to invoke the communications module to:

forward the first information to the second device, or send second information based on the first information, where the second information indicates the second device to stop sending a SIM1 paging message to the terminal, or the second information includes or indicates the condition in which the second device is allowed to send a SIM1 paging message to the terminal.

Embodiment 4: According to the apparatus in Embodiment 1, the first information includes or indicates the condition in which the first device or the second device is allowed to send a SIM1 paging message to the terminal, and the first information includes or indicates:

information about a service that allows the first device or the second device to send a SIM1 paging message to the terminal; or information about a PDU session that allows the first device or the second device to send a SIM1 paging message to the terminal; or information about a QoS flow that allows the first device or the second device to send a SIM1 paging message to the terminal; or information about a service that triggers the SIM2 to enter a connected state; or information about a PDU session that triggers the SIM2 to enter a connected state; or information about a QoS flow that triggers the SIM2 to enter a connected state.

Embodiment 5: According to the apparatus in Embodiment 4, the information about a service that allows sending a SIM1 paging message to the terminal includes:

a type of service that allows sending a SIM1 paging message to the terminal; or a priority of a service that allows sending a SIM1 paging message to the terminal; or a lowest priority of services that allow sending a SIM1 paging message to the terminal.

Embodiment 6: According to the apparatus in Embodiment 4 or 5, the information about a PDU session that allows sending a SIM1 paging message to the terminal includes:

description information used to describe a PDU session that allows sending a SIM1 paging message to the terminal; or a priority of a PDU session that allows sending a SIM1 paging message to the terminal; or a lowest priority of PDU sessions that allow sending a SIM1 paging message to the terminal.

Embodiment 7: According to the apparatus in Embodiment 4, the information about a service that allows sending a SIM1 paging message to the terminal includes:

description information used to describe a quality of service QoS flow that allows sending a SIM1 paging message to the terminal; or a QoS priority of a QoS flow that allows sending a SIM1 paging message to the terminal; or a lowest priority of QoS flows that allow sending a SIM1 paging message to the terminal.

Embodiment 8: According to the apparatus in Embodiment 1, a service that triggers the SIM2 to enter a connected state is an emergency call service or a location update service, and the first information indicates the first device or a second device to stop sending a SIM1 paging message to the terminal.

Embodiment 9: According to the apparatus in any one of Embodiments 1 to 8, the first information includes information about a timer, and the processing module is further configured to invoke the communications module to:

before the timer expires, stop sending a SIM1 paging message to the terminal, or send a paging message meeting the condition to the terminal.

Embodiment 10: According to the apparatus in any one of Embodiments 1 to 9, the communications module is further configured to:

send second information to the terminal, where the second information indicates to change the SIM1 to a non-connected state, and indicates the terminal, to enable the SIM2 to enter a connected state.

Embodiment 11: According to the apparatus in any one of Embodiments 1 to 10, the first device is an access network device, and the communications module is configured to receive an RRC message from the terminal, where the RRC message carries the first information; or the first device is a core network device, and the communications module is configured to receive a NAS message from the terminal, where the NAS message carries the first information.

Embodiment 12: According to the apparatus in Embodiment 11, the RRC message is a user equipment assistance information message; or the RRC message is a release message requested by user equipment; or the RRC message is a suspend message requested by user equipment.

Embodiment 13: According to the apparatus in Embodiment 11, the NAS message is a registration message; or the NAS message is an uplink transport message; or the NAS message is a PDU session modification message.

Eighth Aspect:

Embodiment 1: A communications apparatus is provided, and includes:

a processing module, configured to serve a SIM1 of a terminal, where the terminal includes the SIM1 and a SIM2; and a communications module, configured to receive first information from the terminal, where the first information indicates the first device or a second device to stop sending a SIM2 paging message to the terminal, or the first information includes or indicates a condition in which the first device or a second device is allowed to send a SIM2 paging message to the terminal.

Embodiment 2: According to the apparatus in Embodiment 1, the first information indicates the first device to stop sending a SIM2 paging message to the terminal, or the first information includes or indicates a condition in which the first device is allowed to send a SIM2 paging message to the terminal.

The processing module is further configured to invoke the communications module to:

stop, based on the first information, sending a SIM2 paging message to the terminal, or determine, based on the first information, the condition in which sending a SIM2 paging message to the terminal is allowed.

Embodiment 3: According to the apparatus in Embodiment 1, the first information indicates the second device to stop sending a SIM2 paging message to the terminal, or the first information includes or indicates a condition in which the second device is allowed to send a SIM2 paging message to the terminal.

The processing module is further configured to invoke the communications module to:

forward the first information to the second device, or send second information based on the first information, where the second information indicates the second device to stop sending a SIM2 paging message to the terminal, or the second information includes or indicates the condition in which the second device is allowed to send a SIM2 paging message to the terminal.

Embodiment 4: According to the apparatus in Embodiment 1, the first information includes or indicates the condition in which the first device or the second device is allowed to send a SIM1 paging message to the terminal, and the first information includes or indicates:

information about a service that allows the first device or the second device to send a SIM2 paging message to the terminal; or information about a PDU session that allows the first device or the second device to send a SIM2 paging message to the terminal; or information about a QoS flow that allows the first device or the second device to send a SIM2 paging message to the terminal; or information about a service performed when the SIM1 is in connected state; or information about a PDU session performed when the SIM1 is in connected state; or information about a QoS flow performed when the SIM1 is in connected state.

Embodiment 5: According to the apparatus in Embodiment 4, the information about a service that allows sending a SIM2 paging message to the terminal includes:

a type of service that allows sending a SIM2 paging message to the terminal; or a priority of a service that allows sending a SIM2 paging message to the terminal; or a lowest priority of services that allow sending a SIM2 paging message to the terminal.

Embodiment 6: According to the apparatus in Embodiment 4 or 5, the information about a PDU session that allows sending a SIM2 paging message to the terminal includes:

description information used to describe a PDU session that allows sending a SIM2 paging message to the terminal; or a priority of a PDU session that allows sending a SIM2 paging message to the terminal; or a lowest priority of PDU sessions that allow sending a SIM2 paging message to the terminal.

Embodiment 7: According to the apparatus in Embodiment 4, the information about a service that allows sending a SIM2 paging message to the terminal includes:

description information used to describe a quality of service QoS flow that allows sending a SIM2 paging message to the terminal; or a QoS priority of a QoS flow that allows sending a SIM2 paging message to the terminal; or a lowest priority of QoS flows that allow sending a SIM2 paging message to the terminal.

Embodiment 8: According to the apparatus in any one of Embodiments 1 to 7, the first information includes information about a timer, and the communications module is further configured to:

before the timer expires, stop sending a SIM2 paging message to the terminal, or send a paging message meeting the condition to the terminal.

Embodiment 9: According to the apparatus in any one of Embodiments 1 to 8, the first device is an access network device, and the communications module is configured to receive an RRC message from the terminal, where the RRC message carries the first information; or the first device is a core network device, and the communications module is configured to receive a NAS message from the terminal, where the NAS message carries the first information.

Embodiment 10: According to the apparatus in Embodiment 9, the RRC message is a user equipment assistance information message; or the RRC message is a release message requested by user equipment; or the RRC message is a suspend message requested by user equipment.

Embodiment 11: According to the apparatus in Embodiment 9, the NAS message is a registration message; or the NAS message is an uplink transport message; or the NAS message is a PDU session modification message.

Figure 18:
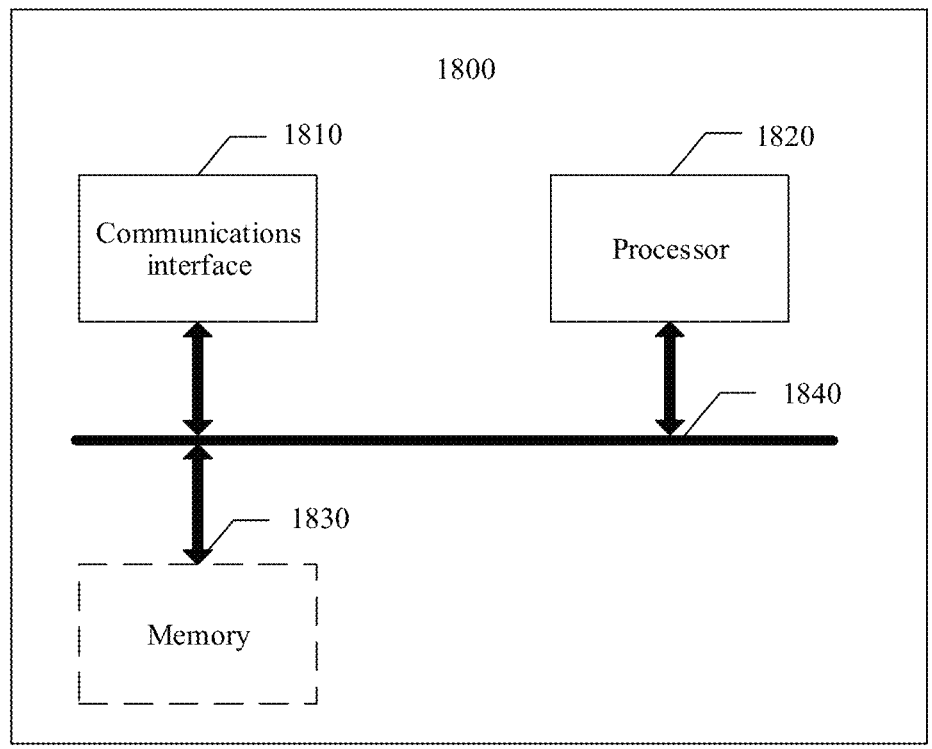
FIG. 18 is a schematic diagram 3 of a structure of a communications apparatus according to an embodiment of this application.

FIG. 18 shows a communications apparatus 1800 according to an embodiment of this application. The communications apparatus 1800 is configured to implement functions of the terminal in the foregoing methods. When the function of the terminal is implemented, the apparatus may be a terminal, an apparatus in the terminal, or an apparatus that can be used in cooperation with the terminal. The apparatus may be a chip system. In this embodiment of this application, the chip system may include a chip, or may include a chip and another discrete component. The communications apparatus 1800 includes at least one processor 1820, configured to implement a function of the terminal in the methods provided in embodiments of this application. The communications apparatus 1900 may include a first communications module 1910-1 and a second communications module 1910-2. For example, when the communications apparatus 1900 is a first device, another device may be a terminal. The processor 1920 receives and sends data through the first communication module 1910-1 or the second communication module 1910-2, and is configured to implement the methods in the foregoing method embodiments. The apparatus 1900 may further include at least one memory 1930, configured to store program instructions and/or data. The memory 1930 is coupled to the processor 1920. Coupling in this embodiment of this application may be indirect coupling or a communication connection between apparatuses, units, or modules in an electrical form, a mechanical form, or another form, and is used for information exchange between the apparatuses, the units, or the modules. The processor 1920 may operate in collaboration with the memory 1930. The processor 1920 may execute the program instructions stored in the memory 1930. At least one of the at least one memory may be included in the processor.

When the communications apparatus 1900 implements the foregoing method embodiments, specific operations performed by the modules are described in the ninth aspect or the tenth aspect.

According to a ninth aspect, an embodiment is described as follows:

Embodiment 1: The processor is configured to determine that when the SIM1 is in connected state and the SIM2 is in non-connected state, the SIM2 may enter a connected state from a non-connected state.

The processor is configured to send first information to a first device through the SIM1, where the first information indicates to stop sending a SIM1 paging message to the terminal, or the first information includes or indicates a condition in which sending a SIM1 paging message to the terminal is allowed.

For a function included or indicated by the first information, refer to the embodiment in the first aspect. Details are not described herein again.

Embodiment 2: According to the apparatus in Embodiment 1, the processor is further to receive, through the SIM2, a first paging message for paging the SIM2, where the first paging message includes or indicates information about a service that triggers the SIM2 to enter a connected state.

The processor is further configured to determine the first information based on the information about the service that triggers the SIM2 to enter a connected state.

Embodiment 3: According to the apparatus in Embodiment 1 or 2, the processor is further configured to receive, from the first device through the SIM2, a second paging message for paging the SIM2.

The processor is further configured to enable the SIM2 to enter a connected state; determine information about a service that triggers the SIM2 to enter a connected state; and determine the first information based on the information about the service that triggers the SIM2 to enter a connected state.

Embodiment 4: According to the apparatus in Embodiment 1, 2, or 3, when enabling the SIM2 to enter a connected state, the processor is configured to send, through the SIM1, a request message to an access network device serving the SIM1, where the request message is used to request to suspend scheduling a slot of the SIM1; and the processor is configured to connect, in the slot through the SIM2, to an access network device serving the SIM2.

Embodiment 5: According to the apparatus in any one of Embodiments 1 to 4, when sending the first information to the first device through the SIM1, the processor is configured to determine that a priority of the service that triggers the SIM2 to enter a connected state is higher than a priority of a service performed when the SIM1 is in connected state. The processor is configured to send the first information to the first device through the SIM1.

Embodiment 6: According to the apparatus in any one of Embodiments 1 to 5, the first information includes information about a timer, and the information about the timer indicates duration in which the first device or the second device stops sending a SIM1 paging message to the terminal, or indicates duration in which sending a paging message meeting the condition to the terminal is allowed.

Embodiment 7: According to the apparatus in any one of Embodiments 1 to 6, the processor is further configured to:

receive, through the SIM1, second information sent by the first device or the second device, where the second information indicates to change the SIM1 to a non-connected state; and the processor is further configured to enable, based on the second information, the SIM2 to enter a connected state.

Embodiment 8: According to the apparatus in Embodiment 7, the processor is further configured to determine that the SIM2 is switched from a connected state to a non-connected state, or determine that the service that triggers the SIM2 to enter a connected state ends; and the processor is further configured to send third information to the first device through the SIM1, where the third information indicates that the first device or the second device is allowed to send a paging message to the SIM1.

Embodiment 9: According to the apparatus in any one of Embodiments 1 to 8, when sending the first information to the first device in through the SIM1, the processor is configured to:

send, through the SIM1, an RRC message to an access network device serving the terminal, where the RRC message carries the first information; or send, through the SIM1, a NAS message to a core network device serving the terminal, where the first NAS message carries the first information.

Embodiment 10: According to the apparatus in Embodiment 9, the RRC message is a user equipment assistance information message; or the RRC message is a release message requested by user equipment; or the RRC message is a suspend message requested by user equipment.

Embodiment 11: According to the apparatus in Embodiment 9, the NAS message is a registration message; or the NAS message is an uplink transport message; or the NAS message is a PDU session modification message.

According to a tenth aspect, an embodiment is described as follows:

Embodiment 1: The processor is configured to determine that when the SIM1 is in connected state and the SIM2 is in non-connected state, the SIM2 may enter a connected state from a non-connected state.

The processor is further configured to send first information to a first device through the SIM2, where the first information indicates the first device or a second device to stop sending a SIM2 paging message to the terminal, or the first information includes or indicates a condition in which the first device or a second device is allowed to send a SIM2 paging message to the terminal.

Embodiment 2: According to the apparatus in Embodiment 1, the first information includes or indicates the condition in which the first device or the second device is allowed to send a SIM1 paging message to the terminal, and the first information includes or indicates:

information about a service that allows the first device or the second device to send a SIM2 paging message to the terminal; or information about a PDU session that allows the first device or the second device to send a SIM2 paging message to the terminal; or information about a QoS flow that allows the first device or the second device to send a SIM2 paging message to the terminal; or information about a service performed when the SIM1 is in connected state; or information about a PDU session performed when the SIM1 is in connected state; or information about a QoS flow performed when the SIM1 is in connected state.

Embodiment 3: According to the apparatus in Embodiment 2, the information about a service that allows sending a SIM2 paging message to the terminal includes:
a type of service that allows sending a SIM2 paging message to the terminal; or a priority of a service that allows sending a SIM2 paging message to the terminal; or a lowest priority of services that allow sending a SIM2 paging message to the terminal.

Embodiment 4: According to the apparatus in Embodiment 2 or 3, the information about a PDU session that allows sending a SIM2 paging message to the terminal includes:
description information used to describe a PDU session that allows sending a SIM2 paging message to the terminal; or a priority of a PDU session that allows sending a SIM2 paging message to the terminal; or a lowest priority of PDU sessions that allow sending a SIM2 paging message to the terminal.

Embodiment 5: According to the apparatus in Embodiment 2, the information about a service that allows sending a SIM2 paging message to the terminal includes:
description information used to describe a quality of service QoS flow that allows sending a SIM2 paging message to the terminal; or a QoS priority of a QoS flow that allows sending a SIM2 paging message to the terminal; or a lowest priority of QoS flows that allow sending a SIM2 paging message to the terminal.

Embodiment 7: According to the apparatus in any one of Embodiments 1 to 6, the processor is further configured to:
receive, through the SIM2, a first paging message for paging the SIM2, where the first paging message includes or indicates information about a service that triggers the SIM2 to enter a connected state.

The processor is further configured to determine the first information based on the information about the service that triggers the SIM2 to enter a connected state.

Embodiment 8: According to the apparatus in any one of Embodiments 1 to 6, the processor is further configured to receive, from the first device through the SIM2, a second paging message for paging the SIM2; and
the processor is further configured to enable the SIM2 to enter a connected state; determine information about a service that triggers the SIM2 to enter a connected state; and determine the first information based on the information about the service that triggers the SIM2 to enter a connected state.

Embodiment 9: According to the apparatus in Embodiment 8, when enabling the SIM2 to enter a connected state, the processor is configured to send, through the SIM1, a request message to an access network device serving the SIM1, where the request message is used to request to suspend scheduling a slot of the SIM1; and
the processor is configured to connect, in the slot through the SIM2, to an access network device serving the SIM2.

Embodiment 10: According to the apparatus in any one of Embodiments 1 to 9, when sending the first information to the first device through the SIM2, the processor is configured to determine that a priority of the service that triggers the SIM2 to enter a connected state is lower than a priority of a service performed when the SIM1 is in connected state; and
the processor is configured to send the first information to the first device through the SIM2.

Embodiment 11: According to the apparatus in any one of Embodiments 1 to 10,
the first information includes information about a timer, and the information about the timer indicates duration in which the first device or the second device stops sending a SIM2 paging message to the terminal, or indicates duration in which sending a paging message meeting the condition to the terminal is allowed.

Embodiment 12: According to the apparatus in any one of Embodiments 1 to 11, when sending the first information to the first device in through the SIM2, the processor is configured to:
send, through the SIM2, an RRC message to an access network device serving the terminal, where the first RRC message carries the first information; or send, through the SIM2, a NAS message to a core network device serving the terminal, where the first NAS message carries the first information.

Embodiment 13: According to the apparatus in Embodiment 12, the RRC message is a user equipment assistance information message; or the RRC message is a release message requested by user equipment; or the RRC message is a suspend message requested by user equipment.

Embodiment 14: According to the apparatus in Embodiment 12, the NAS message is a registration message; or the NAS message is an uplink transport message; or the NAS message is a PDU session modification message.

Figure 19:
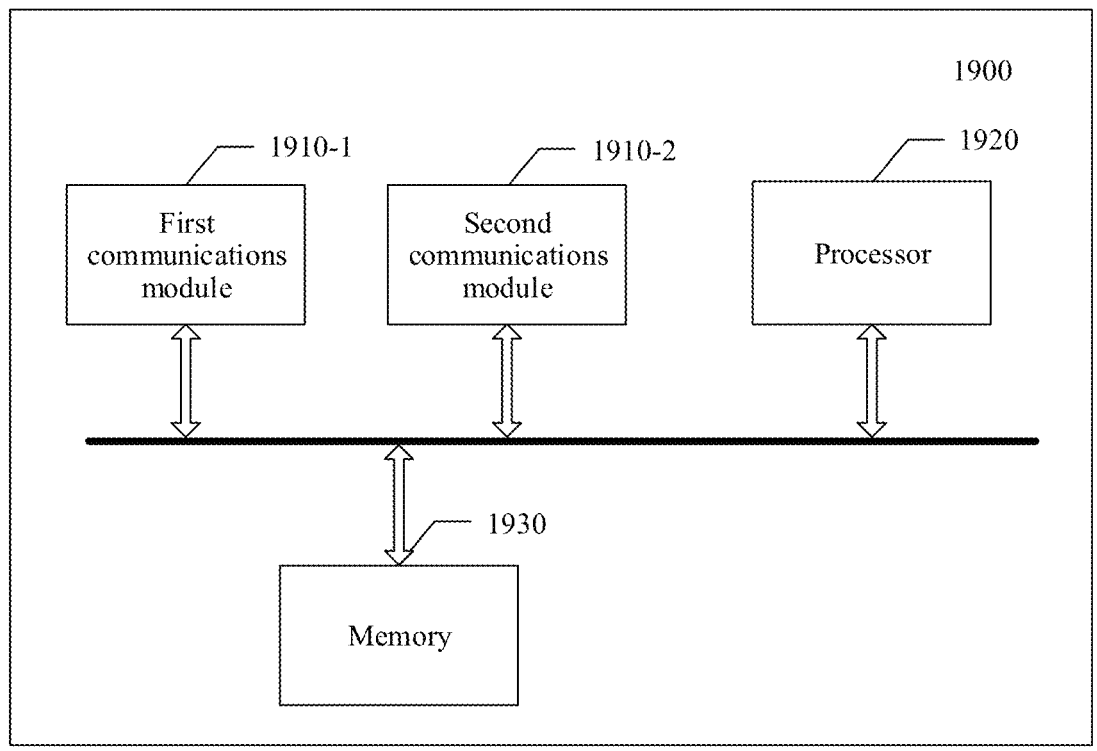
FIG. 19 is a schematic diagram 4 of a structure of a communications apparatus according to an embodiment of this application.

FIG. 19 shows a communications apparatus 1900 according to an embodiment of this application. The communications apparatus 1900 is configured to implement functions of the first device in the foregoing methods. When implementing the function of the first device, the communications apparatus may be the first device, may be an apparatus in the first device, or an apparatus that can be used in cooperation with the first device. The communications apparatus 1900 may be a chip system. In this embodiment of this application, the chip system may include a chip, or may include a chip and another discrete component. The communications apparatus 1900 includes at least one processor 1920, configured to implement a function of the first device in the methods provided in embodiments of this application. The communications apparatus 1900 may further include a communications interface 1910. In this embodiment of this application, the communications interface may be a transceiver, a circuit, a bus, a module, or a communications interface of another type, and is configured to communicate with another device by using a transmission medium. For example, the communications interface 1910 is used by an apparatus in the apparatus 1900 to communicate with another device. For example, when the communications apparatus 1900 is the first device, the another device may be the terminal. The processor 1920 receives and sends data through the communications interface 1910, and is configured to implement the methods in the foregoing method embodiments. When the communications apparatus 1900 implements the foregoing method embodiments, specific operations performed by the modules are described in an eleventh aspect or a twelfth aspect.

According to the eleventh aspect, an embodiment is described as follows:
The processor is configured to serve a SIM1 of the terminal.
The communications interface is configured to receive first information from the terminal, where the first information indicates the first device or a second device to stop sending a SIM1 paging message to the terminal, or the first information includes or indicates a condition in which the first device or a second device is allowed to send a SIM1 paging message to the terminal.

Embodiment 2: According to the apparatus in Embodiment 1, the first information indicates the first device to stop sending a SIM1 paging message to the terminal, or the first information includes or indicates a condition in which the first device is allowed to send a SIM1 paging message to the terminal; and the processor is further configured to invoke the communications interface to:
stop, based on the first information, sending a SIM1 paging message to the terminal, or determine, based on the first information, the condition in which sending a SIM1 paging message to the terminal is allowed.

Embodiment 3: According to the apparatus in Embodiment 1, the first information indicates the second device to stop sending a SIM1 paging message to the terminal, or the first information includes or indicates a condition in which the second device is allowed to send a SIM1 paging message to the terminal; and the processor is further configured to invoke the communications interface to:
forward the first information to the second device, or send second information based on the first information, where the second information indicates the second device to stop sending a SIM1 paging message to the terminal, or the second information includes or indicates the condition in which the second device is allowed to send a SIM1 paging message to the terminal.

Embodiment 4: According to the apparatus in Embodiment 1, the first information includes or indicates the condition in which the first device or the second device is allowed to send a SIM1 paging message to the terminal, and the first information includes or indicates:
information about a service that allows the first device or the second device to send a SIM1 paging message to the terminal; or information about a PDU session that allows the first device or the second device to send a SIM1 paging message to the terminal; or information about a QoS flow that allows the first device or the second device to send a SIM1 paging message to the terminal; or information about a service that triggers the SIM2 to enter a connected state; or information about a PDU session that triggers the SIM2 to enter a connected state; or information about a QoS flow that triggers the SIM2 to enter a connected state.

Embodiment 5: According to the apparatus in Embodiment 4, the information about a service that allows sending a SIM1 paging message to the terminal includes:
a type of service that allows sending a SIM1 paging message to the terminal; or a priority of a service that allows sending a SIM1 paging message to the terminal; or a lowest priority of services that allow sending a SIM1 paging message to the terminal.

Embodiment 6: According to the apparatus in Embodiment 4 or 5, the information about a PDU session that allows sending a SIM1 paging message to the terminal includes:
description information used to describe a PDU session that allows sending a SIM1 paging message to the terminal; or a priority of a PDU session that allows sending a SIM1 paging message to the terminal; or a lowest priority of PDU sessions that allow sending a SIM1 paging message to the terminal.

Embodiment 7: According to the apparatus in Embodiment 4, the information about a service that allows sending a SIM1 paging message to the terminal includes:

description information used to describe a quality of service QoS flow that allows sending a SIM1 paging message to the terminal; or a QoS priority of a QoS flow that allows sending a SIM1 paging message to the terminal; or a lowest priority of QoS flows that allow sending a SIM1 paging message to the terminal.

Embodiment 8: According to the apparatus in Embodiment 1, a service that triggers the SIM2 to enter a connected state is an emergency call service or a location update service, and the first information indicates the first device or a second device to stop sending a SIM1 paging message to the terminal.

Embodiment 9: According to the apparatus in any one of Embodiments 1 to 8, the first information includes information about a timer, and the processor is further configured to invoke the communications interface to:
before the timer expires, stop sending a SIM1 paging message to the terminal, or send a paging message meeting the condition to the terminal.

Embodiment 10: According to the apparatus in any one of Embodiments 1 to 9, the communications interface is further configured to:
send second information to the terminal, where the second information indicates to change the SIM1 to a non-connected state, and indicates the terminal, to enable the SIM2 to enter a connected state.

Embodiment 11: According to the apparatus in any one of Embodiments 1 to 10, the first device is an access network device, and the communications interface is configured to receive an RRC message from the terminal, where the RRC message carries the first information; or
the first device is a core network device, and the communications interface is configured to receive a NAS message from the terminal, where the NAS message carries the first information.

Embodiment 12: According to the apparatus in Embodiment 11, the RRC message is a user equipment assistance information message; or the RRC message is a release message requested by user equipment; or the RRC message is a suspend message requested by user equipment.

Embodiment 13: According to the apparatus in Embodiment 11, the NAS message is a registration message; or the NAS message is an uplink transport message; or the NAS message is a PDU session modification message.

According to the twelfth aspect, an embodiment is described as follows:
The processor is configured to serve a SIM1 of a terminal, where the terminal includes the SIM1 and a SIM2.

The communications interface is configured to receive first information from the terminal, where the first information indicates the first device or a second device to stop sending a SIM2 paging message to the terminal, or the first information includes or indicates a condition in which the first device or a second device is allowed to send a SIM2 paging message to the terminal.

Embodiment 2: According to the apparatus in Embodiment 1, the first information indicates the first device to stop sending a SIM2 paging message to the terminal, or the first information includes or indicates a condition in which the first device is allowed to send a SIM2 paging message to the terminal; and
the processor is further configured to invoke the communications interface to:
stop, based on the first information, sending a SIM2 paging message to the terminal, or determine, based on the first information, the condition in which sending a SIM2 paging message to the terminal is allowed.

Embodiment 3: According to the apparatus in Embodiment 1, the first information indicates the second device to stop sending a SIM2 paging message to the terminal, or the first information includes or indicates a condition in which the second device is allowed to send a SIM2 paging message to the terminal; and the processor is further configured to invoke the communications interface to:
forward the first information to the second device, or send second information based on the first information, where the second information indicates the second device to stop sending a SIM2 paging message to the terminal, or the second information includes or indicates the condition in which the second device is allowed to send a SIM2 paging message to the terminal.

Embodiment 4: According to the apparatus in Embodiment 1, the first information includes or indicates the condition in which the first device or the second device is allowed to send a SIM1 paging message to the terminal, and the first information includes or indicates:
information about a service that allows the first device or the second device to send a SIM2 paging message to the terminal; or information about a PDU session that allows the first device or the second device to send a SIM2 paging message to the terminal; or information about a QoS flow that allows the first device or the second device to send a SIM2 paging message to the terminal; or information about a service performed when the SIM1 is in connected state; or information about a PDU session performed when the SIM1 is in connected state; or information about a QoS flow performed when the SIM1 is in connected state.

Embodiment 5: According to the apparatus in Embodiment 4, the information about a service that allows sending a SIM2 paging message to the terminal includes:
a type of service that allows sending a SIM2 paging message to the terminal; or a priority of a service that allows sending a SIM2 paging message to the terminal; or a lowest priority of services that allow sending a SIM2 paging message to the terminal.

Embodiment 6: According to the apparatus in Embodiment 4 or 5, the information about a PDU session that allows sending a SIM2 paging message to the terminal includes:
description information used to describe a PDU session that allows sending a SIM2 paging message to the terminal; or a priority of a PDU session that allows sending a SIM2 paging message to the terminal; or a lowest priority of PDU sessions that allow sending a SIM2 paging message to the terminal.

Embodiment 7: According to the apparatus in Embodiment 4, the information about a service that allows sending a SIM2 paging message to the terminal includes:
description information used to describe a quality of service QoS flow that allows sending a SIM2 paging message to the terminal; or a QoS priority of a QoS flow that allows sending a SIM2 paging message to the terminal; or a lowest priority of QoS flows that allow sending a SIM2 paging message to the terminal.

Embodiment 8: According to the apparatus in any one of Embodiments 1 to 7, the first information includes information about a timer, and the communications interface is further configured to:
before the timer expires, stop sending a SIM2 paging message to the terminal, or send a paging message meeting the condition to the terminal.

Embodiment 9: According to the apparatus in any one of Embodiments 1 to 8, the first device is an access network device, and the communications interface is configured to receive an RRC message from the terminal, where the RRC message carries the first information; or the first device is a core network device, and the communications interface is configured to receive a NAS message from the terminal, where the NAS message carries the first information.

Embodiment 10: According to the apparatus in Embodiment 9, the RRC message is a user equipment assistance information message; or the RRC message is a release message requested by user equipment; or the RRC message is a suspend message requested by user equipment.

Embodiment 11: According to the apparatus in Embodiment 9, the NAS message is a registration message; or the NAS message is an uplink transport message; or the NAS message is a PDU session modification message.

The apparatus 1900 may further include at least one memory 1930, configured to store program instructions and/or data. The memory 1930 is coupled to the processor 1920. Coupling in this embodiment of this application may be indirect coupling or a communication connection between apparatuses, units, or modules in an electrical form, a mechanical form, or another form, and is used for information exchange between the apparatuses, the units, or the modules. The processor 1920 may operate in collaboration with the memory 1930. The processor 1920 may execute the program instructions stored in the memory 1930. At least one of the at least one memory may be included in the processor.

This embodiment of this application does not limit a specific connection medium between the first communications module 1910-1, the first communications module 1910-2, the processor 1920, and the memory 1930. In this embodiment of this application, the memory 1930, the first communications module 1910-1, the first communications module 1910-2, and the processor 1920 are connected through a bus in FIG. 19, and the bus is represented by a bold line in FIG. 19. A manner of connection between other components is schematically described, and is not limited thereto. The bus may be classified into an address bus, a data bus, a control bus, or the like. For ease of representation, only one bold line is used in FIG. 19 to represent the bus, but this does not mean that there is only one bus or one type of bus.

When the communications apparatus 1700 and the communications apparatus 1900 are chips or chip systems, baseband signals may be output or received by the communications module 1702, the first communications module 1910-1, and the first communications module 1910-2. When the apparatus 1700 and the apparatus 1900 are devices, radio frequency signals may be output or received by the communications module 1702, the first communications module 1910-1, and the first communications module 1910-2. In embodiments of this application, the processor may be a general-purpose processor, a digital signal processor, an application-specific integrated circuit, a field programmable gate array or another programmable logic device, a discrete gate or transistor logic device, or a discrete hardware component, and may implement or perform the methods, steps, and logical block diagrams disclosed in embodiments of this application. The general-purpose processor may be a microprocessor, any conventional processor, or the like. The steps of the methods disclosed with reference to embodiments of this application may be directly performed by a hardware processor, or may be performed by using a combination of hardware in the processor and a software module.

In embodiments of this application, the memory may be a nonvolatile memory, such as a hard disk drive (HDD) or a solid-state drive (SSD), or may be a volatile memory, such as a random-access memory (RAM). The memory is any other medium that can carry or store expected program code in a form of an instruction or a data structure and can be accessed by a computer, but is not limited thereto. The memory in embodiments of this application may alternatively be a circuit or any other apparatus that can implement a storage function, and is configured to store program instructions and/or data.

Some or all of the operations and functions that are performed by the terminal and that are described in the foregoing method embodiments of this application, or some or all of the operations and functions that are performed by the first device and that are described in the foregoing method embodiments of this application may be completed by using a chip or an integrated circuit.

To implement the functions of the apparatus in FIG. 16, FIG. 17, FIG. 18, or FIG. 19, embodiments of this application further provide a chip, including a processor, configured to support the apparatus in implementing the functions of the terminal or the first device in the foregoing method embodiments. In a possible design, the chip is connected to a memory or the chip includes a memory, and the memory is configured to store program instructions and data that are used for the apparatus.

Embodiments of this application provide a computer storage medium that stores a computer program. The computer program includes instructions used to perform the foregoing method embodiments.

Embodiments of this application provide a computer program product including instructions. When the computer program product is run on a computer, the computer is enabled to perform the foregoing method embodiments.

A person skilled in the art should understand that embodiments of this application may be provided as a method, a system, or a computer program product. Therefore, this application may use a form of a hardware-only embodiment, a software-only embodiment, or an embodiment with a combination of software and hardware. Moreover, this application may use a form of a computer program product that is implemented on one or more computer usable storage media (including but not limited to a disk memory, a CD-ROM, an optical memory, and the like) that include computer usable program code.

This application is described with reference to the flowcharts and/or block diagrams of the method, the device (system), and the computer program product according to embodiments of this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of another programmable data processing device to generate a machine, so that the instructions executed by the computer or the processor of the another programmable data processing device generate an apparatus for implementing a specific function in one or more processes in the flowcharts and/or in one or more blocks in the block diagrams.

These computer program instructions may be stored in a computer readable memory that can instruct the computer or any other programmable data processing device to work in a specific manner, so that the instructions stored in the computer readable memory generate an artifact that includes an instruction apparatus. The instruction apparatus implements a specified function in one or more processes in the flowcharts and/or in one or more blocks in the block diagrams.

These computer program instructions may also be loaded onto a computer or another programmable data processing device, so that a series of operations and steps are performed on the computer or the another programmable device, to generate computer-implemented processing. Therefore, the instructions executed on the computer or the another programmable device provide steps for implementing a specific function in one or more processes in the flowcharts and/or in one or more blocks in the block diagrams.

Although preferred embodiments of this application have been described, once learning of the basic inventive concept, a person skilled in the art can make additional changes and modifications to these embodiments. Therefore, the following claims are intended to be construed as to cover the preferred embodiments and all changes and modifications falling within the scope of this application.

Clearly, persons skilled in the art can make various modifications and variations to the embodiments of this application without departing from the spirit and scope of the embodiments of this application. This application is intended to cover these modifications and variations to embodiments of this application provided that they fall within the scope of the claims of this application and the equivalent technologies thereof.

What is claimed is:

1. A communications method, performed by a communications apparatus, wherein the communications apparatus supports a first subscriber identity module card and a second subscriber identity module card, and the method comprises:
   determining that the first subscriber identity module card is in a connected state and the second subscriber identity module card is to enter a connected state from a non-connected state; and
   in response to the determination, sending first information to a first device through the first subscriber identity module card, wherein the first information indicates a condition in which sending a paging message for the first subscriber identity module card to the communications apparatus is allowed by indicating at least one of the following:
   information about a service that allows the first device to send the paging message for the first subscriber identity module card to the communications apparatus; or
   information about a protocol data unit session that allows the first device to send the paging message for the first subscriber identity module card to the communications apparatus.

2. The method according to claim 1, wherein the first information further indicates at least one of the following:
   information about a quality of service flow that allows the first device or a second device to send the paging message for the first subscriber identity module card to the communications apparatus; or
   information about a service that triggers the second subscriber identity module card to enter the connected state; or
   information about a protocol data unit session that triggers the second subscriber identity module card to enter the connected state; or
   information about a quality of service flow that triggers the second subscriber identity module card to enter the connected state.

3. The method according to claim 1, wherein the information about the service that allows the first device to send the paging message for the first subscriber identity module card to the communications apparatus comprises at least one of the following:
- a type of the service that allows the first device to send paging message for the first subscriber identity module card to the communications apparatus; or
- a priority of the service that allows the first device to send the paging message for the first subscriber identity module card to the communications apparatus; or
- a lowest priority of services that allows the first device to send the paging message for the first subscriber identity module card to the communications apparatus.

4. The method according to claim 3, wherein the type of the service that allows the first device to send the paging message for the first subscriber identity module card to the communications apparatus comprises a voice service.

5. The method according to claim 1, wherein the information about the protocol data unit session that allows the first device to send the paging message for the first subscriber identity module card to the communications apparatus comprises at least one of the following:
- description information used to describe the protocol data unit session that allows the first device to send the paging message for the first subscriber identity module card to the communications apparatus; or
- a priority of the protocol data unit session that allows the first device to send the paging message for the first subscriber identity module card to the communications apparatus; or
- a lowest priority of protocol data unit sessions that allows the first device to send the paging message for the first subscriber identity module card to the communications apparatus.

6. The method according to claim 1, wherein the sending the first information to the first device through the first subscriber identity module card comprises:
- sending, through the first subscriber identity module card, a radio resource control message to an access network device serving the communications apparatus, wherein the radio resource control message carries the first information; or
- sending, through the first subscriber identity module card, a non-access stratum message to a core network device serving the communications apparatus, wherein the non-access stratum message carries the first information.

7. The method according to claim 6, wherein
the non-access stratum message is a Registration message; or
the non-access stratum message is an uplink transport message; or
the non-access stratum message is a protocol data unit session modification message.

8. The method according to claim 1, wherein the method further comprises:
- receiving, from the first device, a second paging message for paging the second subscriber identity module card;
- enabling the second subscriber identity module card to enter the connected state;
- determining information about a service that triggers the second subscriber identity module card to enter the connected state; and
- determining the first information based on the information about the service that triggers the second subscriber identity module card to enter the connected state.

9. The method according to claim 8, wherein the enabling the second subscriber identity module card to enter the connected state comprises:
- sending, through the first subscriber identity module card, a request message to an access network device serving the first subscriber identity module card, wherein the request message is used to request to suspend scheduling a slot of the first subscriber identity module card; and
- connecting, in the slot through the second subscriber identity module card, to an access network device serving the second subscriber identity module card.

10. A communications apparatus, wherein the communications apparatus supports a first subscriber identity module card and a second subscriber identity module card, the communications apparatus comprises a memory and a processor, the memory is configured to store instructions, and the processor is configured to execute the instructions to cause the communications apparatus to:
- determine that the first subscriber identity module card is in a connected state and the second subscriber identity module card is to enter a connected state from a non-connected state; and
- in response to the determination, send first information to a first device through the first subscriber identity module card, wherein the first information indicates a condition in which sending a paging message for the first subscriber identity module card to the communications apparatus is allowed by indicating at least one of the following:
  - information about a service that allows the first device to send the paging message for the first subscriber identity module card to the communications apparatus; or
  - information about a protocol data unit session that allows the first device to send the paging message for the first subscriber identity module card to the communications apparatus.

11. The communications apparatus according to claim 10, wherein the first information further indicates at least one of the following:
- information about a quality of service flow that allows the first device or a second device to send the paging message for the first subscriber identity module card to the communications apparatus; or
- information about a service that triggers the second subscriber identity module card to enter the connected state; or
- information about a protocol data unit session that triggers the second subscriber identity module card to enter the connected state; or
- information about a quality of service flow that triggers the second subscriber identity module card to enter the connected state.

12. The communications apparatus according to claim 10, wherein the information about the service that allows the first device to send the paging message for the first subscriber identity module card to the communications apparatus comprises at least one of the following:
- a type of the service that allows the first device to send the paging message for the first subscriber identity module card to the communications apparatus; or
- a priority of the service that allows the first device to send the paging message for the first subscriber identity module card to the communications apparatus; or
- a lowest priority of services that allows the first device to send the paging message for the first subscriber identity module card to the communications apparatus.

13. The communications apparatus according to claim 10, wherein the information about the protocol data unit session that allows the first device to send the paging message for the first subscriber identity module card to the communications apparatus comprises at least one of the following:
- description information used to describe the protocol data unit session that allows the first device to send the paging message for the first subscriber identity module card to the communications apparatus; or
- a priority of the protocol data unit session that allows the first device to send the paging message for the first subscriber identity module card to the communications apparatus; or
- a lowest priority of protocol data unit sessions that allows the first device to send the paging message for the first subscriber identity module card to the communications apparatus.

14. The communications apparatus according to claim 10, wherein the processor is configured to execute the instructions to further cause the communications apparatus to:
- send, through the first subscriber identity module card, a radio resource control message to an access network device serving the communications apparatus, wherein the radio resource control message carries the first information; or
- send, through the first subscriber identity module card, a non-access stratum message to a core network device serving the communications apparatus, wherein the non-access stratum message carries the first information.

15. The communications apparatus according to claim 14, wherein
- the non-access stratum message is a Registration message; or
- the non-access stratum message is an uplink transport message; or
- the non-access stratum message is a protocol data unit session modification message.

16. The communications apparatus according to claim 10, wherein the processor is configured to execute the instructions to further cause the communications apparatus to:
- receive, from the first device, a second paging message for paging the second subscriber identity module card;
- enable the second subscriber identity module card to enter the connected state;
- determine information about a service that triggers the second subscriber identity module card to enter the connected state; and
- determine the first information based on the information about the service that triggers the second subscriber identity module card to enter the connected state.

17. A communications method, performed by a first device, wherein the method comprises:
- receiving, when a first subscriber identity module card in a communications apparatus is in a connected state, first information from the communications apparatus, wherein the first information indicates a condition in which sending a paging message for the first subscriber identity module card to the communications apparatus is allowed by indicating at least one of the following:
- information about a service that allows the first device to send the paging message for the first subscriber identity module card to the communications apparatus; or
- information about a protocol data unit session that allows the first device to send the paging message for the first subscriber identity module card to the communications apparatus; and
- when determining that the condition is met, sending the paging message for the first subscriber identity module card to the communication apparatus.

18. The method according to claim 17, wherein
the method further comprises:
determining the condition in which sending the paging message for the first subscriber identity module card to the communications apparatus is allowed.

19. The method according to claim 17, wherein
- the first device is an access network device, and the receiving the first information from the communications apparatus comprises: receiving a radio resource control message from the communications apparatus, wherein the radio resource control message carries the first information; or
- the first device is a core network device, and the receiving first information from the communications apparatus comprises: receiving a non-access stratum message from the communications apparatus, wherein the non-access stratum message carries the first information.

20. A first device comprising a memory and a processor, wherein the memory is configured to store instructions, and the processor is configured to execute the instructions to cause the first device to:
- receive, when a first subscriber identity module card in a communications apparatus is in a connected state, first information from the communications apparatus, wherein the first information indicates a condition in which sending a paging message for the first subscriber identity module card to the communications apparatus is allowed by indicating at least one of the following:
- information about a service that allows the first device to send the paging message for the first subscriber identity module card to the communications apparatus; or
- information about a protocol data unit session that allows the first device to send the paging message for the first subscriber identity module card to the communications apparatus;
- when determining that the condition is met, send the paging message for the first subscriber identity module card to the communication apparatus.

* * * * *